United States Patent [19]
Mizukami et al.

[11] Patent Number: 5,598,385
[45] Date of Patent: Jan. 28, 1997

[54] MEDIA LIBRARY SYSTEM WITH IMPROVED MEDIA MANAGEMENT SCHEME

[75] Inventors: Makoto Mizukami, Tokyo; Shigetaro Iwatsu, Saitamaken; Masao Sakai, Tokyo; Masahiro Ueno, Saitamaken; Nobuyoshi Izawa, Tokyo; Kikuji Katou, Saitamaken, all of Japan

[73] Assignee: Nippon Telegraph and Telephone Corporation, Tokyo, Japan

[21] Appl. No.: 349,089

[22] Filed: Dec. 2, 1994

[30] Foreign Application Priority Data

| Dec. 2, 1993 | [JP] | Japan | 5-302754 |
| Dec. 28, 1993 | [JP] | Japan | 5-335435 |
| Dec. 28, 1993 | [JP] | Japan | 5-335442 |
| Feb. 16, 1994 | [JP] | Japan | 6-019457 |

[51] Int. Cl.⁶ .......................... G11B 17/22; G11B 15/68
[52] U.S. Cl. ...................... 369/36; 369/34; 360/92
[58] Field of Search ...................... 369/30, 32, 33, 369/34, 36, 178, 191; 360/92

[56] References Cited

U.S. PATENT DOCUMENTS

| 4,945,428 | 7/1990 | Waldo | 360/92 |
| 4,987,533 | 1/1991 | Clark et al. | 364/200 |
| 5,235,572 | 8/1993 | Tamai | 369/30 |

FOREIGN PATENT DOCUMENTS

| 1-220171 | 9/1989 | Japan . |
| 2-281320 | 11/1990 | Japan . |
| 2-281319 | 11/1990 | Japan . |
| 3-78819 | 4/1991 | Japan . |
| 3-130958 | 6/1991 | Japan . |
| 5-250782 | 9/1993 | Japan . |
| 6-12755 | 1/1994 | Japan . |

*Primary Examiner*—Stuart S. Levy
*Assistant Examiner*—William J. Klimowicz
*Attorney, Agent, or Firm*—Banner & Allegretti, Ltd.

[57] ABSTRACT

A media library system capable of reducing a time and an average moving distance of the media carrying unit required for exchanging the recording media. The system includes a storehouse having a plurality of storage cells for storing a plurality of recording media, a media driving unit for executing data read/write operation with respect to the recording media, and a media carrying unit for carrying the recording media between the storehouse and the media driving unit, so as to exchange a previously used recording medium mounted on the media driving unit with a new recording medium stored in the storehouse. The media exchange operation of the media carrying unit is controlled such that the storage cells of the storehouse are divided into at least two groups arranged in an order of average distances with respect to the media driving unit, including a first group with a shortest average distance with respect to the media driving unit and a last group with a longest average distance, and at least one vacant cell not storing any recording medium is secured among the storage cells of the first group after the media exchange operation is completed.

24 Claims, 28 Drawing Sheets

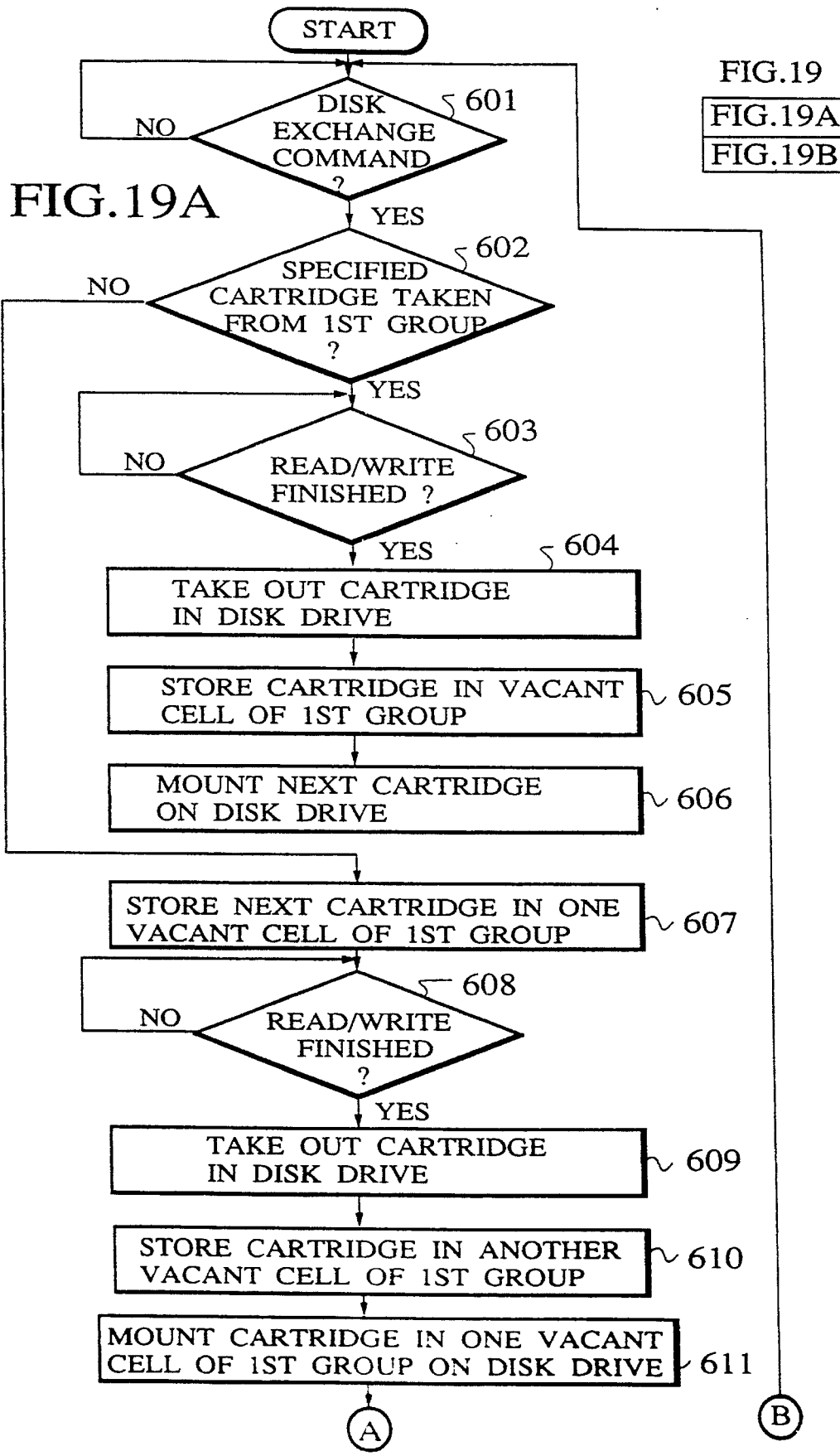

CELL/DRIVE ADDRESS 621

ASSOCIATED GROUP NUMBER 622

MEDIUM NAME 623

ACCESS FREQUENCY MANAGEMENT VALUE
(LAST ACCESS TIME/NUMBER OF ACCESSES) 624

MEDIA LIBRARY SYSTEM WITH IMPROVED MEDIA MANAGEMENT SCHEME

BACKGROUND OF THE INVENTION

1. Field of the Invention

The present invention relates to a media library system having a storehouse for storing a large number of recording media such as optical disks, magnetic disks, magnetic tapes, etc., which carries out the-exchange of the recording media and the data access to the recording media automatically.

2. Description of the Background Art

The optical disk device is a storage device for exchangeably storing optical disk media, where each optical disk medium is either a type of 90 mm diameter having several hundred MB recording capacity or a type of 130 mm diameter having approximately 1 GB recording capacity, such that unlimited amount of recording capacity can be realized in principle by the exchange of the optical disk media.

In recent years, there has been a development of an optical disk library system which realizes the recording capacity of 1 TB level by carrying out the exchange of the optical disk media automatically, by taking an advantage of such an optical disk device. This optical disk library system has a schematic configuration as shown in FIG. 1, in which a standard type cartridge 1 containing one optical disk medium is mounted onto a disk drive 2 to carry out data read/write with respect to the optical disk medium contained in the cartridge 1, and an arbitrary cartridge 1 stored in a storage cell 3a of a storehouse 3 can be exchanged with the cartridge 1 in the disk drive 2 by being conveyed by a robotic hand 4 of an automatic disk handling mechanism.

Normally, in a case of exchanging the cartridges 1, as shown in FIG. 1, the cartridge 1 taken out from the disk drive 2 is conveyed over to the prescribed storage cell 3a of the storehouse 3 by the robotic hand 4 as indicated by an arrow ①, and then the robotic hand 4 is moved over to the storage cell 3a of a next cartridge 1 as indicated by an arrow ②, and finally this next cartridge 1 is conveyed over to the disk drive 2 as indicated by an arrow ③.

However, this manner of exchanging the cartridges 1 requires to return the cartridge 1 mounted on the disk drive 2 to the prescribed position first, and then convey the new cartridge 1 stored in the storehouse 3 to the disk drive 2, so that an average access time of the optical disk has been as much as ten to twenty seconds in a conventional optical disk library system.

Now, in the optical disk library system, there is a possibility for a need to continuously reproduce data which are recorded in division on a plurality of recording media. In order to cope with this situation, there is a proposition for a provision as shown in FIG. 2 to provide two escape cells 5 for temporarily storing cartridges 1 in a vicinity of the disk drive 2 such that the cartridge 1 to be accessed next can be standing by in advance in these escape cells 5 to shorten the exchange time of each cartridge 1.

In this case, the cartridge 1 to be accessed next is moved from the storage cell 3a to one of the escape cells 5 by the robotic hand 4 in advance as indicated by arrows ① and ②, and when the data read/write with respect to the previous cartridge 1 is finished, the finished cartridge 1 is temporarily stored in the other one of the escape cells 5 as indicated by arrows ③ and ④. Then, the next cartridge 1 in one of the escape cells 5 is mounted on the disk drive 2 to restart the data read/write as indicated by arrows ⑤ and ⑥. After that, the previous cartridge 1 temporarily stored in the other one of the escape cells 5 is returned to the prescribed storage cell 3a of the storehouse 3 as indicated by arrows ⑦, ⑧ and ⑨.

However, according to this proposition, the advance moving of the cartridge 1 to the escape cells 5 is going to be carried out even for those cartridges 1 which have little influence on the access time as they are already located in a vicinity of the disk drive 2, so that the average moving distance of the robotic hand 4 is going to be increased beyond what is absolutely necessary. In particular, in a case very frequent movements of the robotic hand 4 is required as in a case of using a plurality of disk drives 2 with respect to a single storehouse 3, it is even possible for this increased robotic hand moving distance to cause the lowering of the cartridge exchange performance itself.

SUMMARY OF THE INVENTION

It is therefore an object of the present invention to provide a media library system capable of carrying out the exchange of the recording media in short time.

It is another object of the present invention to provide a media library system capable of shortening the average moving distance of the media carrying means.

According to one aspect of the present invention there is provided a media library system, comprising: a storehouse having a plurality of storage cells for storing a plurality of recording media; media driving means for executing data read/write operation with respect to the recording media; media carrying means for carrying the recording media between the storehouse and the media driving means, so as to exchange a previously used recording medium mounted on the media driving means with a new recording medium stored in the storehouse; and control means for controlling a media exchange operation of the media carrying means to exchange the previously used recording medium with the new recording medium such that the storage cells of the storehouse are divided into at least two groups arranged in an order of average distances with respect to the media driving means, including a first group with a shortest average distance with respect to the media driving means among said at least two groups and a last group with a longest average distance with respect to the media driving means among said at least two groups, and at least one vacant cell not storing any recording medium is secured among the storage cells of the first group after the media exchange operation is completed.

According to another aspect of the present invention there is provided a method for controlling a media library system including a storehouse having a plurality of storage cells for storing a plurality of recording media, media driving means for executing data read/write operation with respect to the recording media, and media carrying means for carrying the recording media between the storehouse and the media driving means, the method comprising the steps of: driving the media carrying means to execute a media exchange operation to exchange a previously used recording medium mounted on the media driving means with a new recording medium stored In the storehouse; and controlling the media exchange operation of the media carrying means such that the storage cells of the storehouse are divided into at least two groups arranged in an order of average distances with respect to the media driving means, including a first group with a shortest average distance with respect to the media driving means among said at least two groups and a last group with a longest average distance with respect to the media driving means among said at least two groups, and at least one vacant cell not storing any recording medium is secured among the storage cells of the first group after the media exchange operation is completed.

Other features and advantages of the present invention will become apparent from the following description taken in conjunction with the accompanying drawings.

BRIEF DESCRIPTION OF THE DRAWINGS

FIG. 19, 19A and 19B, is a flow chart for a disk exchange operation in the fourth embodiment of FIG. 18.

DETAILED DESCRIPTION OF THE PREFERRED EMBODIMENTS

Figure 3:
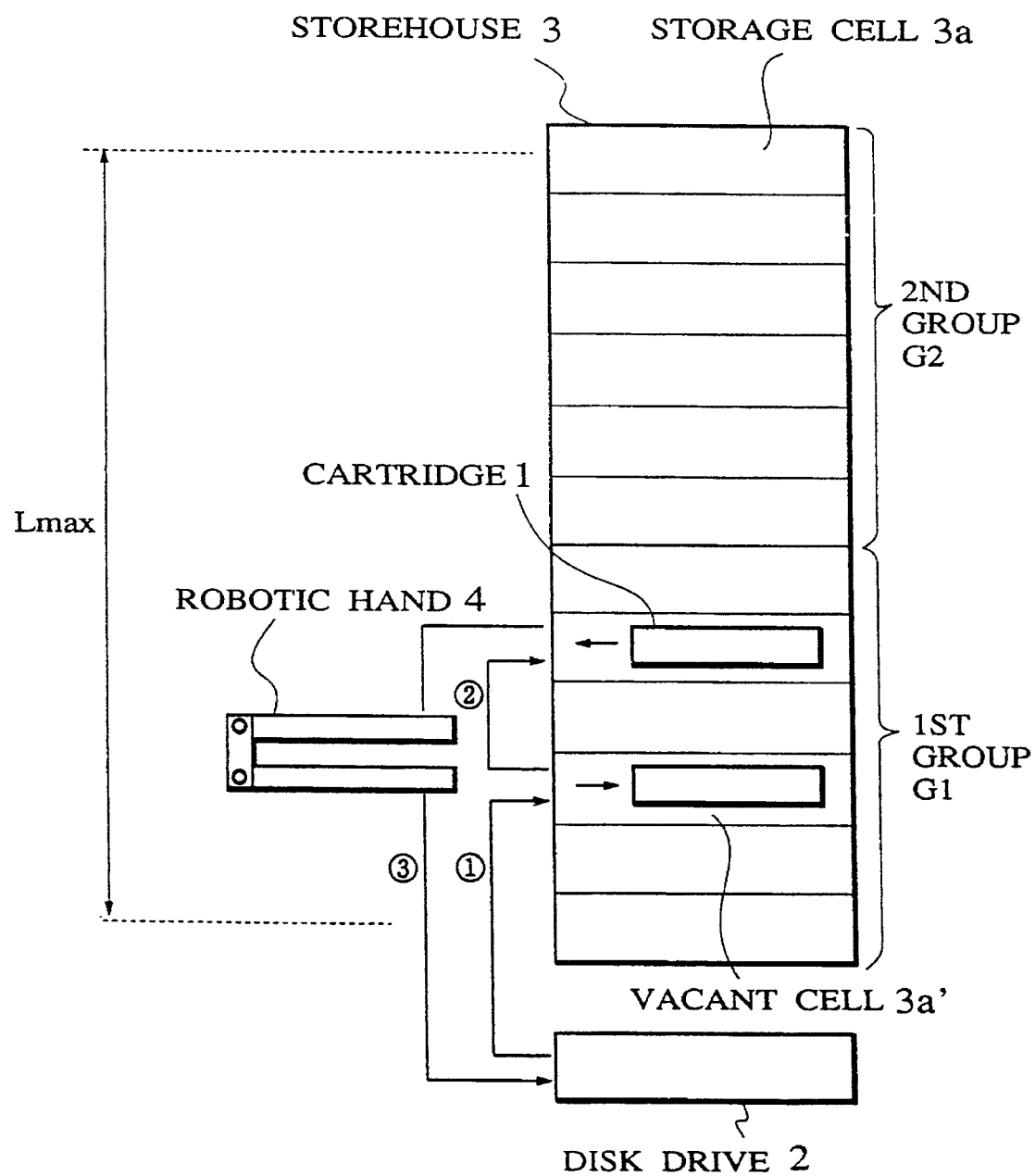
FIG. 3 is a diagram of a schematic configuration of a first embodiment of a media library system according to the present invention, showing a case of taking a new cartridge from a first group.

Referring now to FIG. 3, the first embodiment of a media library system according to the present invention will be described in detail.

In this first embodiment, the system has a schematic configuration as shown in FIG. 3 which comprises a storehouse 3 having a plurality of storage cells 3a for storing a plurality of cartridges 1, a disk drive 2 for driving a disk contained in each cartridge 1, a robotic hand 4 for carrying the cartridge 1 among the disk drive 2 and the storage cells 3a of the storehouse 3, a hand driving mechanism (not shown) for driving the robotic hand 4, and an access controller (not shown) for controlling the hand driving mechanism according to the media management scheme characteristic of the present invention as will be described below.

The cartridge 1 contains an optical disk as a recording medium, and the access to the data recorded on the optical disk becomes possible as the cartridge 1 is mounted on the disk drive 2.

The disk drive 2 is formed by an optical disk drive device positioned below the storehouse 3, which carries out the data read/write operations with respect to the recording medium contained in the cartridge 1 mounted thereon.

The storehouse 3 has a plurality of storage cells 3a arranged along a vertical direction, where each storage cell 3a can store any one of the cartridges 1. Here, as indicated in FIG. 3, the storage cells 3a of the storehouse 3 are managed in at least two groups (two groups G1 and G2 in this embodiment), of which the first group G1 is a group of the storage cells 3a for which an average carrying distance to the disk drive 2 is relatively shorter while the second group G2 is a group of the storage cells 3a for which an average carrying distance to the disk drive 2 is relatively longer. In addition, the cartridges 1 are managed such that one vacant cell 3a' is always provided within the group G1.

The robotic hand 4 is driven by the hand driving mechanism and the access controller to move among the disk drive 2 and the storage cells 3a of the storehouse 3 so as to carry the cartridges 1 among the disk drive 2 and the storage cells 3a of the storehouse 3. Here, the detailed configuration of this robotic hand 4 is substantially similar to that used in the conventionally known media library system, so that its explanation will be omitted here. The movement of this robotic hand 4 is controlled by a program loaded in the access controller according to a utilization frequency of each cartridge 1, i.e., a frequency determined by a number of times for which each cartridge 1 has been mounted on the disk drive 2 within a prescribed period of time, which is memorized in the access controller as well be described in detail below.

Figure 4:
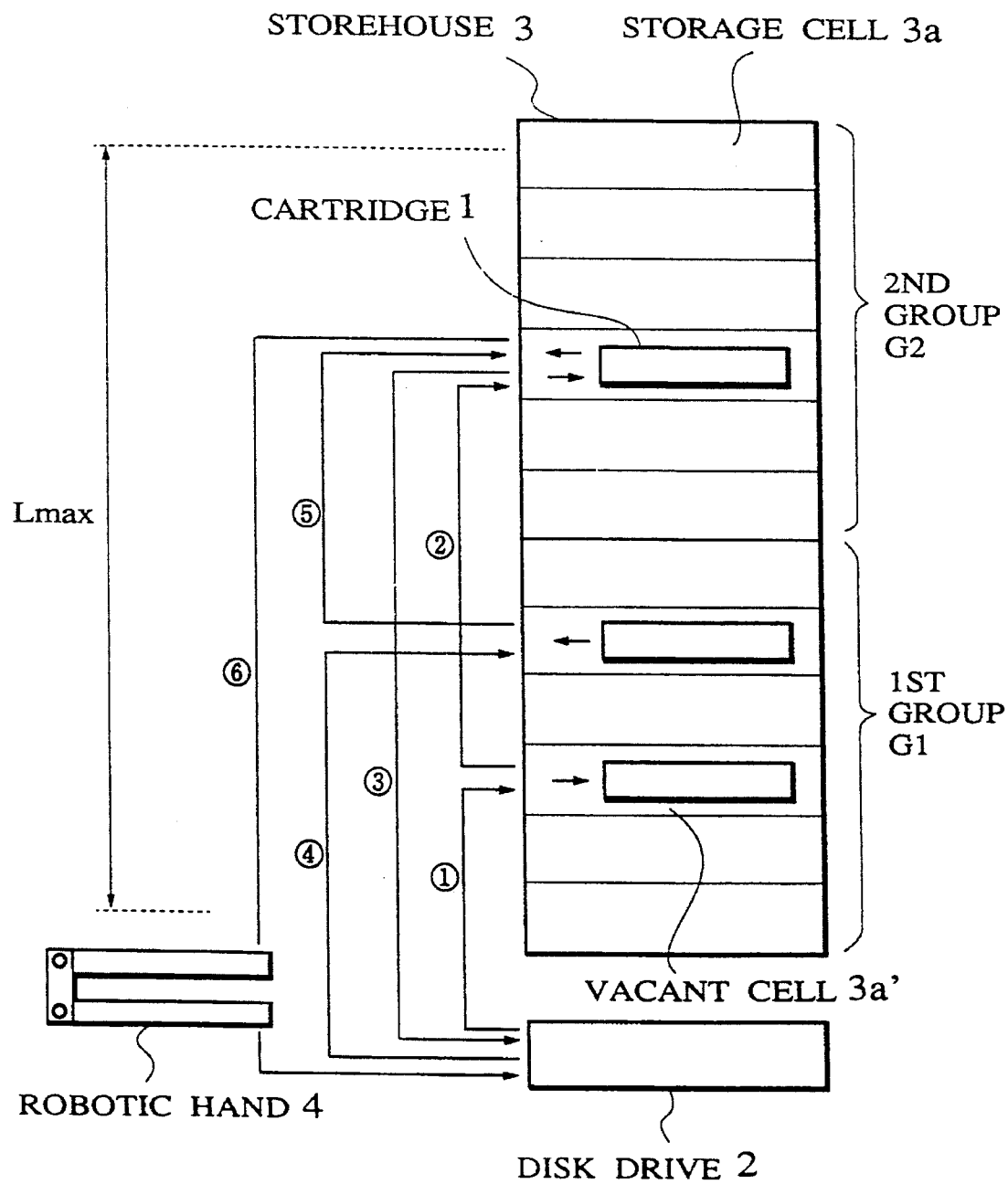
FIG. 4 is a diagram of a schematic configuration of a first embodiment of a media library system according to the present invention, showing a case of taking a new cartridge from a second group.
Figure 5:
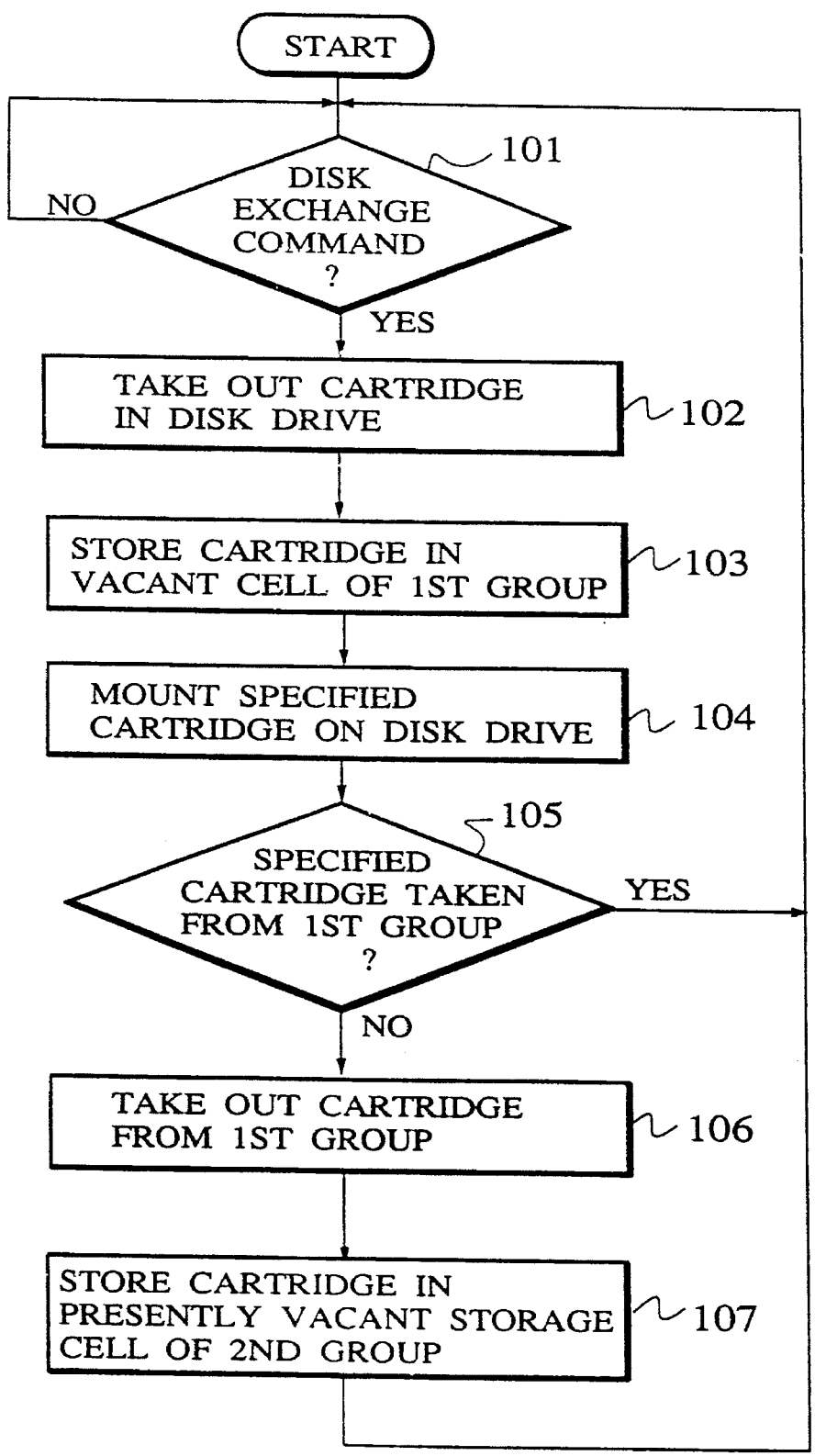
FIG. 5 is a flow chart for a disk exchange operation in the first embodiment of FIGS. 3 and 4.

In this media library system of FIG. 3, the cartridge 1 mounted on the disk drive 2 is exchanged with another cartridge 1 stored in the storehouse 3 by the operation of the robotic hand 4 as indicated in FIGS. 3 and 4, according to the flow chart of FIG. 5 as follows. In FIGS. 3 and 4, the encircled numbers accompanying arrows indicate the orders of the movements of the robotic hand 4.

First, whether a disk exchange command is issued or not is judged (step 101), and if so, the robotic hand takes out the cartridge 1 currently mounted on the disk drive 2 (step 102) and moves to the vacant cell 3a' of the first group G1 in the storehouse 3 (arrow ①) so as to store this cartridge 1 in the vacant cell 3a' (step 103). Next, the robotic hand 4 moves to the storage cell 3a storing a next cartridge 1 to be mounted to the disk drive 2 which is specified by the disk exchange command (arrow ②) to take out the next cartridge 1 from this storage cell 3a, and then moves to the disk drive 2 (arrow ③) to mount the next cartridge 1 on the disk drive 2 (step 104). The data read/write operation with respect to the next cartridge 1 is then carried out at the disk drive 2, so that the time required for the operations up to this point defines the access time.

Next, whether the specified cartridge 1 has been taken from the storage cell 3a of the first group G1 at the step 104 or not is judged (step 105). When the specified cartridge 1 has been taken from the storage cell 3a of the first group G1 as indicated in FIG. 3 (step 105 YES), this storage cell will serve as a vacant cell 3a' in the next disk exchange operation, so that the process returns to the step 101 to await for the next disk exchange command.

On the other hand, when the specified cartridge 1 has been taken from the storage cell 3a of the second group G2 as indicated in FIG. 4 (step 105 NO), there is a need to create a new vacant cell 3a' for the purpose of the next disk exchange operation. To this end, the robotic hand 4 is moved to the storage cell 3a storing the cartridge 1 with the lowest utilization frequency among the cartridges 1 stored in the first group G1 according to the data memorized in the access controller (arrow ④) so as to take out this cartridge 1 with the lowest utilization frequency (step 106). Then, the robotic hand 4 is moved to the storage cell 3a in the second group G2 from which the specified cartridge 1 has been taken out at the step 104, which is presently vacant (arrow ⑤) and stores the cartridge 1 with the lowest utilization frequency into that presently vacant storage cell 3a in the second group G2 (step 107) so as to create a new vacant cell 3a' in the first group G1. Then, the robotic hand 4 is moved back to the position of the disk drive 2 (arrow ⑥) while the process returns to the step 101 to await for the next disk exchange command.

In this manner, the vacant cell 3a' is always secured within the first group G1 after the rearrangement of the cartridges 1 is completed. This rearrangement of the cartridges 1 at the steps 106 and 107 can be carried out by utilizing any available idle time after the disk exchange operation at the steps 102 to 104. As a result of this rearrangement of the cartridges 1, it becomes possible to store those cartridges 1 which have higher utilization frequencies in the storage cells 3a of the first group G1 for which the carrying distances with respect to the disk drive 2 are relatively shorter, so that the probability for the exchange of the cartridges 1 to take a shorter time can be increased and consequently the average moving distance of the robotic hand 4 can be reduced.

Now, the effect of the reduction of the average access time in this media library system of the first embodiment will be explained in comparison to the conventional media library system. Here, for the sake of simplicity, the shortest access distance from the disk drive 2 is set to be 0 while the longest access distance from the disk drive 2 to the storehouse 3 is set to be Lmax.

Figure 1:
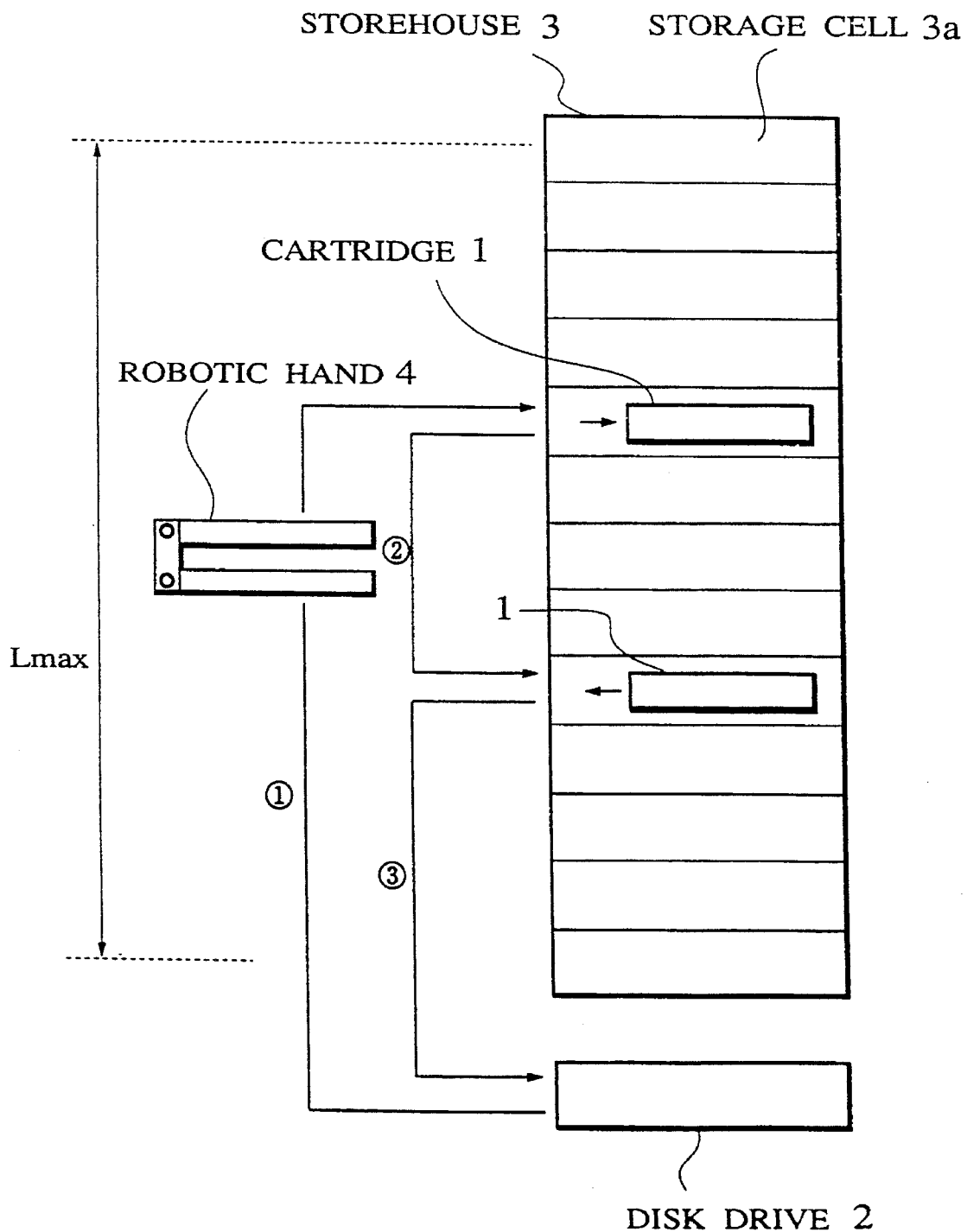
FIG. 1 is a diagram of a schematic configuration of one example of a conventional optical disk library system.

In a case of the conventional media library system as shown in FIG. 1, in a process of returning the cartridge 1 mounted on the disk drive 2 to a prescribed storage cell 3a of the storehouse 3, the prescribed storage cell 3a to which the cartridge 1 is to be returned can be located at any position between both ends of the storehouse 3 at an equal probability, so that the average moving distance of the robotic hand 4 is going to be Lmax/2. Next, in moving from there to the storage cell 3a storing the specified next cartridge 1, the robotic hand 4 is going to move between arbitrary two storage cells 3a on average, so that the average moving distance of the robotic hand 4 for this movement is going to be approximately Lmax/3. Finally, in carrying the specified next cartridge 1 from the storage cell 3a of the storehouse 3 to the disk drive 2, the average moving distance of the robotic hand 4 is going to be the same as that in a process of returning the cartridge 1 from the disk drive 2 to the storehouse 3 on average, so that it is going to be Lmax/2.

Consequently, the average moving distance of the robotic hand 4 required in carrying out the data read/write operation with respect to the recording medium in any desired cartridge 1 is going to be:

$$Lmax/2+Lmax/3+Lmax/2=4Lmax/3 \tag{1}$$

in the conventional media library system.

On the other hand, in the first embodiment of FIG. 3, the previous cartridge 1 is going to be stored in the vacant cell 3a' of the first group G1 in the storehouse 3 which is located at an arbitrary position in the first group G1, so that the average moving distance of the robotic hand 4 is going to be Lmax/4. Then, in moving from there to the storage cell 3a storing the specified next cartridge 1 and carrying the specified next cartridge 1 from the storage cell 3a of the storehouse 3 to the disk drive 2, when the specified cartridge 1 is selected from the first group G1 as shown in FIG. 3, on average, the robotic hand 4 is going to move for Lmax/6 between arbitrary two points within the first group G1 and then for Lmax/4 from there to the disk drive 2. In this case, the rearrangement of the cartridges is not carried out as the vacant cell 3a' is already secured in the first group G1.

Also, when the specified cartridge 1 is selected from the second group G2 as shown in FIG. 4, the rearrangement of the cartridges is carried out in addition. In this case, after moving for Lmax/4 to store the previous cartridge 1 in the vacant cell 3a' of the first group G1, on average, the robotic hand 4 is going to move for Lmax/2 from the vacant cell 3a' of the first group G1 to the storage cell 3a storing the specified next cartridge 1, and then for 3Lmax/4 to carry the specified next cartridge 1 from that storage cell 3a to the disk drive 2. Then, for the sake of the rearrangement of the cartridges, on average, the robotic hand 4 is going to move for Lmax/4 from the disk drive 2 to the storage cell 3a storing the cartridge 1 with the lowest utilization frequency in the first group G1, and then for Lmax/2 from there to the storage cell 3a in the second group G2 from which the specified cartridge 1 has been taken, and finally for 3Lmax/4 from there to the disk drive 2 to get ready for the next disk exchange operation.

Now, in this first embodiment, when the probability for the specified cartridge 1 to be present in the first group G1 is set to $\alpha_1$ ($1 \geq \alpha_1 \geq 0.5$) while the probability for the specified cartridge 1 to be present in the second group G2 is set to $1\alpha_1$, the average moving distance of the robotic hand 4 required in mounting the specified cartridge 1 on the disk drive 2 is given by:

$$\text{Average moving distance for access (\# of groups = 2)} = \quad (2)$$
$$Lmax/4 + \alpha_1 (Lmax/6 + Lmax/4) +$$
$$(1 - \alpha_1) (Lmax/2 + 3Lmax/4) = 3Lmax/2 - 5\alpha_1 \cdot Lmax/6$$

Then, if it is assumed that all the related data to be accessed successively are stored in a plurality of cartridges 1 gathered in the first group G1, i.e., $\alpha_1=1$, the specified cartridge 1 is always going to be present in the first group G1, so that the average moving distance for access in this case is going to be 2Lmax/2 according to the above equation (2), which amounts to the approximately 50% reduction of the average moving distance compared with a case of the conventional media library system given by the above equation (1).

Moreover, even if it is assumed that the related data to be accessed successively are distributed at random over the first and second groups G1 and G2, i.e., $\alpha_1=0.5$, the average moving distance for access is going to be 13Lmax/12 according to the above equation (2), which still amounts to the approximately 25% reduction of the average moving distance compared with a case of the conventional media library system given by the above equation (1).

Also, in a case of carrying out the rearrangement of the cartridges 1 as the specified cartridge 1 is taken from the second group G2 as shown in FIG. 4, the average moving distance of the robotic hand 4 required for this rearrangement of the cartridges 1 is given by:

$$\text{Average moving distance for rearrangement (\# of groups = 2)} = \quad (3)$$
$$(1 - \alpha_1) (Lmax/4 + Lmax/2 + 3Lmax/4) = (1 - \alpha_1) \cdot 3Lmax/2$$

Then, if it is assumed that most of the related data to be accessed successively are stored in a plurality of cartridges 1 gathered in the first group G1, i.e., nearly $\alpha_1=1$, this rearrangement of the cartridges 1 is scarcely required.

Even if it is assumed that the related data to be accessed successively are distributed at random over the first and second groups G1 and G2, i.e., $\alpha_1=0.5$, the robotic hand 4 is going to move 1.5 times on average, and the average moving distance is going to be 3Lmax/4 according to the above equation (3), so that it is not much different from the moving distance required in the carrying the specified cartridge 1.

Moreover, usually, this rearrangement of the cartridges 1 is carried out by utilizing the idle time after the completion of the disk exchange, so that it does not affect the average access time characteristic of the media library system.

Now, as a modification of the first embodiment described above, a case of dividing the storehouse 3 into four groups according to the differences in the distance with respect to the disk drive 2 will be described.

Figure 6:
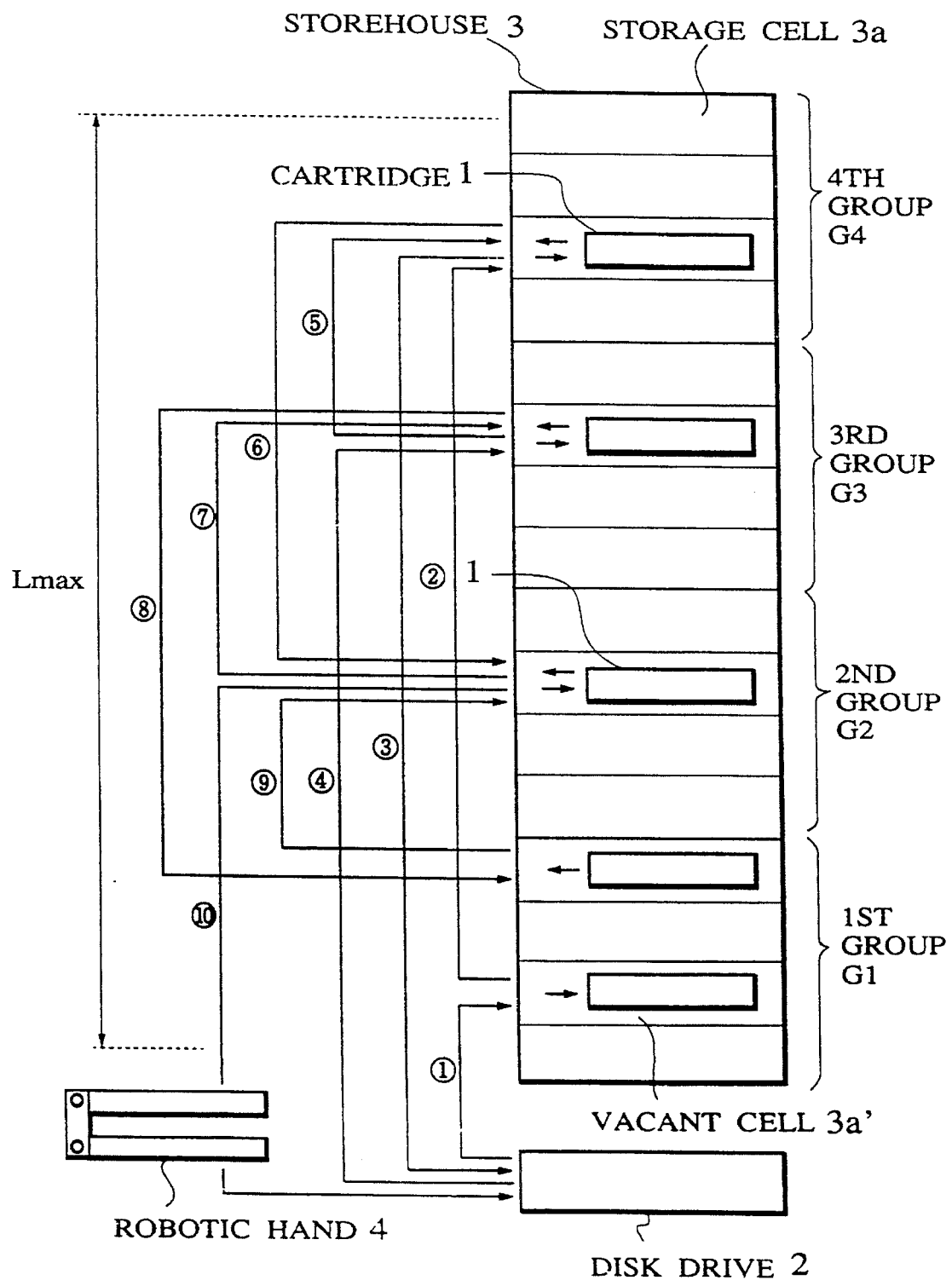
FIG. 6 is a diagram of a schematic configuration of one modification of the first embodiment of FIGS. 3 and 4, showing a case of using four groups.

In this case, the system has a schematic configuration as shown in FIG. 6, where the same reference numerals as in FIG. 3 described above are used for the corresponding elements of the system. Here, as indicated in FIG. 6, the storage cells 3a of the storehouse 3 are managed in four groups G1, G2, G3, and G4 in a descending order of closeness to the disk drive 2. Also, the cartridges 1 are managed such that one vacant cell 3a' is always provided within the group G1 just as in a case of FIG. 3.

Figure 7:
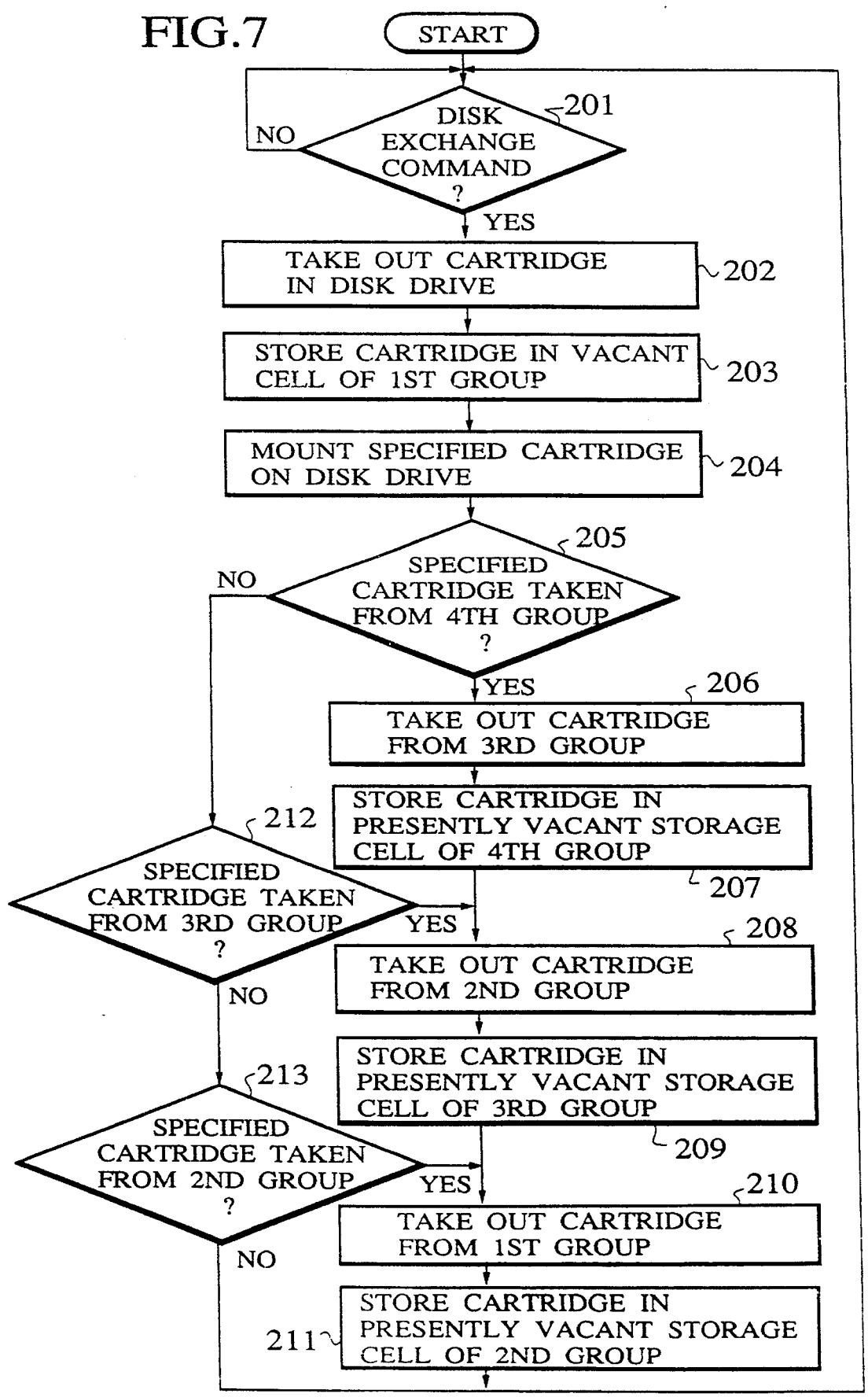
FIG. 7 is a flow chart for a disk exchange operation in the modification of FIG. 6.

In this media library system of FIG. 6, the cartridge 1 mounted on the disk drive 2 is exchanged with another cartridge 1 stored in the storehouse 3 by the operation of the robotic hand 4 as indicated in FIG. 6, according to the flow chart of FIG. 7 as follows. In FIG. 6, the encircled numbers accompanying arrows indicate the orders of the movements of the robotic hand 4 as before.

First, whether a disk exchange command is issued or not is judged (step 201), and if so, the robotic hand takes out the cartridge 1 currently mounted on the disk drive 2 (step 202) and moves to the vacant cell 3a' of the first group G1 in the storehouse 3 (arrow ①) so as to store this cartridge 1 in the vacant cell 3a' (step 203). Next, the robotic hand 4 moves to the storage cell 3a storing a next cartridge 1 to be mounted to the disk drive 2 which is specified by the disk exchange command (arrow ②) to take out the next cartridge 1 from this storage cell 3a, and then moves to the disk drive 2 (arrow ③) to mount the next cartridge 1 on the disk drive 2 (step 204). The data read/write operation with respect to the next cartridge 1 is then carried out at the disk drive 2, so that the time required for the operations up to this point defines the access time.

Next, whether the specified cartridge 1 has been taken from the storage cell 3a of the fourth group G4 at the step 204 or not is judged (step 205). When the specified cartridge 1 has been taken from the storage cell 3a of the fourth group G4 as shown in FIG. 6 (step 205 YES), the robotic hand 4 is moved to the storage cell 3a storing the cartridge 1 with the lowest utilization frequency among the cartridges 1 stored in the third group G3 according to the data memorized in the access controller (arrow ④) to take out this cartridge 1 (step 206), and then moved to the storage cell 3a in the fourth group G4 from which the specified cartridge 1 has been taken out at the step 204 and which is presently vacant (arrow ⑤), and stores this cartridge 1 into that presently vacant storage cell 3a in the fourth group G4 (step 207).

Then, similarly, the robotic hand 4 is moved to the storage cell 3a storing the cartridge 1 with the lowest utilization frequency among the cartridges 1 stored in the second group G2 according to the data memorized in the access controller (arrow ⑥) to take out this cartridge 1 (step 208), and then moved to the storage cell 3a in the third group G3 from which the cartridge 1 with the lowest utilization frequency has been taken out at the step 206 and which is presently vacant (arrow ⑦), and stores this cartridge 1 into that presently vacant storage cell 3a in the third group G3 (step 209).

Also, similarly, the robotic hand 4 is moved to the storage cell 3a storing the cartridge 1 with the lowest utilization frequency among the cartridges 1 stored in the first group G1 according to the data memorized in the access controller (arrow ⑧) to take out this cartridge 1 (step 210), and then moved to the storage cell 3a in the second group G2 from which the cartridge 1 with the lowest utilization frequency has been taken out at the step 208 and which is presently vacant (arrow ⑨), and stores this cartridge 1 into that presently vacant storage cell 3a in the second group G2 (step 211), so as to create a new vacant cell 3a' in the first group G1. Then, the robotic hand 4 is moved back to the position of the disk drive 2 (arrow ⑩) while the process returns to the step 201 to await for the next disk exchange command.

On the other hand, when the specified cartridge 1 has not been taken from the storage cell 3a of the fourth group G4 (step 205 NO), whether the specified cartridge 1 has been taken from the storage cell 3a of the third group G3 at the step 204 or not is judged (step 212). When the specified cartridge 1 has been taken from the storage cell 3a of the third group G3 (step 212 YES), the above described steps 208 to 211 are carried out to make the rearrangement from the second group G2 to the third group G3 and the rearrangement from the first group G1 to the second group G2, and then the process returns to the step 201 to await for the next disk exchange command.

Also, when the specified cartridge 1 has not been taken from the storage cell 3a of the third group G3 or the fourth group G4 (step 212 NO), whether the specified cartridge 1 has been taken from the storage cell 3a of the second group G2 at the step 204 or not is judged (step 213). When the specified cartridge 1 has been taken from the storage cell 3a of the second group G2 (step 213 YES), the above described steps 210 and 211 are carried out to make the rearrangement from the first group G1 to the second group G2, and then the process returns to the step 201 to await for the next disk exchange command.

Also, when the specified cartridge 1 has not been taken from the storage cell 3a of any of the second group G2, the third group G3, and the fourth group G4, (step 213 NO), it implies that the specified cartridge 1 has been taken from the storage cell 3a of the first group G1, in which case this storage cell will serve as a vacant cell 3a' in the next disk exchange operation, so that the process returns to the step 201 to await for the next disk exchange command, without making any rearrangement.

In this manner, the vacant cell 3a' is always secured within the first group G1 after the rearrangement of the cartridges 1 is completed. This rearrangement of the cartridges 1 at the steps 206 to 213 can be carried out by utilizing any available idle time after the disk exchange operation at the steps 202 to 204. As a result of this rearrangement of the cartridges 1, it becomes possible to store those cartridges 1 which have higher utilization frequencies in the storage cells 3a of the group for which the carrying distances with respect to the disk drive 2 are relatively shorter, so that the probability for the exchange of the cartridges 1 to take a shorter time can be increased and consequently the average moving distance of the robotic hand 4 can be reduced, just as in a case of FIG. 3.

In this case, when the probability for the specified cartridge 1 to be present in the n-th group is set to $\alpha_n$, by the manner similar to that for obtaining the above equation (2), the average moving distance of the robotic hand 4 required in mounting the specified cartridge 1 on the disk drive 2 is given by:

$$\text{Average moving distance for access (\# of groups = 4)} = \quad (4)$$
$$Lmax/8 + \alpha_1 (Lmax/12 + Lmax/8) + \alpha_2 (Lmax/4 + 3Lmax/8) +$$
$$\alpha_3 (Lmax/2 + 5Lmax/8) + \alpha_4 (3Lmax/4 + 7Lmax/8) =$$
$$(3 + 5\alpha_1 + 15\alpha_2 + 27\alpha_3 + 39\alpha_4) \cdot Lmax/24$$

Then, if it is assumed that most of the related data to be accessed successively are stored in a plurality of cartridges 1 gathered in the first group G1, i.e., nearly $\alpha_1=1$, the average moving distance for access in this case is going to be Lmax/3 according to the above equation (4), which amounts to the approximately 75% reduction of the average moving distance compared with a case of the conventional media library system given by the above equation (1).

Moreover, even if it is assumed that the related data to be accessed successively are distributed at random over the four groups G1, G2, G3, and G4, i.e., $\alpha_1=\alpha_2=\alpha_3=\alpha_4=0.25$, the average moving distance for access is going to be 49Lmax/48 according to the above equation (4), which still amounts to the approximately 30% reduction of the average moving distance compared with a case of the conventional media library system given by the above equation (1).

Also, in a case of carrying out the rearrangement of the cartridges 1, by the manner similar to that for obtaining the above equation (3), the average moving distance of the robotic hand 4 required for this rearrangement of the cartridges 1 is given by:

$$\text{Average moving distance for rearrangement (\# of groups = 4)} = \quad (5)$$
$$\alpha_2 (Lmax/8 + Lmax/4 + 3Lmax/8) + \alpha_3 (3Lmax/8 + Lmax/4) +$$
$$\alpha_3 (Lmax/2 + Lmax/4 + 3Lmax/8) + \alpha_4 (5Lmax/8 + Lmax/4) +$$
$$\alpha_4 (Lmax/2 + Lmax/4) + \alpha_4 (Lmax/2 + Lmax/4 + 3Lmax/8) =$$
$$6\alpha_2 \cdot Lmax/8 + 14\alpha_3 \cdot Lmax/8 + 22\alpha_4 \cdot Lmax/8$$

Then, if it is assumed that most of the related data to be accessed successively are stored in a plurality of cartridges 1 gathered in the first group G1, i.e., nearly $\alpha_1=1$, this rearrangement of the cartridges 1 is scarcely required.

Even if it is assumed that the related data to be accessed successively are distributed at random over the four groups G1, G2, G3, and G4, i.e., $\alpha_1=\alpha_2=\alpha_3=\alpha_4=0.25$, the robotic hand 4 is going to move four times on average, and the average moving distance is going to be 21Lmax/16 according to the above equation (5), so that it is not much different from the moving distance required in the carrying the specified cartridge 1.

Moreover, usually, this rearrangement of the cartridges 1 is carried out by utilizing the idle time after the completion of the disk exchange, so that it does not affect the average access time characteristic of the media library system, just as in a case of FIG. 3.

It is to be noted here that, instead of determining the utilization frequency of each cartridge 1 according to a number of times for which each cartridge 1 has been mounted on the disk drive 2 within a prescribed period of time as described above, it is also possible to determine the utilization frequency as a sum of a frequency determined by the number of times for which each cartridge 1 has been mounted on the disk drive 2 within a prescribed period of time and a frequency determined by a time elapsed since the last time each cartridge 1 has been taken out from the disk drive 2.

Namely, a scheme for determining the utilization frequency according to a number of times for which each cartridge 1 has been mounted on the disk drive 2 is suitable in a case each cartridge 1 is accessed at more or less constant time interval, as in a case of accumulating observation or monitoring data at constant time interval for example. However, this scheme may not necessarily suitable for a case in which a large number of accesses are going to be concentrated within a short period of time to the particular data stored in a certain recording medium of a certain cartridge 1, as in a case of a ticket sales service with a predetermined service starting time in which there is a very high probability for the cartridge 1 that has been accessed once to be accessed again within a short period of time.

In such a case, by determining the utilization frequency as a sum of a frequency determined according to a number of times for which each cartridge 1 has been mounted on the disk drive 2 and a frequency determined by a time elapsed since the last time each cartridge 1 has been taken out from the disk drive 2, it becomes possible to keep each cartridge 1 that has been accessed once within the first group G1 for a certain period of time, such that the mounting of the same cartridge 1 to the disk drive 2 can be carried out instantaneously and consequently the average moving distance of the robotic hand 4 can be reduced while the same data are intensively utilized. In this case, the frequency determined by a time elapsed since the last time each cartridge 1 has been taken out from the disk drive 2 is going to be set higher for the shorter elapsed time.

It is noted here that in a case a temporal increase of the cartridge exchange frequency can be expected as a plurality of disk drives 2 are provided along with a single robotic hand 4 for carrying the cartridges 1, it is also possible to provide a plurality of vacant cells $3a'$ in the first group G1 for storing a plurality of previous cartridges 1 taken out from the disk drives 2 such that the rearrangement of the cartridges can be carried out collectively with respect to all these vacant cells $3a'$ at once, after a plurality of specified cartridges 1 are mounted on the disk drives 2.

It is also to be noted here that the recording medium other than the optical disk used in this first embodiment, such as the magnetic disk or the magnetic tape can be used without affecting the essence of the present invention. Moreover, instead of containing the recording medium within a cartridge I as described above, the recording medium may be handled directly, if desired. Furthermore, the storehouse 3 may have the storage cells arranged in the horizontal direction as well as the vertical direction if desired, by modifying the robotic hand 4 to be capable of moving in both vertical and horizontal directions.

As described, according to the media library system of this first embodiment, at a time of exchanging the cartridges 1, the cartridge 1 taken out from the disk drive 2 is stored in the vacant cell $3a'$ of the first group G1 which is relatively closer to the disk drive 2, and then the specified cartridge 1 is taken out from the storage cell $3a$ of any group and mounted on the disk drive 2, so that it becomes possible to exchange the cartridges 1 in a very short period of time.

In addition, in a case the specified cartridge 1 is taken out from the group other than the first group G1 which is relatively farther to the disk drive 2, the cartridge 1 with the lowest utilization frequency among each group closer to the disk drive 2 is sequentially moved to the adjacent group farther from the disk drive 2 so as to secure a new vacant cell $3a'$ in the first group G1, so that it is possible to put the cartridges 1 with the higher utilization frequencies in the first group G1 all the times, and consequently it is possible to reduce the average moving distance of the robotic hand 4 considerably. Here, the average moving distance of the robotic hand 4 decreases in counter-proportion to the number of groups by which the storehouse 3 is divided, and the substantial reduction of the average moving distance of the robotic hand 4 can be achieved even with the minimum configuration using only two groups.

Figure 8:
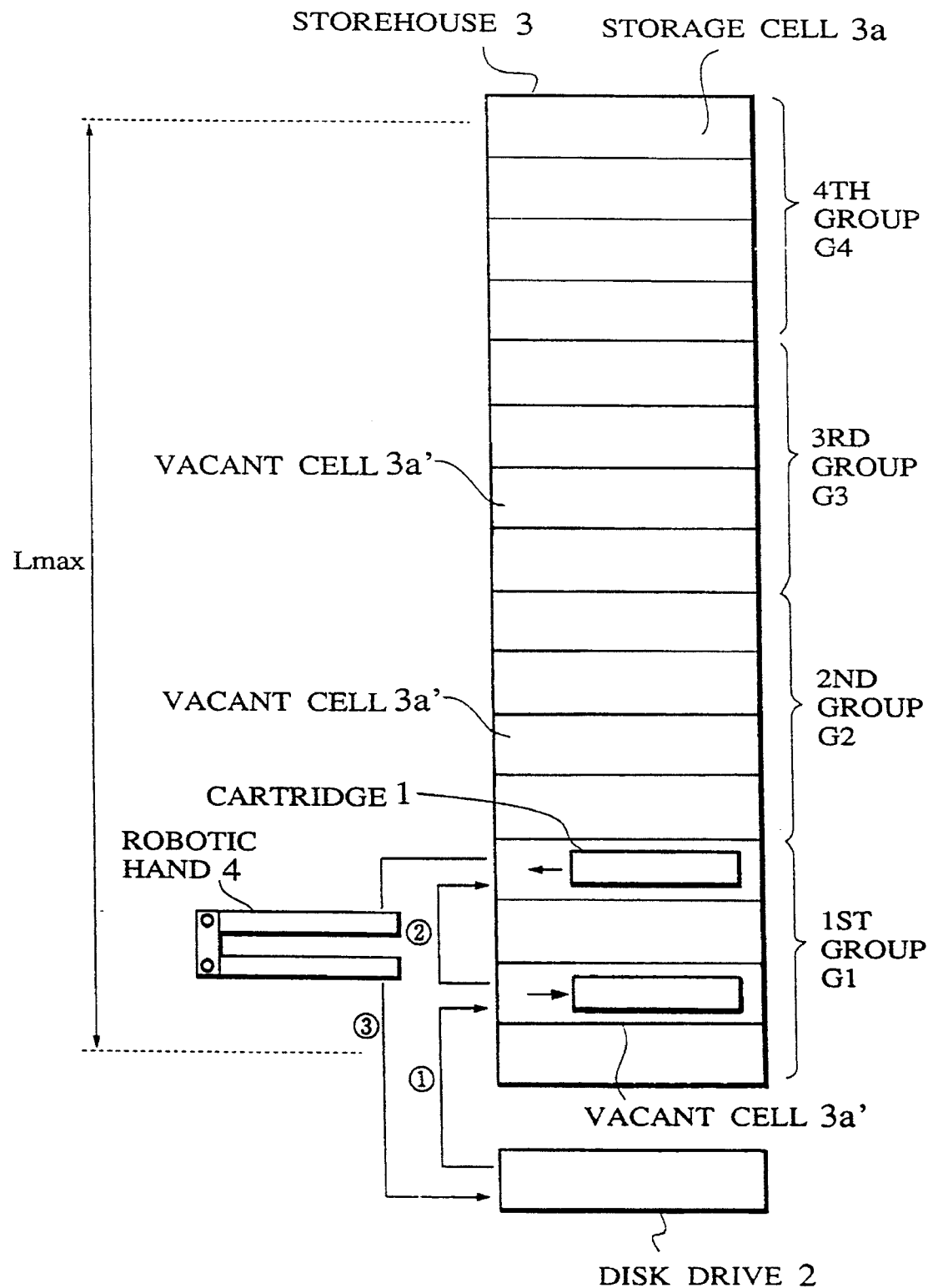
FIG. 8 is a diagram of a schematic configuration of a second embodiment of a media library system according to the present invention, showing a case of taking a new cartridge from a first group.

Referring now to FIG. 8, the second embodiment of a media library system according to the present invention will be described in detail.

In this second embodiment, the system has a schematic configuration as shown in FIG. 8, where the same reference numerals as in FIG. 3 described above are used for the corresponding elements of the system. Here, as indicated in FIG. 8, the storage cells $3a$ of the storehouse 3 are managed in at least three groups (four groups G1, G2, G3, and G4 in this embodiment) in a descending order of closeness to the disk drive 2. Also, the cartridges 1 are managed such that one vacant cell $3a'$ is always provided within each of the groups G1, G2, and G3, i.e., the groups other than the fourth group G4 which is farthest from the disk drive 2 among all the groups.

In this media library system of FIG. 8, the cartridge 1 mounted on the disk drive 2 is exchanged with another cartridge 1 stored in the storehouse 3 by the operation of the robotic hand 4 as indicated in FIGS. 8 to 11, according to the flow chart of FIG. 12 as follows. In FIGS. 8 to 11, the encircled numbers accompanying arrows indicate the orders of the movements of the robotic hand 4 as before.

First, whether a disk exchange command is issued or not is judged (step 301), and if so, the robotic hand takes out the cartridge 1 currently mounted on the disk drive 2 (step 302) and moves to the vacant cell $3a'$ of the first group G1 in the storehouse 3 (arrow ①) so as to store this cartridge 1 in the vacant cell $3a'$ (step 303). Next, the robotic hand 4 moves to the storage cell $3a$ storing a next cartridge 1 to be mounted to the disk drive 2 which is specified by the disk exchange command (arrow ②) to take out the next cartridge 1 from this storage cell $3a$, and then moves to the disk drive 2 (arrow ③) to mount the next cartridge 1 on the disk drive 2 (step 304). The data read/write operation with respect to the next cartridge 1 is then carried out at the disk drive 2, so that the time required for the operations up to this point defines the access time.

Next, whether the specified cartridge 1 has been taken from the storage cell $3a$ of the first group G1 at the step 304 or not is judged (step 305). When the specified cartridge 1 has been taken from the storage cell $3a$ of the first group G1 as indicated in FIG. 8 (step 305 YES), this storage cell will serve as a vacant cell $3a'$ of the first group G1 in the next disk exchange operation, so that the process returns to the step 301 to await for the next disk exchange command.

Figure 9:
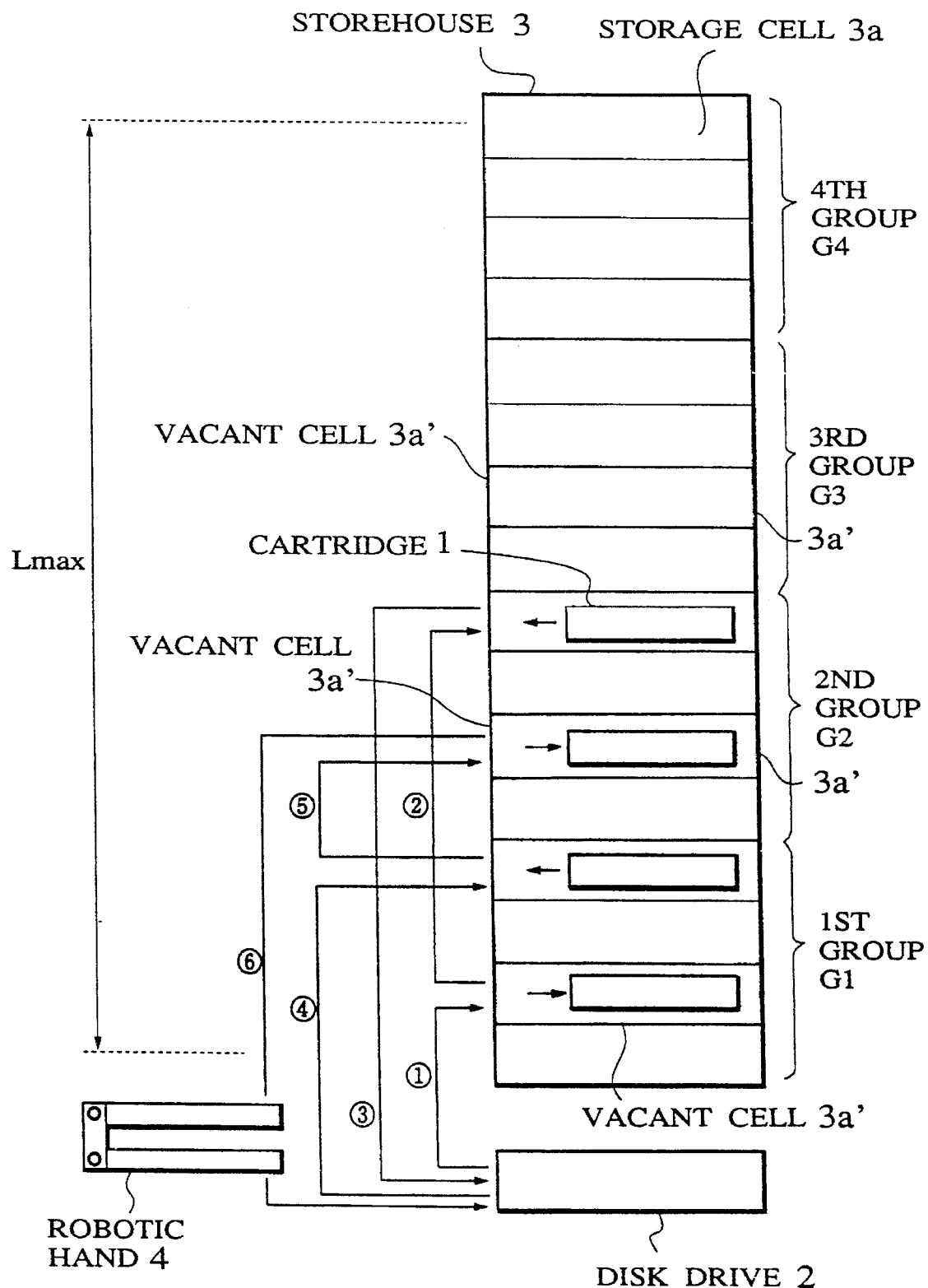
FIG. 9 is a diagram of a schematic configuration of a second embodiment of a media library system according to the present invention, showing a case of taking a new cartridge from a second group.
Figure 10:
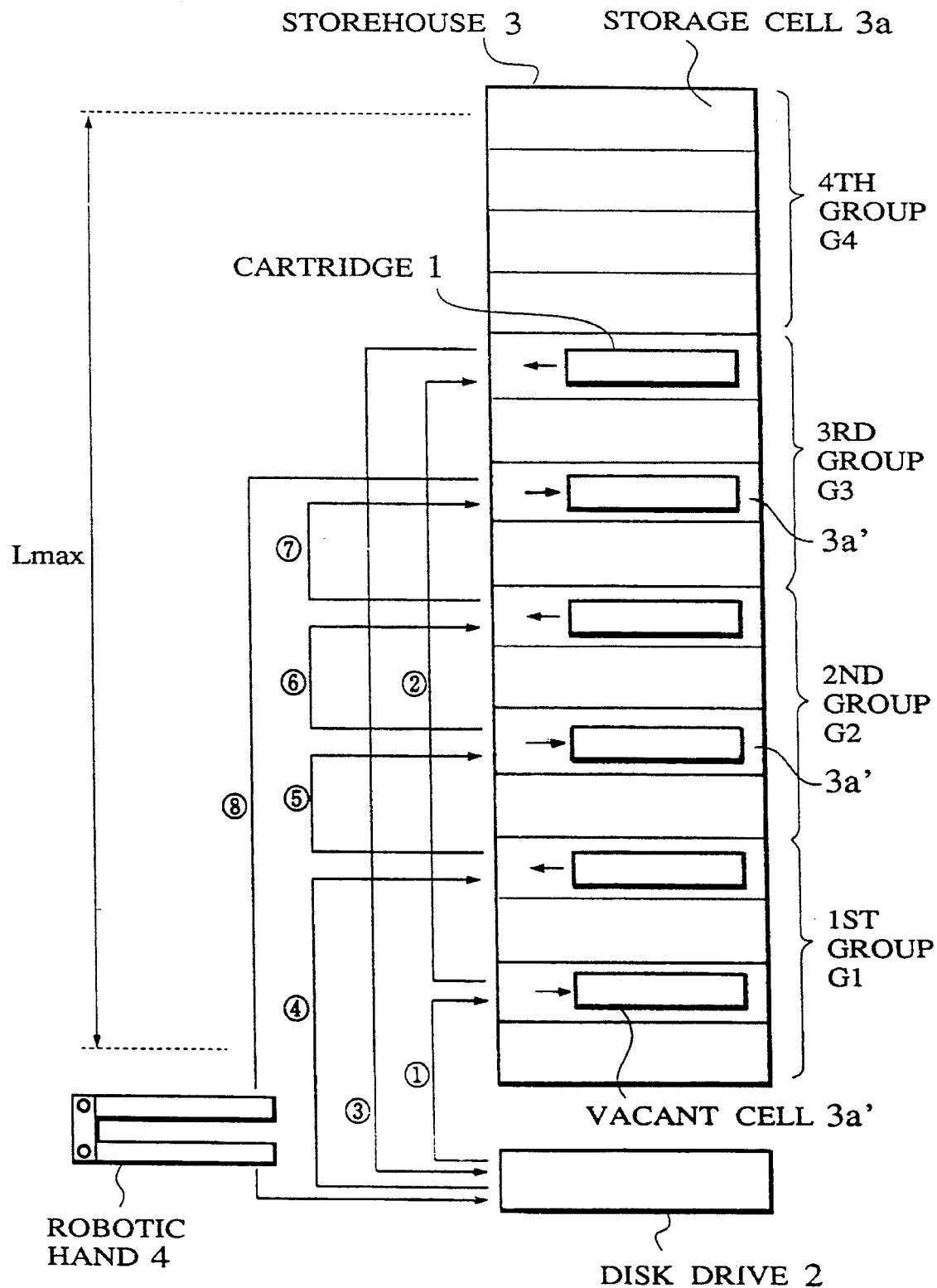
FIG. 10 is a diagram of a schematic configuration of a second embodiment of a media library system according to the present invention, showing a case of taking a new cartridge from a third group.
Figure 11:
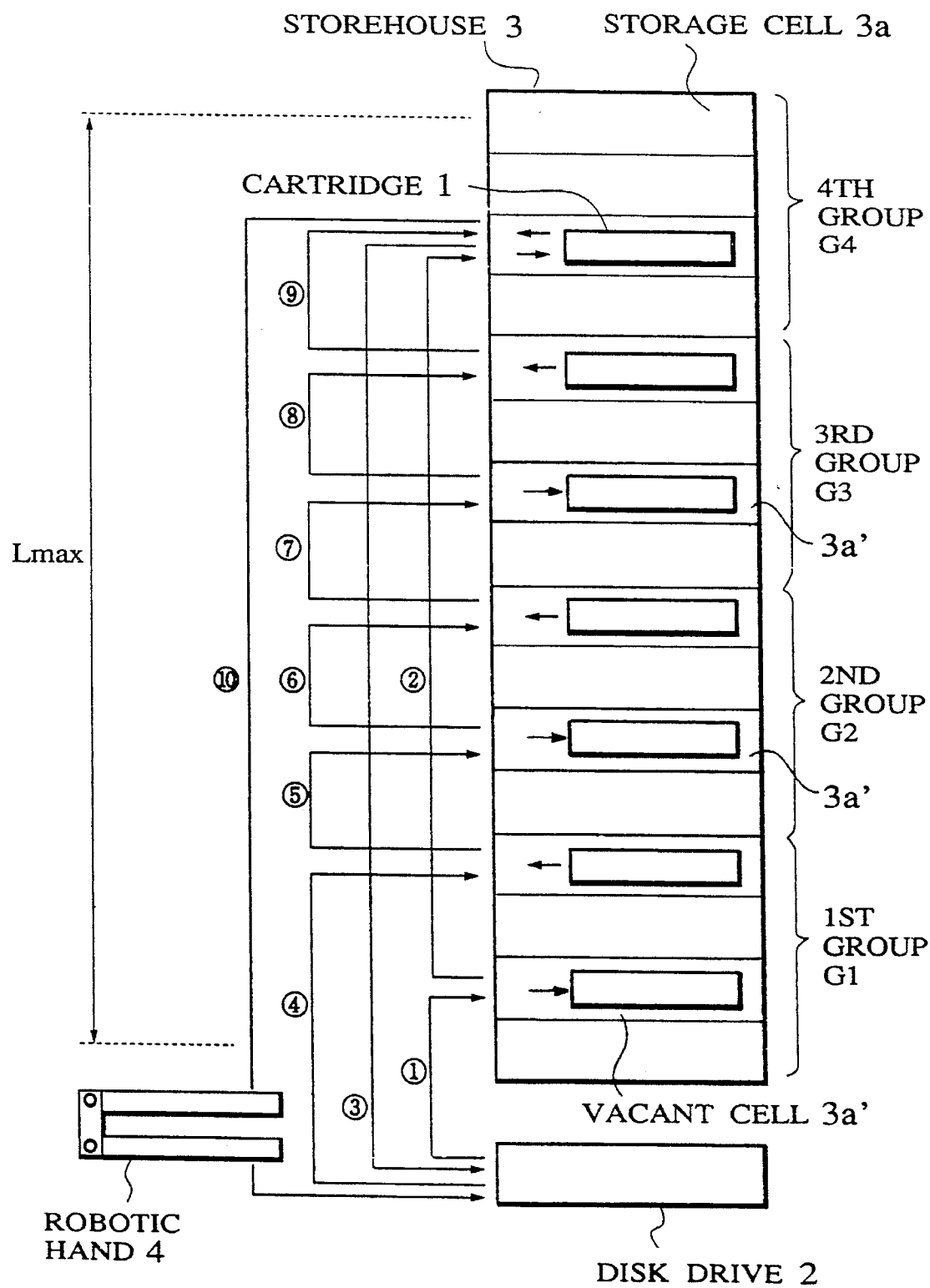
FIG. 11 is a diagram of a schematic configuration of a second embodiment of a media library system according to the present invention, showing a case of taking a new cartridge from a fourth group.
Figure 12:
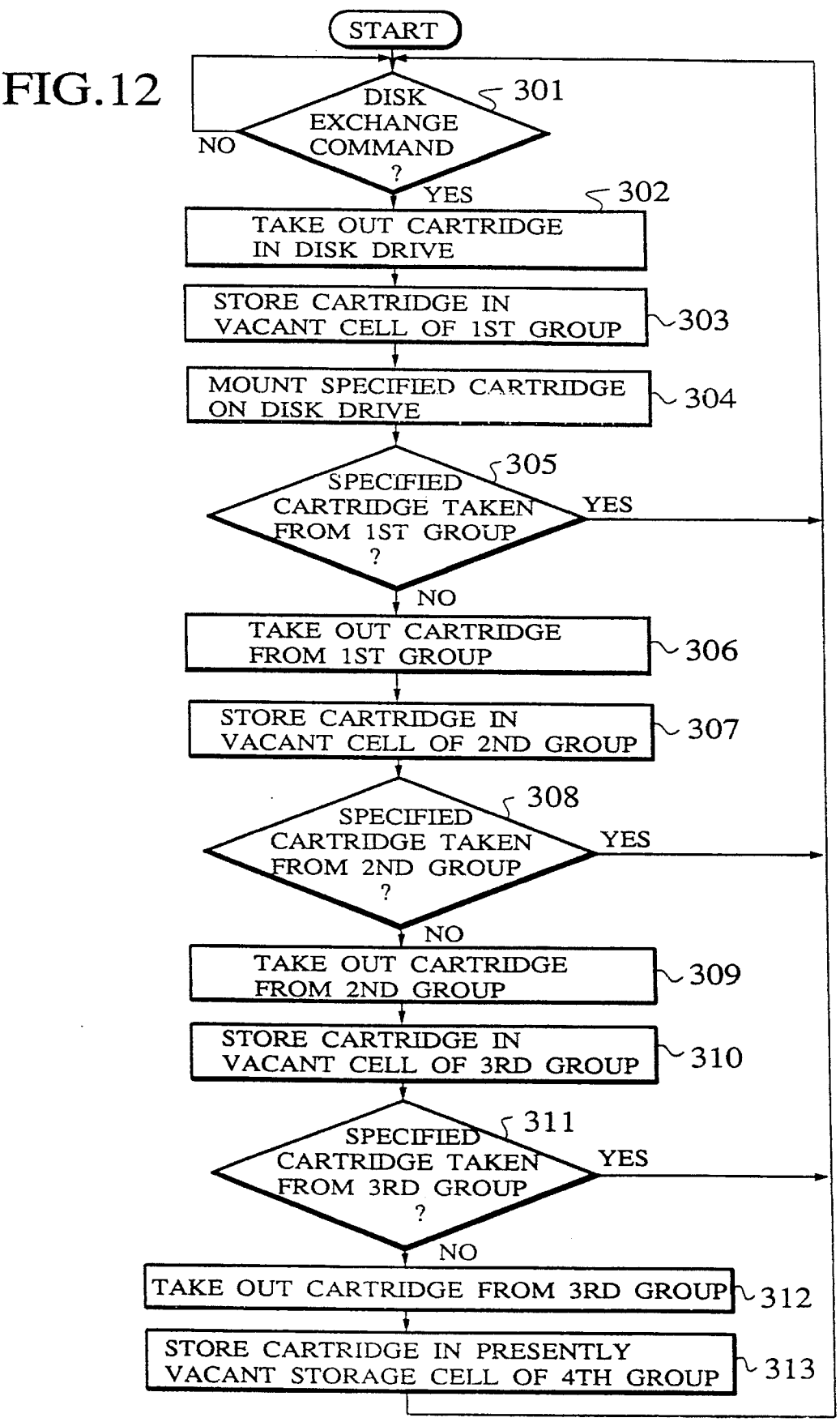
FIG. 12 is a flow chart for a disk exchange operation in the second embodiment of FIGS. 8 to 11.

On the other hand, when the specified cartridge 1 has not been taken from the storage cell $3a$ of the first group G1 as indicated in FIGS. 9 to 11 (step 305 NO), the robotic hand 4 is moved to the storage cell $3a$ storing the cartridge 1 with the lowest utilization frequency among the cartridges 1 stored in the first group G1 according to the data memorized in the access controller (arrow ④) so as to take out this cartridge 1 with the lowest utilization frequency (step 306). Then, the robotic hand 4 is moved to the vacant cell $3a'$ in the second group G2 (arrow ⑤) and stores the cartridge 1 with the lowest utilization frequency into the vacant cell $3a'$ in the second group G2 (step 307) so as to create a new vacant cell $3a'$ in the first group G1.

Next, whether the specified cartridge 1 has been taken from the storage cell $3a$ of the second group G2 at the step 304 or not is judged (step 308). When the specified cartridge 1 has been taken from the storage cell $3a$ of the second group G2 as indicated in FIG. 9 (step 308 YES), this storage cell will serve as a vacant cell $3a'$ of the second group G2 in the next disk exchange operation, so that the robotic hand 4 is moved back to the position of the disk drive 2 (arrow ⑥ of FIG. 9) while the process returns to the step 301 to await for the next disk exchange command.

On the other hand, when the specified cartridge 1 has not been taken from the storage cell 3a of the first and second groups G1 and G2 as indicated in FIGS. 10 and 11 (step 308 NO), the robotic hand 4 is moved to the storage cell 3a storing the cartridge 1 with the lowest utilization frequency among the cartridges 1 stored in the second group G2 according to the data memorized in the access controller (arrow ⑥ of FIGS. 10 and 11) so as to take out this cartridge 1 with the lowest utilization frequency (step 309). Then, the robotic hand 4 is moved to the vacant cell 3a' in the third group G3 (arrow ⑦) and stores the cartridge 1 with the lowest utilization frequency into the vacant cell 3a' in the third group G3 (step 310) so as to create a new vacant cell 3a' in the second group G2.

Next, whether the specified cartridge 1 has been taken from the storage cell 3a of the third group G3 at the step 304 or not is judged (step 311). When the specified cartridge 1 has been taken from the storage cell 3a of the third group G3 as indicated in FIG. 10 (step 311 YES), this storage cell will serve as a vacant cell 3a' of the third group G3 in the next disk exchange operation, so that the robotic hand 4 is moved back to the position of the disk drive 2 (arrow ⑧ of FIG. 10) while the process returns to the step 301 to await for the next disk exchange command.

On the other hand, when the specified cartridge 1 has not been taken from the storage cell 3a of the first, second, and third groups G1, G2, and G3 as indicated in FIG. 11 (step 311 NO), the robotic hand 4 is moved to the storage cell 3a storing the cartridge 1 with the lowest utilization frequency among the cartridges 1 stored in the third group G3 according to the data memorized in the access controller (arrow ⑧ of FIG. 11) so as to take out this cartridge 1 with the lowest utilization frequency (step 312). Then, the robotic hand 4 is moved to the storage cell 3a in the fourth group G4 from which the specified cartridge 1 has been taken out at the step 304 and which is presently vacant (arrow ⑨), and stores this cartridge 1 into that presently vacant storage cell 3a in the fourth group G4 (step 313). Then, the robotic hand 4 is moved back to the position of the disk drive 2 (arrow ⑩ of FIG. 11) while the process returns to the step 301 to await for the next disk exchange command.

In this manner, the vacant cell 3a' is always secured within each of the first, second, and third groups G1, G2, and G3 after the rearrangement of the cartridges 1 is completed. This rearrangement of the cartridges 1 at the steps 306 to 313 can be carried out by utilizing any available idle time after the disk exchange operation at the steps 302 to 304. As a result of this rearrangement of the cartridges 1, it becomes possible to arrange the cartridges 1 with the higher utilization frequencies in the groups with the shorter carrying distances, so that the probability for the exchange of the cartridges 1 to take a shorter time can be increased and consequently the average moving distance of the robotic hand 4 can be reduced.

Now, the effect of the reduction of the average access time in this media library system of the second embodiment will be explained in comparison to the conventional media library system. Here, for the sake of simplicity, the shortest access distance from the disk drive 2 is set to be 0 while the longest access distance from the disk drive 2 to the storehouse 3 is set to be Lmax.

In a case of the conventional media library system as shown in FIG. 1, the average moving distance of the robotic hand 4 required in carrying out the data read/write operation with respect to the recording medium in any desired cartridge 1 is given by the equation (1) as described above.

On the other hand, in the second embodiment of FIG. 8, the previous cartridge 1 is going to be stored in the vacant cell 3a' of the first group G1 in the storehouse 3 which is located at an arbitrary position in the first group G1, so that the average moving distance of the robotic hand 4 is going to be Lmax/8. Then, in moving from there to the storage cell 3a storing the specified next cartridge 1 and carrying the specified next cartridge 1 from the storage cell 3a of the storehouse 3 to the disk drive 2, when the specified cartridge 1 is selected from the first group G1 as shown in FIG. 8, on average, the robotic hand 4 is going to move for Lmax/12 between arbitrary two points within the first group G1 and then for Lmax/8 from there to the disk drive 2.

Also, when the specified cartridge 1 is selected from the second group G2 as shown in FIG. 9, after moving for Lmax/8 to store the previous cartridge 1 in the vacant cell 3a' of the first group G1, on average, the robotic hand 4 is going to move for Lmax/4 from the vacant cell 3a' of the first group G1 to the storage cell 3a storing the specified next cartridge 1, and then for 3Lmax/8 to carry the specified next cartridge 1 from that storage cell 3a to the disk drive 2.

Also, when the specified cartridge 1 is selected from the third group G3 as shown in FIG. 10, after moving for Lmax/8 to store the previous cartridge 1 in the vacant cell 3a' of the first group G1, on average, the robotic hand 4 is going to move for Lmax/2 from the vacant cell 3a' of the first group G1 to the storage cell 3a storing the specified next cartridge 1, and then for 5Lmax/8 to carry the specified next cartridge 1 from that storage cell 3a to the disk drive 2.

Also, when the specified cartridge 1 is selected from the fourth group G4 as shown in FIG. 11, after moving for Lmax/8 to store the previous cartridge 1 in the vacant cell 3a' of the first group G1, on average, the robotic hand 4 is going to move for 3Lmax/4 from the vacant cell 3a' of the first group G1 to the storage cell 3a storing the specified next cartridge 1, and then for 7Lmax/8 to carry the specified next cartridge 1 from that storage cell 3a to the disk drive 2.

Then, when the probability for the specified cartridge 1 to be present in the n-th group is set to $\alpha_n$, the average moving distance of the robotic hand 4 required in mounting the specified cartridge 1 on the disk drive 2 is given by the equation (4) as described above.

Here, if it is assumed that most of the related data to be accessed successively are stored in a plurality of cartridges 1 gathered in the first group G1, i.e., nearly $\alpha=1$, the average moving distance for access in this case is going to be Lmax/3 according to the above equation (4), which amounts to the approximately 75% reduction of the average moving distance compared with a case of the conventional media library system given by the above equation (1).

Moreover, even if it is assumed that the related data to be accessed successively are distributed at random over the four groups G1, G2, G3, and G4, i.e., $\alpha_1=\alpha_2=\alpha_3=\alpha_4=0.25$, the average moving distance for access is going to be 49Lmax/48 according to the above equation (4), which still amounts to the approximately 30% reduction of the average moving distance compared with a case of the conventional media library system given by the above equation (1).

Also, when the specified cartridge 1 is taken from the second, third, or fourth group G2, G3, or G4 as shown in FIGS. 9, 10, or 11. The rearrangement of the cartridges is carried out in addition. When the specified cartridge 1 is taken from the first group G1 as shown in FIG. 8, the rearrangement of the cartridges is not carried out as the vacant cell 3a' is already secured in the first group G1.

In a case of carrying out the rearrangement of the cartridges 1 as the specified cartridge 1 is taken from the second group G2 as shown in FIG. 9, the cartridge 1 with the lowest utilization frequency within the first group G1 is carried to the vacant cell $3a'$ of the second group G2 after the specified cartridge 1 is mounted on the disk drive 2. In this case, as shown in FIG. 9, the robotic hand 4 is going to move for Lmax/8 from the disk drive 2 to the storage cell $3a$ storing the cartridge 1 with the lowest utilization frequency within the first group G1, and for Lmax/4 to carry the cartridge 1 with the lowest utilization frequency from that storage cell $3a$ of the first group G1 to the vacant cell $3a'$ of the second group G2, and then for 3Lmax/8 from there to the disk drive 2.

Similarly, in a case of carrying out the rearrangement of the cartridges 1 as the specified cartridge 1 is taken from the third group G3 as shown in FIG. 10, the cartridge 1 with the lowest utilization frequency within the first group G1 is carried to the vacant cell $3a'$ of the second group G2 and the cartridge 1 with the lowest utilization frequency within the second group G2 is carried to the vacant cell $3a'$ of the third group G3 after the specified cartridge 1 is mounted on the disk drive 2. In this case, as shown in FIG. 10, the robotic hand 4 is going to move for Lmax/8 from the disk drive 2 to the storage cell $3a$ storing the cartridge 1 with the lowest utilization frequency within the first group G1, and for Lmax/4 to carry the cartridge 1 with the lowest utilization frequency from that storage cell $3a$ of the first group G1 to the vacant cell $3a'$ of the second group G2. Then, the robotic hand 4 is going to move for Lmax/12 from there to the storage cell $3a$ storing the cartridge 1 with the lowest utilization frequency within the second group G2, and for Lmax/4 to carry the cartridge 1 with the lowest utilization frequency from that storage cell $3a$ of the second group G2 to the vacant cell $3a'$ of the third group G3, and then for 5Lmax/8 from there to the disk drive 2.

Similarly, in a case of carrying out the rearrangement of the cartridges 1 as the specified cartridge 1 is taken from the fourth group G4 as shown in FIG. 11, the cartridge 1 with the lowest utilization frequency within the first group G1 is carried to the vacant cell $3a'$ of the second group G2, the cartridge 1 with the lowest utilization frequency within the second group G2 is carried to the vacant cell $3a'$ of the third group G3, and the cartridge 1 with the lowest utilization frequency within the third group G3 is carried to the storage cell $3a$ of the fourth group G4 from which the specified cartridge 1 has been taken, after the specified cartridge 1 is mounted on the disk drive 2. In this case, as shown in FIG. 11, the robotic hand 4 is going to move for Lmax/8 from the disk drive 2 to the storage cell $3a$ storing the cartridge 1 with the lowest utilization frequency within the first group G1, and for Lmax/4 to carry the cartridge 1 with the lowest utilization frequency from that storage cell $3a$ of the first group G1 to the vacant cell $3a'$ of the second group G2. Then, the robotic hand 4 is going to move for Lmax/12 from there to the storage cell $3a$ storing the cartridge 1 with the lowest utilization frequency within the second group G2, and for Lmax/4 to carry the cartridge 1 with the lowest utilization frequency from that storage cell $3a$ of the second group G2 to the vacant cell $3a'$ of the third group G3. Then, the robotic hand 4 is going to move for Lmax/12 from there to the storage cell $3a$ storing the cartridge 1 with the lowest utilization frequency within the third group G3, and for Lmax/4 to carry the cartridge 1 with the lowest utilization frequency from that storage cell $3a$ of the third group G3 to the storage cell $3a$ of the fourth group G4 from which the specified cartridge 1 has been taken, and then for 7Lmax/8 from there to the disk drive 2.

Thus, in this second embodiment, the average moving distance of the robotic hand 4 required for this rearrangement of the cartridges 1 is given by:

$$\begin{aligned}
&\text{Average moving distance for rearrangement (\# of groups = 4) =} \\
&\quad \alpha_2 \, (Lmax/8 + Lmax/4 + 3Lmax/8) + \alpha_3 \, (Lmax/8 + Lmax/4) + \\
&\quad \alpha_3 \, (Lmax/12 + Lmax/4 + 5Lmax/8) + \alpha_4 \, (Lmax/8 + Lmax/4) + \\
&\quad \alpha_4 \, (Lmax/12 + Lmax/4) + \alpha_4 \, (Lmax/12 + Lmax/4 + 7Lmax/8) = \\
&\qquad\qquad 3\alpha_2 \cdot Lmax/4 + 4\alpha_3 \cdot Lmax/3 + 23\alpha_4 \cdot Lmax/12
\end{aligned} \quad (6)$$

Then, if it is assumed that most of the related data to be accessed successively are stored in a plurality of cartridges 1 gathered in the first group G1, i.e., nearly $\alpha_1=1$, this rearrangement of the cartridges 1 is scarcely required.

Even if it is assumed that the related data to be accessed successively are distributed at random over the four groups G1, G2, G3, and G4, i.e., $\alpha_1\alpha_2=\alpha_3=\alpha_4=0.25$, the robotic hand 4 is going to move four times on average, and the average moving distance is going to be Lmax according to the above equation (6).

Moreover, usually, this rearrangement of the cartridges 1 is carried out by utilizing the idle time after the completion of the disk exchange, so that it does not affect the average access time characteristic of the media library system, just as in a case of FIG. 3.

It is to be noted here that the modifications similar to those mentioned for the first embodiment described above can also be made for this second embodiment as well.

Moreover, it is also possible to modify this second embodiment such that one vacant cell $3a'$ is always provided within at least one of the groups G1, G2, and G3, i.e., the groups other than the fourth group G4 which is farthest from the disk drive 2 among all the groups, instead of always providing one vacant cell $3a'$ within each of the groups G1, G2, and G3 as described above.

As described, according to the media library system of this second embodiment, at a time of exchanging the cartridges 1, the cartridge 1 taken out from the disk drive 2 is stored in the vacant cell $3a'$ of the first group G1 which is relatively closer to the disk drive 2, and then the specified cartridge 1 is taken out from the storage cell $3a$ of any group and mounted on the disk drive 2, so that it becomes possible to exchange the cartridges 1 in a very short period of time.

In addition, in a case the specified cartridge 1 is taken out from the group other than the first group G1 which is relatively farther to the disk drive 2, the cartridge 1 with the lowest utilization frequency among each group closer to the disk drive 2 is sequentially moved to the adjacent group farther from the disk drive 2 so as to secure a new vacant cell $3a'$ in each group other than the group farthest from the disk drive 2, so that it is possible to put the cartridges 1 with the higher utilization frequencies in the groups with the shorter carrying distances all the times, and consequently it is possible to reduce the average moving distance of the robotic hand 4 considerably. Here, the average moving distance of the robotic hand 4 decreases in counter-proportion to the number of groups by which the storehouse 3 is divided, and the substantial reduction of the average moving distance of the robotic hand 4 can be achieved even with the minimum configuration using only two groups.

Also, in this second embodiment, the cartridge 1 with the lowest utilization frequency among each group closer to the disk drive 2 is sequentially moved to the adjacent group farther from the disk drive 2, that is, all the cartridges 1 except for that mounted on the disk drive 2 are going to be compared in terms of their utilization frequencies. Thus, the cartridge 1 that has just been returned from the disk drive 2 to the first group G1 may be moved to the second or farther located group immediately if its utilization frequency is very low. Consequently, the grouping according to the utilization frequencies of the cartridges 1 can be achieved by the single rearrangement operation, and the cartridges 1 can always be arranged in an order of their utilization frequencies.

Figure 13:
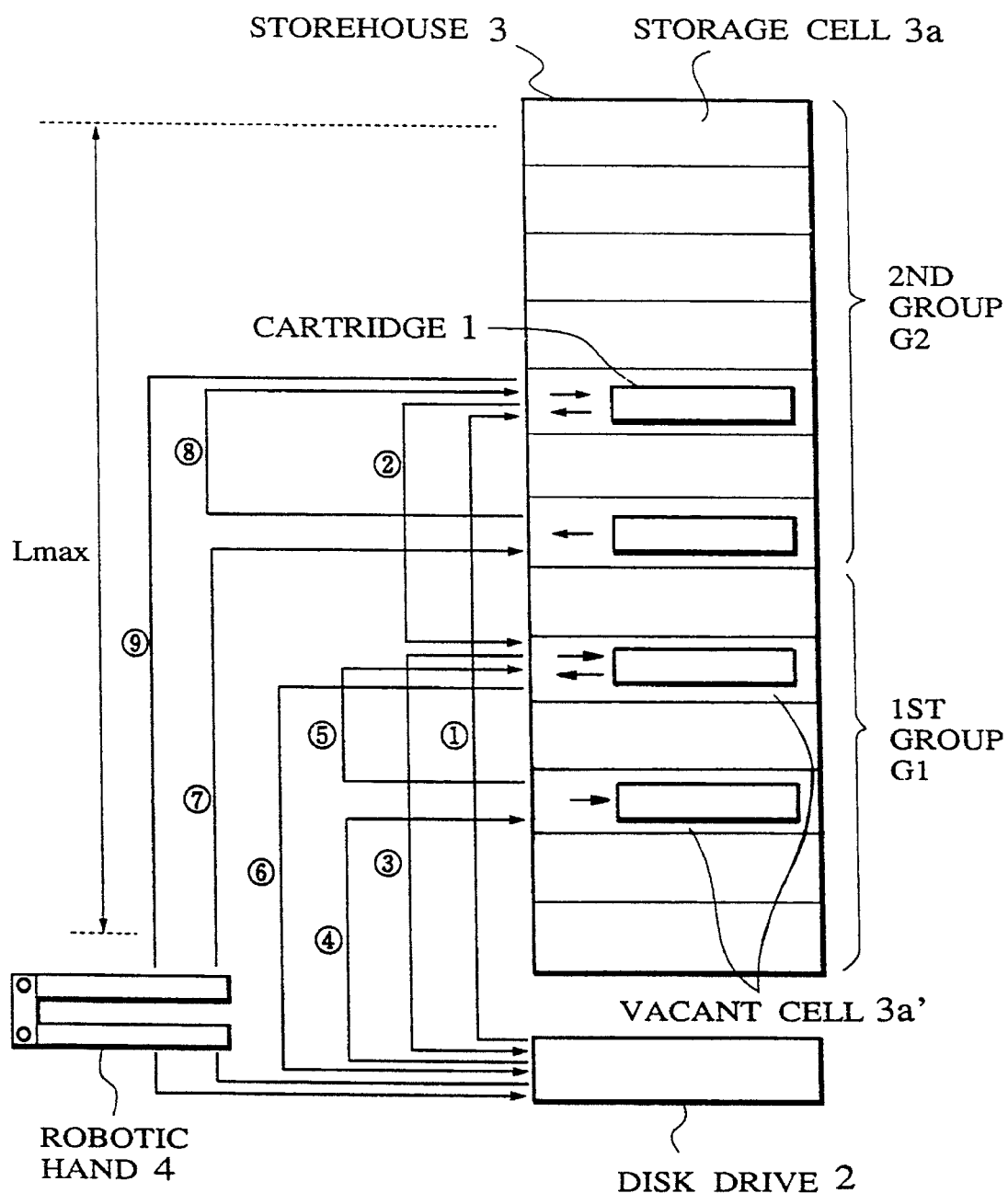
FIG. 13 is a diagram of a schematic configuration of a third embodiment of a media library system according to the present invention, showing a case of taking a new cartridge from a second group.

Referring now to FIG. 13, the third embodiment of a media library system according to the present invention will be described in detail.

In this third embodiment, the system has a schematic configuration as shown in FIG. 13, where the same reference numerals as in FIG. 3 described above are used for the corresponding elements of the system. Here, as indicated in FIG. 13, the storage cells 3a of the storehouse 3 are managed in at least two groups (two groups G1 and G2 in this embodiment) in a descending order of closeness to the disk drive 2. Also, the cartridges 1 are managed such that two vacant cells 3a' are always provided within the first group G1, i.e., the group which is closest to the disk drive 2 among all the groups.

Figure 14:
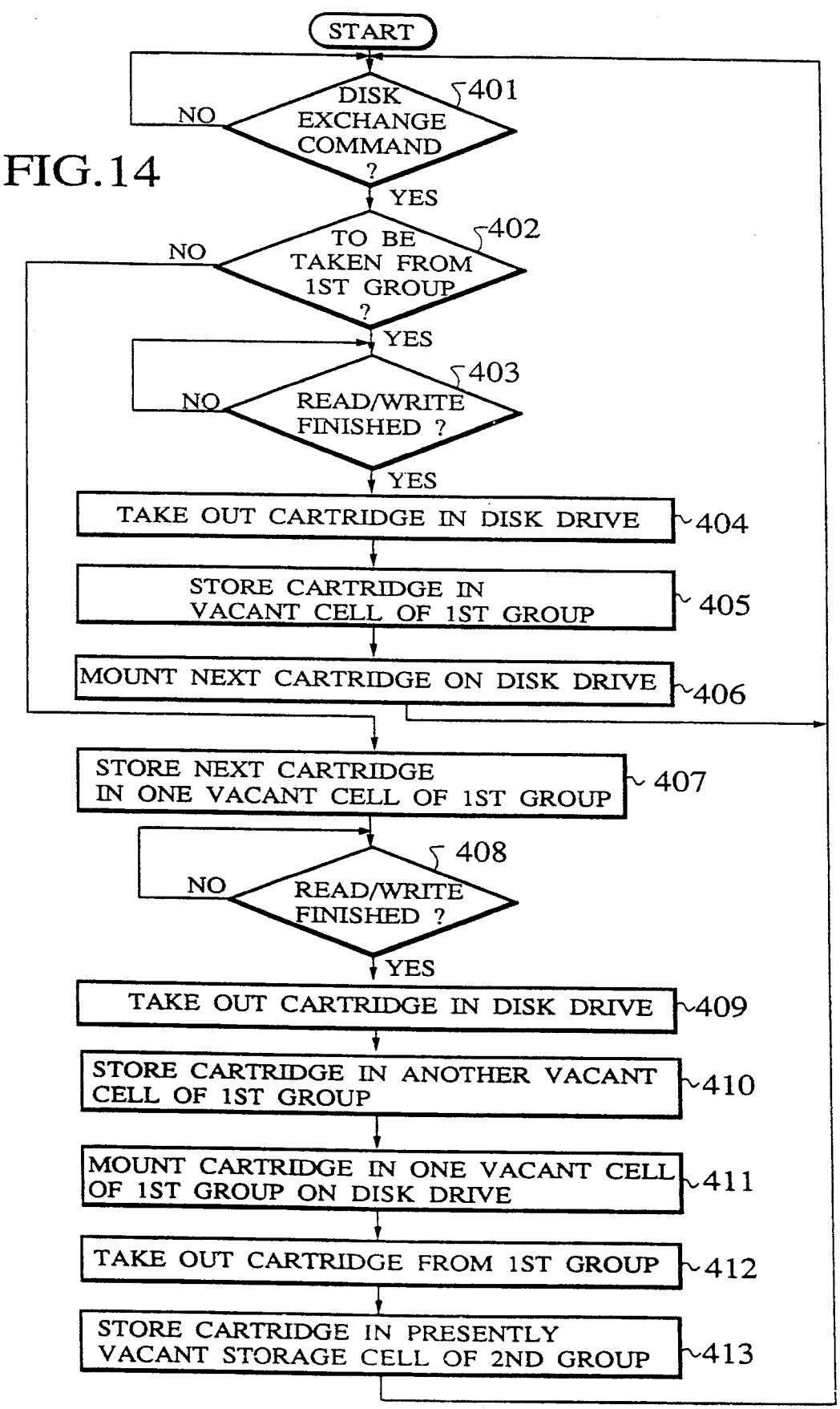
FIG. 14 is a flow chart for a disk exchange operation in the third embodiment of FIG. 13.

In this media library system of FIG. 13, the cartridge 1 mounted on the disk drive 2 is exchanged with another cartridge 1 stored in the storehouse 3 by the operation of the robotic hand 4 as indicated in FIG. 13, according to the flow chart of FIG. 14 as follows. In FIG. 13, the encircled numbers accompanying arrows indicate the orders of the movements of the robotic hand 4 as before.

First, whether a disk exchange command is issued or not is judged (step 401), and if so, whether the next cartridge 1 to be mounted on the disk drive 2 is stored in the storage cell 3a of the first group G1 or not is judged (step 402). When the next cartridge 1 is stored in the first group G1 (step 402 YES), the finishing of the data read/write with respect to the cartridge currently mounted on the disk drive 2 is awaited (step 403), and as the data read/write is finished, the robotic hand 4 takes out the cartridge 1 currently mounted on the disk drive 2 (step 404) and moves to one of the vacant cells 3a' of the first group G1 in the storehouse 3 so as to store this cartridge 1 in one of the vacant cells 3a' (step 405).

Next, the robotic hand 4 moves to the storage cell 3a of the first group G1 storing the next cartridge 1 to be mounted to the disk drive 2 which is specified by the disk exchange command, to take out the next cartridge 1 from this storage cell 3a, and then moves to the disk drive 2 to mount the next cartridge 1 on the disk drive 2 (step 406). The data read/write operation with respect to the next cartridge 1 is then carried out at the disk drive 2, while the process returns to the step 401 to await for the next disk exchange command. In this case, the storage cell 3a from which the next cartridge 1 has been taken will serve as a new vacant cell in place of one of the vacant cells 3a' to which the previous cartridge 1 taken out from the disk drive 2 has been stored.

On the other hand, when the next cartridge 1 is not stored in the first group G1 (step 402 NO), i.e., when the next cartridge 1 is stored in the second group G2, the process proceeds to the step 407 at which the robotic hand 4 moves to the storage cell 3a of the second group G2 storing the next cartridge 1 to be mounted to the disk drive 2 which is specified by the disk exchange command (arrow ①), to take out the next cartridge 1 from this storage cell 3a, and then moves to one of the vacant cells 3a' of the first group G1 (arrow ②) to temporarily store the next cartridge 1there (step 407), while the data read/write with respect to the cartridge 1 currently mounted on the disk drive 2 is carried out by the disk drive 2.

Then, the finishing of the data read/write with respect to the cartridge currently mounted on the disk drive 2 is awaited (step 408), and as the data read/write is finished, the robotic hand 4 moves to the disk drive 2 (arrow ③) to take out the cartridge 1 currently mounted on the disk drive 2 (step 409) and moves to another one of the vacant cells 3a' of the first group G1 in the storehouse 3 (arrow ④) so as to store this previous cartridge 1 there (step 410). After that, the robotic hand 4 moves to one of the vacant cells 3a' of the first group G1 to which the next cartridge 1 has been temporarily stored (arrow ⑤) to take out the next cartridge 1 and then moves to the disk drive 2 (arrow ⑥) to mount the next cartridge 1 on the disk drive 2 (step 411).

Next, the robotic hand 4 moves to the storage cell 3a of the first group G1 storing the cartridge 1 with the lowest utilization frequency among the cartridges 1 stored in the first group G1 according to the data memorized in the access controller (arrow ⑦) so as to take out this cartridge 1 with the lowest utilization frequency (step 412). Then, the robotic hand 4 moves to the storage cell 3a in the second group G2 from which the next cartridge 1 has been taken out at the step 407 (arrow ⑧) and stores the cartridge 1 with the lowest utilization frequency into that presently vacant storage cell 3a in the second group G2 (step 413) so as to create a new vacant cell 3a' in the first group G1.

In this manner, two vacant cells 3a' are always secured within the first group G1 after the rearrangement of the cartridges i is completed. This rearrangement of the cartridges 1 at the steps 412 and 413 can be carried out by utilizing any available idle time after the disk exchange operation at the steps 407 to 411. As a result of this rearrangement of the cartridges 1, it becomes possible to store those cartridges 1 which have higher utilization frequencies in the storage cells 3a of the first group G1 for which the carrying distances with respect to the disk drive 2 are relatively shorter, so that the probability for the exchange of the cartridges 1 to take a shorter time can be increased and consequently the average moving distance of the robotic hand 4 can be reduced.

Now, the effect of the reduction of the average moving distance in this media library system of the third embodiment will be explained in comparison to the conventional media library system of FIG. 2. Here, for the sake of simplicity, the shortest access distance from the disk drive 2 to the storehouse 3 is set to be 0 while the longest access distance from the disk drive 2 to the storehouse 3 is set to be Lmax.

Also, the movement of the robotic hand 4 is divided into three stages of a pre- access motion for moving the next cartridge 1 to a vicinity of the disk drive 2 prior to the actual timing for access to the next cartridge 1, a main access motion for taking out the previous cartridge 1 from the disk drive 2 to move it to a vicinity of the disk drive 2 and mounting the next cartridge 1 on the disk drive 2, and a post-access motion for returning the previous cartridge 1 that has been moved to a vicinity of the disk drive 2 back to an appropriate storage cell 3a of the storehouse 3.

Figure 2:
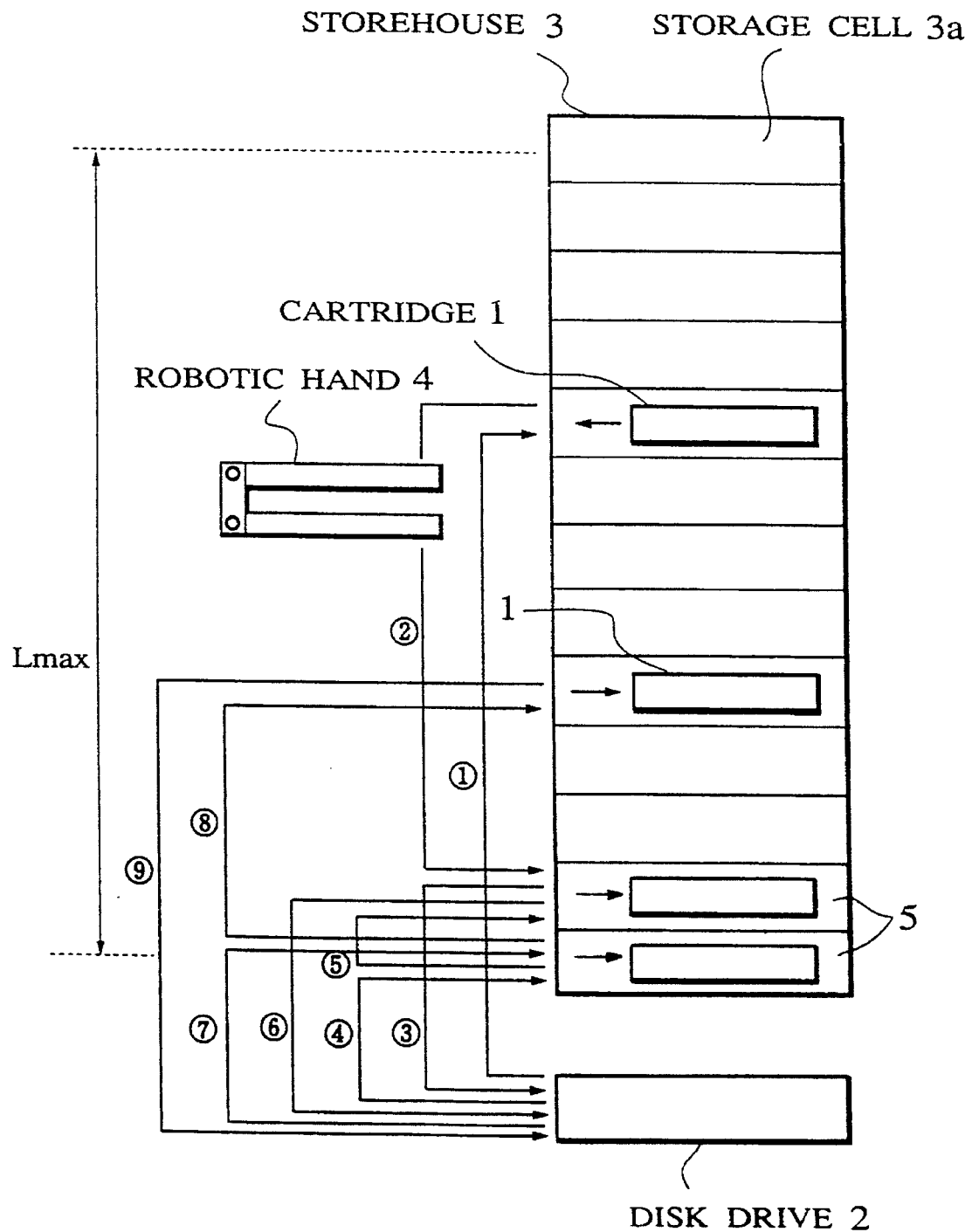
FIG. 2 is a diagram of a schematic configuration of another example of a conventional optical disk library system.

In a case of the conventional media library system as shown in FIG. 2, in the pre-access motion, the robotic hand 4 moves to the storage cell 3a of the storehouse 3 storing the next cartridge 1, and this storage cell 3a storing the next cartridge 1 can be located at any position between both ends of the storehouse 3 at an equal probability, so that the average moving distance of the robotic hand 4 is going to be Lmax/2. Next, in moving from there to one of the escape cells 5, as the positions of the disk drive 2 and the escape cells 5 are assumed as the same, the average moving distance of the robotic hand 4 is going to be Lmax/2 as well. Finally, in moving from there to the disk drive 2, the average moving distance of the robotic hand 4 is going to be 0 according to the above assumption.

Next, in the main access motion, the robotic hand 4 carries the previous cartridge 1 for which the data read/write has been finished from the disk drive 2 to another one of the escape cells 5, moves from there to one of the escape cells 5 in which the next cartridge 1 has been temporarily stored, and then carries the next cartridge 1 from there to the disk drive 2. Here, due to the above assumption, the moving distance of the robotic hand 4 in this movement is going to be 0, so that the average moving distance of the robotic hand 4 is also 0. It is to be noted, however, that the average moving distance for this movement is 0 simply because of the above assumption, and the robotic hand 4 actually moves three times in this movement.

Also, in the post-access motion, the robotic hand 4 moves to another one of the escape cells 5, carries the previous cartridge 1 that has been temporarily stored there to the prescribed storage cell 3a of the storehouse 3, and then returns from there to the disk drive 2. As this movement is going to trace the same route as the pre-access motion described above in a reverse direction, the average moving distance of the robotic hand 4 in this movement is going to be 0+Lmax/2+Lmax/2=Lmax.

Thus, in the conventional media library system of FIG. 2, the average moving distance of the robotic hand 4 is going to be 0 for the main access motion, and Lmax for each of the pre-access motion and the post-access motion, so that the total average moving distance is given by:

$$\text{Average moving distance} \quad (7)$$
$$\text{(pre-access + main access + post-access motions)} =$$
$$0 + L\text{max} + L\text{max} = 2L\text{max}$$

On the other hand, in the third embodiment of FIG. 13, the entire first group G1 which is closer to the disk drive 2 is going to play a role of the escape cells in the conventional system, so that the pre-access motion will not be carried out for the cartridges 1 already stored in the first group G1.

Namely, in the pre-access motion which takes place only with respect to the second group G2, the next cartridge 1 is going to be temporarily stored in one of the two vacant cells 3a' which are secured within the first group G1 all the times. In this case, the robotic hand 4 moves for the average moving distance of 3Lmax/4 from the disk drive 2 to the storage cell 3a of the second group G2 storing the next cartridge 1, and then moves to one of the vacant cells 3a' of the first group G1. Here, the vacant cell 3a' in the first group G1 is located at an arbitrary position, so that the average moving distance of the robotic hand 4 is going to be Lmax/2. Then, the robotic hand 4 moves for the average moving distance of Lmax/4 to return to the disk drive 2. In this manner, the next cartridge 1 is going to be positioned within the first group G1 by the pre-access motion. In a case the next cartridge 1 is already stored within the first group G1, the pre-access motion will not be carried out as already mentioned.

Next, in the main access motion, the robotic hand 4 moves for the average moving distance of Lmax/4 to carry the previous cartridge 1 to another one of the vacant cells 3a' of the first group G1 to temporarily store it there. Then, the robotic hand 4 moves to the position of either one of the vacant cells 3a' of the first group G1 to which the next cartridge 1 has been temporarily stored by the pre-access motion or the storage cell 3a of the first group G1 storing the next cartridge 1. Here, the robotic hand 4 is going to move between arbitrary two points within the first group G1, so that the average moving distance is going to be Lmax/6. Then, the robotic hand 4 moves for the average moving distance of Lmax/4 to carry the next cartridge 1 to the disk drive 2 so as to mount it thereon.

In this main access motion, in a case the next cartridge 1 is already stored in the first group G1, a new vacant cell 3a' is going to be created in the first group G1 as this next cartridge 1 is moved to the disk drive 2, so that the positions of the two vacant cells 3a' of the first group G1 are changed sequentially. However, in a case the next cartridge 1 is taken from the second group G2, the next cartridge 1 is going to be moved to one of the vacant cells 3a' of the first group G1 by the pre-access motion and then moved to the disk drive 2 from there, so that the positions of the vacant cells 3a' in the first group G1 are not going to be changed in this case. Note here that the robotic hand 4 sequentially moves among the disk drive 2, one of the vacant cells 3a', and another one of the vacant cells 3a' in any case, so that regardless of where the vacant cells 3a' are located, the total moving distance of the robotic hand 4 is going to be the same.

Next, in the post-access motion, the cartridge 1 with the lowest utilization frequency within the first group G1 is selected and moved to the storage cell 3a of the second group G2 at which the next cartridge 1 taken out by the pre-access motion has originally been stored. Consequently, this post-access motion is not going to be carried out when the next cartridge 1 has already been stored in the first group G1. In this post-access motion, the robotic hand 4 moves for the average moving distance of Lmax/4 from the disk drive 2 to the position of the cartridge 1 with the lowest utilization frequency within the first group G1, then moves for the average moving distance of Lmax/2 to store this cartridge 1 with the lowest utilization frequency in the storage cell 3a of the second group G2, and finally moves for the average moving distance of 3Lmax/4 to return from there to the disk drive 2. As a result of this post-access motion, the two vacant cells 3a' are secured again in the first group G1 and the cartridges 1 with the higher utilization frequencies are rearranged to be in the first group G1 for which the carrying distance is shorter.

Now, in this third embodiment, when the probability for the specified cartridge 1 to be present in the first group G1 is set to $\alpha_1$ ($1 \geq \alpha_1 \geq 0.5$) while the probability for the specified cartridge 1 to be present in the second group G2 is set to $1-\alpha_1$, the average moving distance of the robotic hand 4 for the main access motion is given by:

$$\text{Average moving distance for main access motion} \quad (8)$$
$$(\text{\# of groups} = 2) = L\text{max}/4 + L\text{max}/6 + L\text{max}/4 = 2L\text{max}/3$$

while the average moving distance of the robotic hand 4 for the pre-access and post-access motions together is given by:

$$\text{Average moving distance for pre-access and post-access motions} \quad (9)$$
$$(\text{\# of groups} = 2) = 2(1 - \alpha_1) \, (3L\text{max}/4 + L\text{max}/2 +$$
$$L\text{max}/4) = 3(1 - \alpha_1)L\text{max}$$

Then, if it is assumed that all the related data to be accessed successively are stored in a plurality of cartridges 1 gathered in the first group G1, i.e., $\alpha_1=1$, the next cartridge 1 is always going to be present in the first group G1, so that the average moving distance for the main access motion is going to be 2Lmax/3 according to the above equation (8), and the average moving distance for the pre-access and post-access motions is going to be 0 according to the above equation (9). In comparison with the conventional system of FIG. 2, the average moving distance for the main access motion alone is going to be increased from 0 to 2Lmax/3, but the total average moving distance including the pre-access and post-access motions as well is going to be reduced from 2Lmax to 2Lmax/3, which amounts to the approximately 66% reduction of the average moving distance.

This is because the pre-access and post-access motions are not carried out at all in this third embodiment when the next cartridge 1 is already stored in the first group G1, so that the average moving distance of 0 literally indicates that the robotic hand 4 does not move at all, compared with the conventional system in which the robotic hand 4 moves for the average moving distance of 2Lmax by moving six times for the purpose of the pre-access and post-access motions.

Moreover, even if it is assumed that the related data to be accessed successively are distributed at random over the first and second groups G1 and G2, i.e., $\alpha_1=0.5$, the total average moving distance of the robotic hand 4 in this third embodiment is going to be 13Lmax/6 according to the above equations (8) and (9), which amounts to the approximately 8% increase of the total average moving distance compared with the conventional system for which the total average moving distance is 2Lmax in this case. However, in this case, the probability for the pre-access and post-access motions to be carried out in this third embodiment is ½, so that the number of times for moving the robotic hand 4 is reduced from six times of the conventional system to three times, and consequently the total number of times for moving the robotic hand 4 is reduced from nine times of the conventional system to six times.

This reduction of the number of times for moving the robotic hand 4 is advantageous from the point of view of the disk exchange capability per unit time or the improvement of the MTBF (Mean Time Between Failure) of the robotic hand 4, as the robotic hand 4 of the media library system for carrying the cartridge 1 has a relatively large size and requires a significant amount of time for start or stop moving.

Thus, in this third embodiment, the storage cells 3a of the storehouse 3 are divided into the first and second groups G1 and G2 with different carrying distances with respect to the disk drive 2, and the pre-access and post-access motions are carried out only with respect to the second group G2 with the longer carrying distance, while the cartridge with the lowest utilization frequency within the first group G1 is moved to the second group G2 whenever the cartridge 1 to be accessed is taken from the second group G2 so as to arrange the cartridges 1 with the higher utilization frequencies in the first group G1 with the shorter carrying distance all the times, such that the average moving distance of the robotic hand 4 can be shortened and the number of times for moving the robotic hand 4 can be reduced.

Now, as a modification of the third embodiment described above, a case of dividing the storehouse 3 into four groups according to the differences in the distance with respect to the disk drive 2 will be described.

Figure 15:
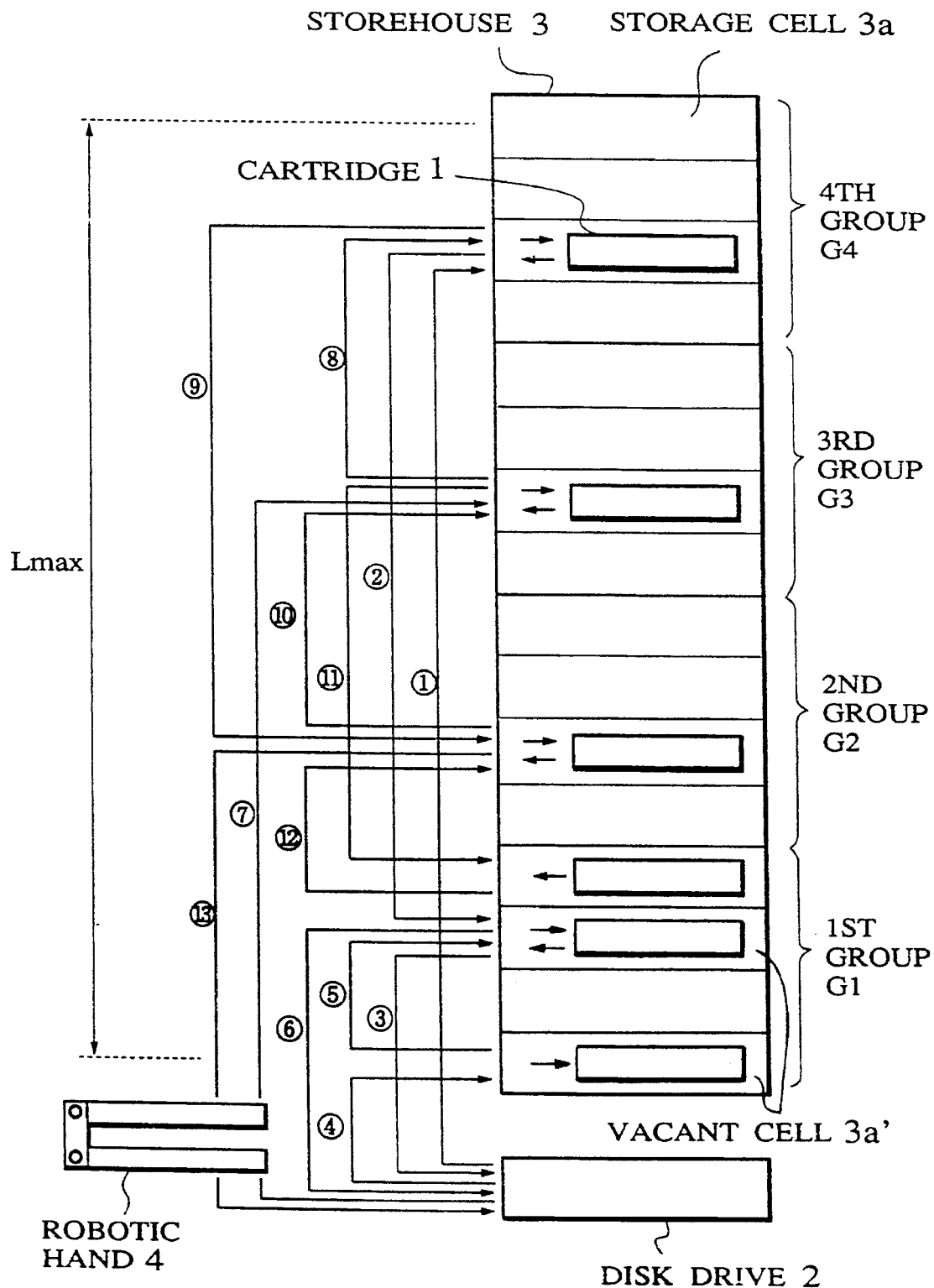
FIG. 15 is a diagram of a schematic configuration of one modification of the third embodiment of FIG. 13, showing a case of using four groups and taking a new cartridge from a fourth group.

In this case, the system has a schematic configuration as shown in FIG. 15, where the same reference numerals as in FIG. 13 described above are used for the corresponding elements of the system. Here, as indicated in FIG. 15, the storage cells 3a of the storehouse 3 are managed in four groups G1, G2, G3, and G4 in a descending order of closeness to the disk drive 2. Also, the cartridges 1 are managed such that two vacant cells 3a' are always provided within the group G1 just as in a case of FIG. 13.

Figure 16:
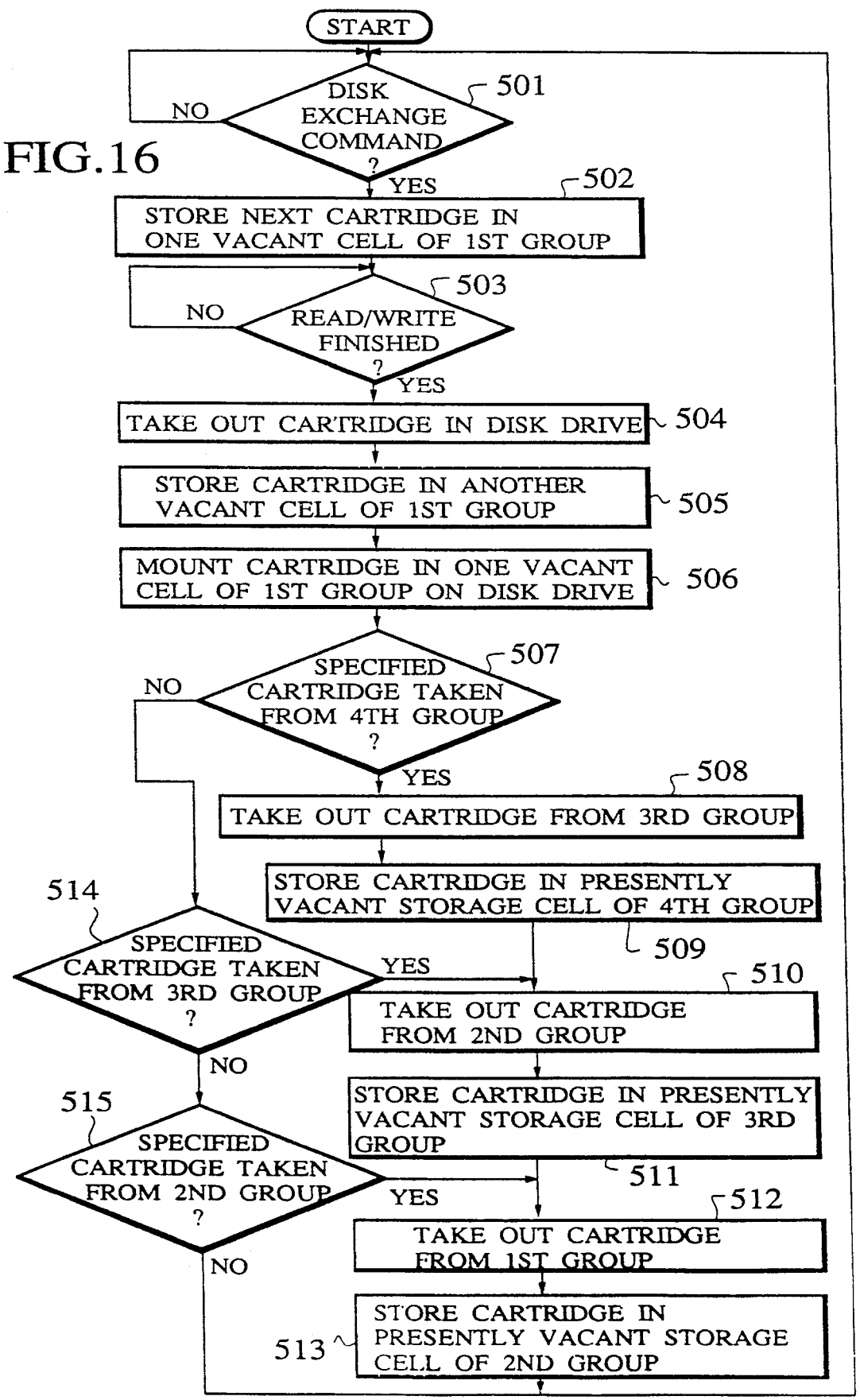
FIG. 16 is a flow chart for a disk exchange operation in the modification of FIG. 15.

In this media library system of FIG. 15, the cartridge 1 mounted on the disk drive 2 is exchanged with another cartridge 1 stored in the storehouse 3 by the operation of the robotic hand 4 as indicated in FIG. 15, according to the flow chart of FIG. 16 as follows. In FIG. 15, the encircled numbers accompanying arrows indicate the orders of the movements of the robotic hand 4 as before. In this case, when the next cartridge 1 to be accessed is present in the first group G1 of the storehouse 3, the pre-access and post-access motions are not carried out exactly as in the case of FIG. 13 described above. On the other hand, when the next cartridge 1 to be accessed is not present in the first group G1 of the storehouse 3, the operation proceeds as follows.

First, whether a disk exchange command is issued or not is judged (step 501), and if so, the robotic hand 4 moves to the storage cell 3a storing a next cartridge 1 to be mounted to the disk drive 2 which is specified by the disk exchange command (arrow ①) to take out the next cartridge 1 from this storage cell 3a, and then moves to one vacant cell 3a' of the first group (arrow ②) so as to temporarily store this next cartridge 1 in that one vacant cell 3a' (step 502). Then, the robotic hand 4 is moved back to the position of the disk drive 2 (arrow ③).

Next, whether the data read/write operation with respect to the currently mounted cartridge 1 is finished or not is judged (step 503), and if so, the robotic hand 4 takes out the cartridge 1 currently mounted on the disk drive 2 (step 50%) and moves to another vacant cell 3a' of the first group G1 in the storehouse 3 (arrow ④) so as to store this cartridge 1 in that another vacant cell 3a' (step 505). Then, the robotic hand 4 is moved to a position of the one vacant cell 3a' which temporarily stores the next cartridge 1 (arrow ⑤) to take out the next cartridge 1 from this one vacant cell 3a', and then moved to a position of the disk drive 2 (arrow ⑥) to mount the next cartridge 1 on the disk drive 2 (step 506).

Next, whether the next cartridge 1 has been taken from the storage cell 3a of the fourth group G4 at the step 502 or not is judged (step 507). When the next cartridge 1 has been taken from the storage cell 3a of the fourth group G4 as shown in FIG. 15 (step 507 YES), the robotic hand 4 is moved to the storage cell 3a storing the cartridge 1 with the lowest utilization frequency among the cartridges 1 stored in the third group G3 according to the data memorized in the access controller (arrow ⑦) to take out this cartridge 1 (step 508), and then moved to the storage cell 3a in the fourth group G4 from which the next cartridge 1 has been taken out at the step 502 and which is presently vacant (arrow ⑧), and stores this cartridge 1 into that presently vacant storage cell 3a in the fourth group G4 (step 509).

Then, similarly, the robotic hand 4 is moved to the storage cell 3a storing the cartridge 1 with the lowest utilization frequency among the cartridges 1 stored in the second group G2 according to the data memorized in the access controller (arrow ⑨) to take out this cartridge 1 (step 510), and then moved to the storage cell 3a in the third group G3 from which the cartridge 1 with the lowest utilization frequency has been taken out at the step 508 and which is presently vacant (arrow ⑩), and stores this cartridge 1 into that presently vacant storage cell 3a in the third group G3 (step 511).

Also, similarly, the robotic hand 4 is moved to the storage cell 3a storing the cartridge 1 with the lowest utilization frequency among the cartridges 1 stored in the first group G1 according to the data memorized in the access controller (arrow ⑪) to take out this cartridge 1 (step 512), and then moved to the storage cell 3a in the second group G2 from which the cartridge 1 with the lowest utilization frequency has been taken out at the step 510 and which is presently vacant (arrow +e,fra 12+ee ) and stores this cartridge 1 into that presently vacant storage cell 3a in the second group G2 (step 513), so as to create a new vacant cell 3a' in the first group G1. Then, the robotic hand 4 is moved back to the position of the disk drive 2 (arrow ⑬) while the process returns to the step 501 to await for the next disk exchange command.

On the other hand, when the next cartridge 1 has not been taken from the storage cell 3a of the fourth group G4 (step 507 NO), whether the next cartridge 1 has been taken from the storage cell 3a of the third group G3 at the step 502 or not is judged (step 514). When the next cartridge 1 has been taken from the storage cell 3a of the third group G3 (step 514 YES), the above described steps 510 to 513 are carried out to make the rearrangement from the second group G2 to the third group G3 and the rearrangement from the first group G1 to the second group G2, and then the process returns to the step 501 to await for the next disk exchange command.

Also, when the specified cartridge 1 has not been taken from the storage cell 3a of the third group G3 or the fourth group G4 (step 514 NO), whether the next cartridge 1 has been taken from the storage cell 3a of the second group G2 at the step 502 or not is judged (step 515). When the next cartridge 1 has been taken from the storage cell 3a of the second group G2 (step 515 YES), the above described steps 512 and 513 are carried out to make the rearrangement from the first group G1 to the second group G2, and then the process returns to the step 501 to await for the next disk exchange command.

Also, when the next cartridge 1 has not been taken from the storage cell 3a of any of the second group G2, the third group G3, and the fourth group G4, (step 515 NO), it implies that the next cartridge 1 has been taken from the storage cell 3a of the first group G1, in which case this storage cell will serve as a vacant cell 3a' in the next disk exchange operation, so that the process returns to the step 501 to await for the next disk exchange command, without making any rearrangement.

In this manner, the two vacant cells 3a' are always secured within the first group G1 after the rearrangement of the cartridges i is completed. This rearrangement of the cartridges 1 at the steps 508 to 513 can be carried out by utilizing any available idle time after the disk exchange operation at the steps 504 to 506. As a result of this rearrangement of the cartridges 1, it becomes possible to store those cartridges 1 which have higher utilization frequencies in the storage cells 3a of the group for which the carrying distances with respect to the disk drive 2 are relatively shorter, so that the probability for the exchange of the cartridges i to take a shorter time can be increased and consequently the average moving distance of the robotic hand 4 can be reduced, just as in a case of FIG. 13.

In this case, the entire first group G1 which is closer to the disk drive 2 is going to play a role of the escape cells in the conventional system, so that the pre-access motion will not be carried out for the cartridges 1 already stored in the first group G1.

On the other hand, in the pre-access motion carried out with respect to the second group G2, the robotic hand 4 moves for the average moving distance of $3L_{max}/8$ from the disk drive 2 to the storage cell 3a of the second group G2 storing the next cartridge 1, and moves for the average moving distance of $2L_{max}/8$ from there to one of the vacant cells 3a' of the first group G1, and then moves for the average moving distance of $L_{max}/8$ to return to the disk drive 2.

Similarly, in the pre-access motion carried out with respect to the third group G3, the robotic hand 4 moves for the average moving distance of $5L_{max}/8$ from the disk drive 2 to the storage cell 3a of the third group G3 storing the next cartridge 1, and moves for the average moving distance of $4L_{max}/8$ from there to one of the vacant cells 3a' of the first group G1, and then moves for the average moving distance of $L_{max}/8$ to return to the disk drive 2.

Similarly, in the pre-access motion carried out with respect to the fourth group G4, the robotic hand 4 moves for the average moving distance of $7L_{max}/8$ from the disk drive 2 to the storage cell 3a of the fourth group G4 storing the next cartridge 1, and moves for the average moving distance of $6L_{max}/8$ from there to one of the vacant cells 3a' of the first group G1, and then moves for the average moving distance of $L_{max}/8$ to return to the disk drive 2.

Next, in the main access motion, regardless of from which group the next cartridge 1 has been taken, the robotic hand 4 moves only between the first group G1 and the disk drive 2. Namely, the robotic hand 4 moves for the average moving distance of $L_{max}/8$ to carry the previous cartridge 1 to another one of the vacant cells 3a' of the first group G1 to temporarily store it there. Then, the robotic hand 4 moves for the average moving distance of $L_{max}/12$ to the position of either one of the vacant cells 3a' of the first group G1 to which the next cartridge 1 has been temporarily stored by the pre-access motion or the storage cell 3a of the first group G1 storing the next cartridge 1. Then, the robotic hand 4 moves for the average moving distance of $L_{max}/8$ to carry the next cartridge 1 to the disk drive 2 so as to mount it thereon.

Next, as for the post-access motion, it will not be carried out for the cartridges 1 already stored in the first group G1. On the other hand, in the post-access motion carried out with respect to the second group G2, the robotic hand 4 moves for the average moving distance of $L_{max}/8$ from the disk drive 2 to the position of the cartridge 1 with the lowest utilization frequency within the first group G1, then moves for the average moving distance of $L_{max}/4$ to store this cartridge 1 with the lowest utilization frequency in the storage cell 3a of the second group G2, and finally moves for the average moving distance of $3L_{max}/8$ to return from there to the disk drive 2.

Similarly, in the post-access motion carried out with respect to the third group G3, the robotic hand 4 moves for the average moving distance of $3L_{max}/8$ from the disk drive 2 to the position of the cartridge 1 with the lowest utilization frequency within the second group G2, and then moves for the average moving distance of $L_{max}/4$ to store this cartridge 1 with the lowest utilization frequency in the storage cell 3a of the third group G3. Then, the robotic hand 4 moves for the average moving distance of $L_{max}/2$ from there to the position of the cartridge 1 with the lowest utilization frequency within the first group G1, then moves for the average moving distance of $L_{max}/4$ to store this cartridge 1 with the lowest utilization frequency in the storage cell 3a of the second group G2, and finally moves for the average moving distance of $3L_{max}/8$ to return from there to the disk drive 2.

Similarly, in the post-access motion carried out with respect to the fourth group G4, the robotic hand 4 moves for the average moving distance of $5L_{max}/8$ from the disk drive 2 to the position of the cartridge 1 with the lowest utilization frequency within the third group G3, and then moves for the average moving distance of $L_{max}/4$ to store this cartridge 1 with the lowest utilization frequency in the storage cell 3a of the fourth group G4. Then, the robotic hand 4 moves for the average moving distance of $L_{max}/2$ from there to the position of the cartridge 1 with the lowest utilization frequency within the second group G2, and then moves for the average moving distance of $L_{max}/4$ to store this cartridge 1 with the lowest utilization frequency in the storage cell 3a of the third group G3. Then, the robotic hand 4 moves for the average moving distance of $L_{max}/2$ from there to the position of the cartridge 1 with the lowest utilization frequency within the first group G1, then moves for the average moving distance of $L_{max}/4$ to store this cartridge 1 with the lowest utilization frequency in the storage cell 3a of the second group G2, and finally moves for the average moving distance of $3L_{max}/8$ to return from there to the disk drive 2.

Now, when the probability for the specified cartridge 1 to be present in the n-th group is set to $a\alpha_n$, the average moving distances of the robotic hand 4 for the pre-access, main access, and post-access motions are given by:

Average moving distance for pre-access motion (10)
(# of groups = 4) = $\alpha_2$ (3Lmax/8 + 2Lmax/8 + Lmax/8) +
$\alpha_3$ (5Lmax/8 + 4Lmax/8 + Lmax/8) + $\alpha_4$ (7Lmax/8 +
6Lmax/8 + Lmax/8) = (6$\alpha_2$ + 10$\alpha_3$ + 14$\alpha_4$) · Lmax/8

Average moving distance for main access motion (11)
(# of groups = 4) =
Lmax/8 + Lmax/12 + Lmax/8 = Lmax/3

Average moving distance for post-access motion (12)
(# of groups = 4) = $\alpha_2$ (Lmax/8 + 2Lmax/8 + 3Lmax/8) +
$\alpha_3$ (3Lmax/8 + 2Lmax/8) + $\alpha_3$ (4Lmax/8 + 2Lmax/8 +
2Lmax/8 + 3Lmax/8) + $\alpha_4$ (5Lmax/8 + 2Lmax/8) +
$\alpha_4$ (4Lmax/8 + 2Lmax/8) + $\alpha_4$ (4Lmax/8 + 2Lmax/8 +
3Lmax/8) = (6$\alpha_2$ + 14$\alpha_3$ + 22$\alpha_4$) · Lmax/8

It can be seen from the above equation (11) that, in this case of using four groups, the average moving distance for the main access motion is reduced by 50% compared with the case of using two groups as in FIG. 13. This reduction depends on the size of the first group G1, and the average moving distance for the main access motion decreases in counter-proportion to the number of groups used in this third embodiment.

Also, if it is assumed that most of the related data to be accessed successively are stored in a plurality of cartridges 1 gathered in the first group G1, i.e., nearly $\alpha_1=1$, the pre-access motion is not carried out at all, but if it is assumed that the related data to be accessed successively are distributed at random over the four groups G1, G2, G3, and G4, i.e., $\alpha_1=\alpha_2=\alpha_3=\alpha_4=0.25$, the robotic hand 4 moves for twice on average and the average moving distance for access is going to be 15Lmax/16.

Also, if it is assumed that most of the related data to be accessed successively are stored in a plurality of cartridges 1 gathered in the first group G1, i.e., nearly $\alpha_1=1$, the post-access motion is not carried out at all, but if it is assumed that the related data to be accessed successively are distributed at random over the four groups G1, 62, G3, and G4, i.e., $\alpha_1=\alpha_2=\alpha_3=\alpha_4=0.25$, the robotic hand 4 moves for four times on average and the average moving distance for access is going to be 21Lmax/16.

Thus, by using four groups, in a case of nearly $\alpha_1=1$, the average moving distance can be reduced by 50% compared with a case of using two groups, while retaining the advantage of not requiring any pre-access and post-access motions. Even in the worst case of $\alpha_1=\alpha_2=\alpha_3=\alpha_4=0.25$, the average total number of times for moving the robotic hand 4 throughout the pre-access, main access, and post-access motions is about nine times, and the total average moving distance is 31Lmax/12, so that it is possible to realize almost the same level of the performance as in the conventional system except for the small increase of the average moving distance.

Now, as another modification of the third embodiment described above, a case of dividing the storehouse 3 into four groups as in the above modification and forming the first group G1 which has the shortest carrying distance with respect to the disk drive 2 by just two vacant cells 3a' alone will be described.

Figure 17:
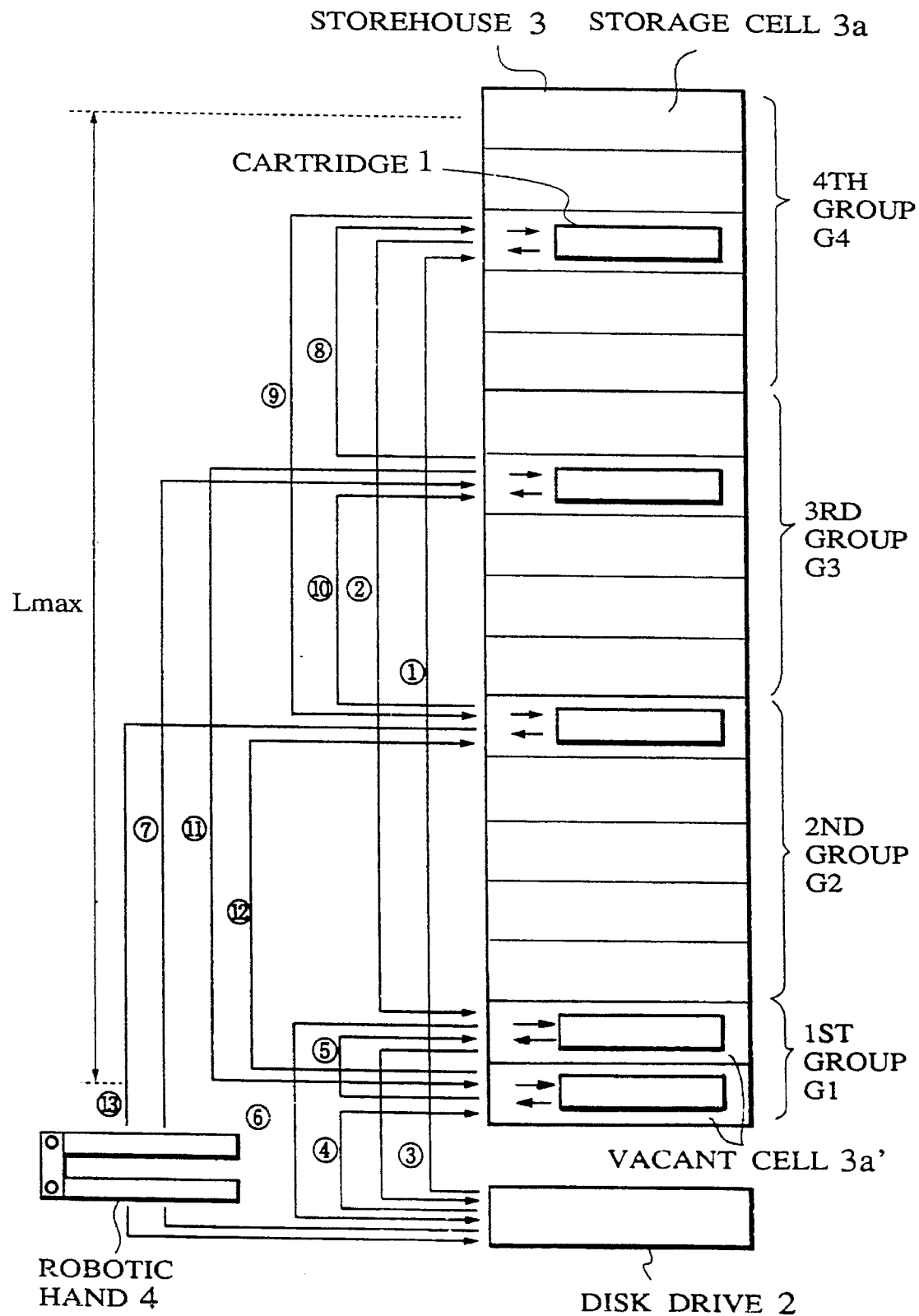
FIG. 17 is a diagram of a schematic configuration of another modification of the third embodiment of FIG. 13, showing a case of using four groups with a first group containing vacant cells alone and taking a new cartridge from a fourth group.

In this case, the system has a schematic configuration as shown in FIG. 17, where the same reference numerals as in FIG. 13 described above are used for the corresponding elements of the system. Here, as indicated in FIG. 17, the storage cells 3a of the storehouse 3 are managed in four groups G1, G2, G3, and G4 in a descending order of closeness to the disk drive 2, where the first group G1 comprises two vacant cells 3a' alone. In this case, the operation of the system is substantially similar to that according to the flow chart of FIG. 16 for the above described modification.

In this case, in the pre-access motion carried out with respect to the second group G2, the robotic hand 4 moves for the average moving distance of Lmax/6 from the disk drive 2 to the storage cell 3a of the second group G2 storing the next cartridge 1, and moves for the average moving distance of Lmax/6 from there to one of the vacant cells 3a' of the first group G1, and then moves for the average moving distance of 0 to return to the disk drive 2.

Similarly, in the pre-access motion carried out with respect to the third group G3, the robotic hand 4 moves for the average moving distance of 3Lmax/6 from the disk drive 2 to the storage cell 3a of the third group G3 storing the next cartridge 1, and moves for the average moving distance of 3Lmax/6 from there to one of the vacant cells 3a' of the first group G1, and then moves for the average moving distance of 0 to return to the disk drive 2.

Similarly, in the pre-access motion carried out with respect to the fourth group G4, the robotic hand 4 moves for the average moving distance of 5Lmax/6 from the disk drive 2 to the storage cell 3a of the fourth group G4 storing the next cartridge 1, and moves for the average moving distance of 5Lmax/6 from there to one of the vacant cells 3a' of the first group G1, and then moves for the average moving distance of 0 to return to the disk drive 2.

Next, in the main access motion, regardless of from which group the next cartridge 1 has been taken, the robotic hand 4 moves only between the first group G1 and the disk drive 2. Namely, the robotic hand 4 moves for the average moving distance of 0 to carry the previous cartridge 1 to another one of the vacant cells 3a' of the first group G1 to temporarily store it there. Then, the robotic hand 4 moves for the average moving distance of 0 to the position of one of the vacant cells 3a' of the first group G1 to which the next cartridge 1 has been temporarily stored by the pre-access motion. Then, the robotic hand 4 moves for the average moving distance of 0 to carry the next cartridge 1 to the disk drive 2 so as to mount it thereon. Thus, the average moving distance for the main access motion in this case is equal to 0.

Next, in the post-access motion carried out with respect to the second group G2, the robotic hand 4 moves for the average moving distance of 0 from the disk drive 2 to the position of another one of the vacant cells 3a' of the first group G1 to take out the previous cartridge 1 temporarily stored therein, then moves for the average moving distance of Lmax/6 to store this previous cartridge 1 in the storage cell 3a of the second group G2, and finally moves for the average moving distance of Lmax/6 to return from there to the disk drive 2.

Similarly, in the post-access motion carried out with respect to the third group G3, the robotic hand 4 moves for the average moving distance of Lmax/6 from the disk drive 2 to the position of the cartridge 1 with the lowest utilization frequency within the second group G2, and then moves for the average moving distance of 2Lmax/6 to store this cartridge 1 with the lowest utilization frequency in the storage cell 3a of the third group G3. Then, the robotic hand 4 moves for the average moving distance of 3Lmax/6 from there to the position of another one of the vacant cells 3a' of the first group G1 to take out the previous cartridge 1 temporarily stored therein, then moves for the average moving distance of Lmax/6 to store this previous cartridge 1 in the storage cell 3a of the second group G2, and finally moves for the average moving distance of Lmax/6 to return from there to the disk drive 2.

Similarly, in the post-access motion carried out with respect to the fourth group G4, the robotic hand 4 moves for the average moving distance of 3Lmax/6 from the disk drive 2 to the position of the cartridge 1 with the lowest utilization frequency within the third group G3, and then moves for the average moving distance of 2Lmax/6 to store this cartridge 1 with the lowest utilization frequency in the storage cell 3a of the fourth group G4. Then, the robotic hand 4 moves for the average moving distance of 4Lmax/6 from there to the position of the cartridge 1 with the lowest utilization frequency within the second group G2, and then moves for the average moving distance of 2Lmax/6 to store this cartridge 1 with the lowest utilization frequency in the storage cell 3a of the third group G3. Then, the robotic hand 4 moves for the average moving distance of 3Lmax/6 from there to the position of another one of the vacant cells 3a' of the first group G1 to take out the previous cartridge 1 temporarily stored therein, then moves for the average moving distance of Lmax/6 to store this previous cartridge 1 in the storage cell 3a of the second group G2, and finally moves for the average moving distance of Lmax/6 to return from there to the disk drive 2.

Now, when the probability for the specified cartridge 1 to be present in the n-th group is set to $\alpha_n$, the average moving distances of the robotic hand 4 for the pre-access, main access, and post-access motions are given by:

Average moving distance for pre-access motion (13)
(# of groups = 4 with minimum first group) =
$\alpha_2$ (Lmax/6 + Lmax/6 + 0) + $\alpha_3$ (3Lmax/6 + 3Lmax/6 + 0) +
$\alpha_4$ (5Lmax/6 + 5Lmax/6 + 0) = (2$\alpha_2$ + 6$\alpha_3$ + 10$\alpha_4$) · Lmax/6

Average moving distance for main access motion (14)
(# of groups = 4 with minimum first group) =
0 + 0 + 0 = 0

Average moving distance for post-access motion (15)
(# of groups = 4 with minimum first group) =
$\alpha_2$ (0 + Lmax/6 + Lmax/6) + $\alpha_3$ (Lmax/6 + 2Lmax/6) +
$\alpha_3$ (3Lmax/6 + Lmax/6 + Lmax/6) + $\alpha_4$ (3Lmax/6 + 2Lmax/6) +
$\alpha_4$ (4Lmax/6 + 2Lmax/6) + $\alpha_4$ (3Lmax/6 + Lmax/6 + Lmax/6) =
(2$\alpha_2$ + 8$\alpha_3$ + 16$\alpha_4$) · Lmax/6

In this case, as the first group G1 is formed only by the two vacant cells 3a' alone, the average moving distance for the main access motion becomes 0 as indicated by the above equation (14). However, as there is always a need to carry the cartridge 1 temporarily stored in the first group G1 to the other groups, the pre-access and post-access motions cannot be omitted even when most of the related data to be accessed successively are stored in a plurality of cartridges 1 gathered near the disk drive 2. In this case, no cartridge remains in the first group G1 for any extended period of time, so that $\alpha_1=0$ all the times, and $\alpha_2=1$ when most of the related data to be accessed successively are stored in a plurality of cartridges 1 gathered near the disk drive 2.

It can be seen from the above equation (13) and (15) that, when most of the related data to be accessed successively are stored in a plurality of cartridges 1 gathered in the second group G2, i.e., nearly $\alpha_2=1$, the average moving distance for each of the pre-access and post-access motions is going to be Lmax/3. Thus, the total average number of times for moving the robotic hand 4 throughout the pre-access, main access, and post-access motions is about the nine times which is the same as the conventional system, but the total average moving distance is 2Lmax/3 which amounts to approximately 66% reduction compared with the conventional system.

On the other hand, when the related data to be accessed successively are distributed at random over the three groups G2, G3, and G4, i.e., $\alpha_2=\alpha_3=\alpha_4=\frac{1}{3}$, the average moving distance for the pre-access motion is going to be Lmax while the average moving distance for the post-access motion is going to be 13Lmax/9, so that it is possible to realize almost the same level of the performance as in the conventional system except for the small increase of the average moving distance.

Thus, the provision to form the first group G1 by just the two vacant cells 3a' as in this modification of FIG. 17 is suitable when it is desired to minimize the amount of time required for exchanging the cartridges 1, whereas the provision to secure the two vacant cells 3a' within the first group G1 as in the case of FIG. 13 or FIG. 15 is suitable when it is desired to reduce the moving distance of the robotic hand 4 or the number of times for moving the robotic hand 4. It is also possible to adjust the size of the first group G1 compared with the size of the other group according to the need, so as to take the advantages of these two extreme cases at the same time.

It is also to be noted here that the modifications similar to those mentioned for the first and second embodiments described above can also be made for this third embodiment as well.

As described, according to the media library system of this third embodiment, it becomes possible to arrange the cartridges 1 with the higher utilization frequencies in the group with the shorter carrying distance all the times, and in addition, when the most of the related data to be accessed successively are stored in a plurality of cartridges 1 gathered near the disk drive 2, it becomes possible to reduce the movement of the robotic hand 4 considerably, such that the average moving distance of the robotic hand 4 and the average number of times for moving the robotic hand 4 can be reduced significantly, and the disk exchange performance of the system can be improved remarkably. Here, the average moving distance of the robotic hand 4 decreases in counter-proportion to the number of groups by which the storehouse 3 is divided, and the substantial reduction of the average moving distance of the robotic hand 4 can be achieved even with the minimum configuration using only two groups.

Figure 18:
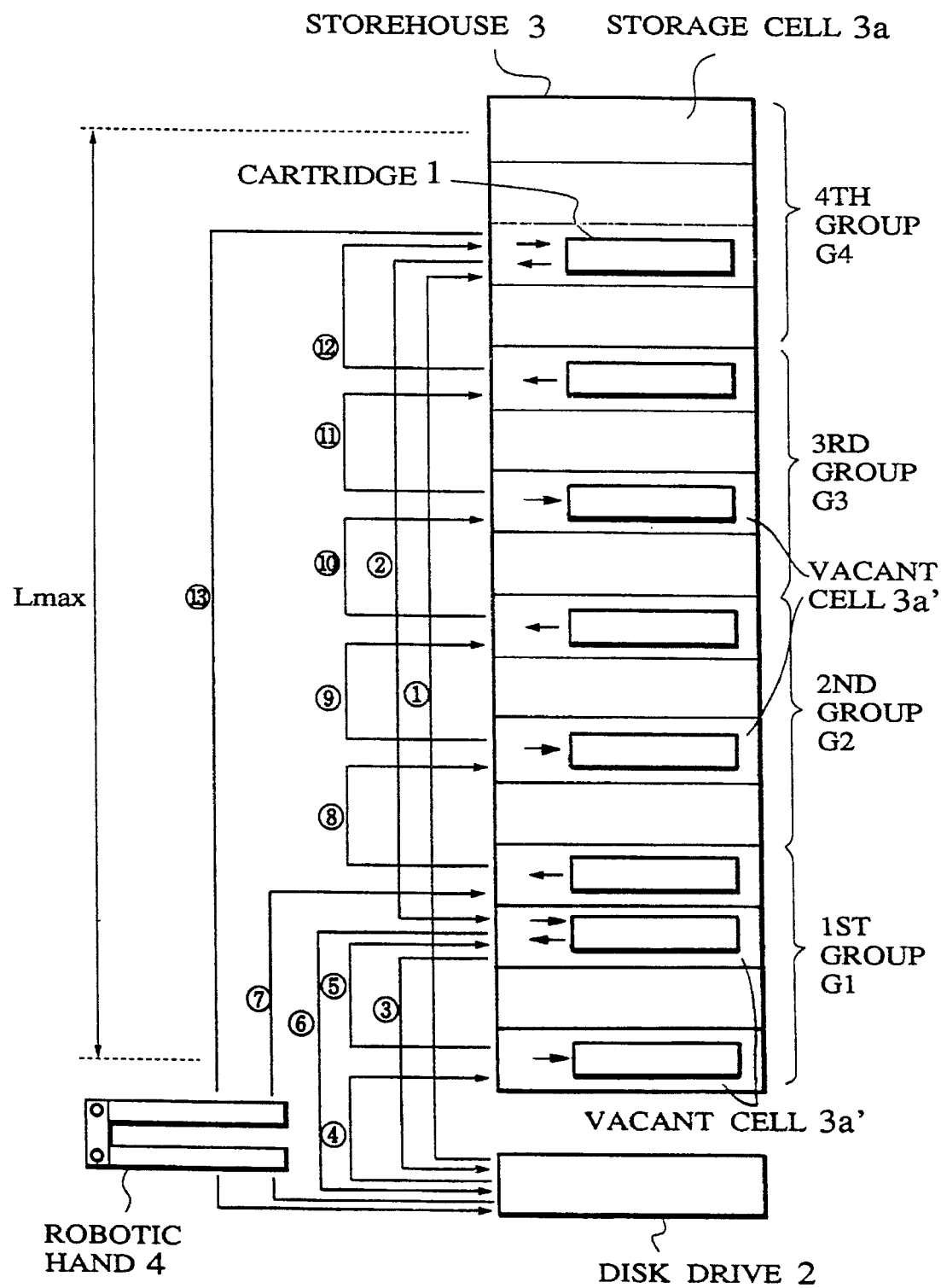
FIG. 18 is a diagram of a schematic configuration of a fourth embodiment of a media library system according to the present invention, showing a case of taking a new cartridge from a fourth group.

Referring now to FIG. 18, the fourth embodiment of a media library system according to the present invention will be described in detail.

In this fourth embodiment, the system has a schematic configuration as shown in FIG. 18, where the same reference numerals as in FIG. 3 described above are used for the corresponding elements of the system. Here, as indicated in FIG. 18, the storage cells 3a of the storehouse 3 are managed in at least three groups (four groups G1, G2, G3, and G4 in this embodiment) in a descending order of closeness to the disk drive 2. Also, the cartridges 1 are managed such that two vacant cells 3a' are always provided within the first group G1, i.e., the group which is closest to the disk drive 2 among all the groups, while one vacant cell 3a' is always provided within each of the groups G2 and G3, i.e., the groups other than the above noted first group G1 and the fourth group G4 which is farthest from the disk drive 2 among all the groups. Thus, this fourth embodiment is effectively a hybrid of the second embodiment of FIG. 8 and the third embodiment of FIGS. 13 and 15.

Figure 19B:
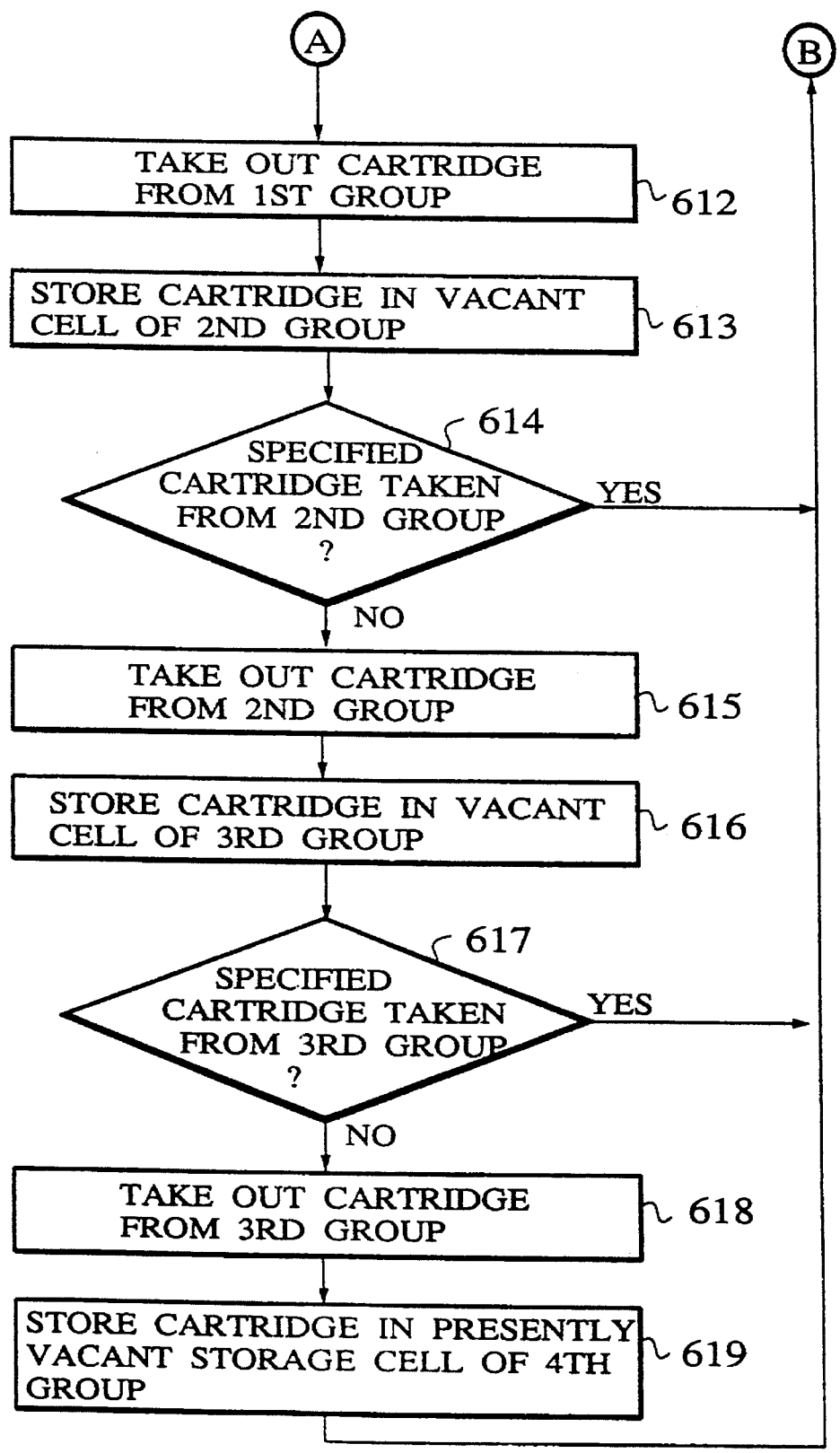

In this media library system of FIG. 18, the cartridge 1 mounted on the disk drive 2 is exchanged with another cartridge 1 stored in the storehouse 3 by the operation of the robotic hand 4 as indicated in FIG. 18, according to the flow chart of FIG. 19 as follows. In FIG. 18, the encircled numbers accompanying arrows indicate the orders of the movements of the robotic hand 4 as before.

First, whether a disk exchange command is issued or not is judged (step 601), and if so, whether the next cartridge 1 to be mounted on the disk drive 2 is stored in the storage cell 3a of the first group G1 or not is judged (step 602). When the next cartridge 1 is stored in the first group G1 (step 602 YES), the finishing of the data read/write with respect to the cartridge currently mounted on the disk drive 2 is awaited (step 603), and as the data read/write is finished, the robotic hand 4 takes out the cartridge 1 currently mounted on the disk drive 2 (step 604) and moves to one of the vacant cells 3a' of the first group G1 in the storehouse 3 so as to store this cartridge 1 in one of the vacant cells 3a' (step 605).

Next, the robotic hand 4 moves to the storage cell 3a of the first group G1 storing the next cartridge 1 to be mounted to the disk drive 2 which is specified by the disk exchange command, to take out the next cartridge 1 from this storage cell 3a, and then moves to the disk drive 2 to mount the next cartridge 1 on the disk drive 2 (step 606). The data read/write operation with respect to the next cartridge 1 is then carried out at the disk drive 2, while the process returns to the step 601 to await for the next disk exchange command. In this case, the storage cell 3a from which the next cartridge 1 has been taken will serve as a new vacant cell in place of one of the vacant cells 3a' to which the previous cartridge 1 taken out from the disk drive 2 has been stored.

On the other hand, when the next cartridge 1 is not stored in the first group G1 (step 602 NO), the process proceeds to the step 607 at which the robotic hand 4 moves to the storage cell 3a storing the next cartridge 1 to be mounted to the disk drive 2 which is specified by the disk exchange command (arrow ①), to take out the next cartridge 1 from this storage cell 3a, and then moves to one of the vacant cells 3a' of the first group G1 (arrow ②) to temporarily store the next cartridge 1 there (step 607), while the data read/write with respect to the cartridge 1 currently mounted on the disk drive 2 is carried out by the disk drive 2.

Then, the finishing of the data read/write with respect to the cartridge currently mounted on the disk drive 2 is awaited (step 608), and as the data read/write is finished, the robotic hand 4 moves to the disk drive 2 (arrow ③) to take out the cartridge 1 currently mounted on the disk drive 2 (step 609) and moves to another one of the vacant cells 3a' of the first group G1 in the storehouse 3 (arrow ④) so as to store this previous cartridge 1 there (step 610). After that, the robotic hand 4 moves to one of the vacant cells 3a' of the first group G1 to which the next cartridge 1 has been temporarily stored (arrow ⑤) to take out the next cartridge 1 and then moves to the disk drive 2 (arrow ⑥) to mount the next cartridge 1 on the disk drive 2 (step 611).

Next, the robotic hand 4 moves to the storage cell 3a of the first group G1 storing the cartridge 1 with the lowest utilization frequency among the cartridges 1 stored in the first group G1 according to the data memorized in the access controller (arrow ⑦) so as to take out this cartridge 1 with the lowest utilization frequency (step 612). Then, the robotic hand 4 moves to the vacant cell 3a' in the second group G2 (arrow ⑧) and stores the cartridge 1 with the lowest utilization frequency into that vacant cell 3a' in the second group G2 (step 613) so as to create a new vacant cell 3a' in the first group G1.

Then, whether the next cartridge 1 to be mounted on the disk drive 2 has been taken at the step 607 from the storage cell 3a of the second group G2 or not is judged (step 614). When the next cartridge 1 is taken from the second group G2 (step 614 YES), the storage cell 3a from which the next cartridge 1 has been taken will serve as a new vacant cell in place of the vacant cell 3a' to which the cartridge 1 with the lowest utilization frequency from the first group G1 has been stored, so that the process returns to the step 601 to await for the next disk exchange command.

On the other hand, when the next cartridge 1 has not been taken from the second group G2 (step 614 NO), the robotic hand 4 moves to the storage cell 3a of the second group G2 storing the cartridge 1 with the lowest utilization frequency among the cartridges 1 stored in the second group G2 according to the data memorized in the access controller (arrow ⑨) so as to take out this cartridge 1 with the lowest utilization frequency (step 615). Then, the robotic hand 4 moves to the vacant cell 3a' in the third group G3 (arrow ⑩) and stores the cartridge 1 with the lowest utilization frequency into that vacant cell 3a' in the third group G3 (step 616) so as to create a new vacant cell 3a' in the second group G2.

Then, whether the next cartridge 1 to be mounted on the disk drive 2 has been taken at the step 607 from the storage cell 3a of the third group G3 or not is judged (step 617). When the next cartridge 1 is taken from the third group G3 (step 617 YES), the storage cell 3a from which the next cartridge 1 has been taken will serve as a new vacant cell in place of the vacant cell 3a' to which the cartridge 1 with the lowest utilization frequency from the second group G2 has been stored, so that the process returns to the step 601 to await for the next disk exchange command.

On the other hand, when the next cartridge 1 has not been taken from the third group G3 (step 617 NO), i.e., when the next cartridge 1 has been taken from the fourth group G4, the robotic hand 4 moves to the storage cell 3a of the third group G3 storing the cartridge 1 with the lowest utilization frequency among the cartridges 1 stored in the third group G3 according to the data memorized in the access controller (arrow ⑪) so as to take out this cartridge 1 with the lowest utilization frequency (step 618). Then, the robotic hand 4 moves to the storage cell 3a in the fourth group G4 from which the next cartridge 1 has been taken out at the step 607 (arrow ⑫) and stores the cartridge 1 with the lowest utilization frequency into that presently vacant storage cell 3a in the fourth group G4 (step 619) so as to create a new vacant cell 3a' in the third group G3. Then, the robotic hand 4 returns to the disk drive 2 (arrow ⑬) while the process returns to the step 601 to await for the next disk exchange command.

In this manner, two vacant cells 3a' are always secured within the first group G1 while one vacant cell 3a' is always secured within each of the second and third group G2 and G3 after the rearrangement of the cartridges 1 is completed. This rearrangement of the cartridges 1 at the steps 612 to 619 can be carried out by utilizing any available idle time after the disk exchange operation at the steps 607 to 611. As a result of this rearrangement of the cartridges 1, it becomes possible to arrange the cartridges 1 with the higher utilization frequencies in the groups with the shorter carrying distances, so that the probability for the exchange of the cartridges 1 to take a shorter time can be increased and consequently the average moving distance of the robotic hand 4 can be reduced.

Now, the effect of the reduction of the average moving distance in this media library system of the third embodiment will be explained in comparison to the conventional media library system of FIG. 2. Here, for the sake of simplicity, the shortest access distance from the disk drive 2 to the storehouse 3 is set to be 0 while the longest access distance from the disk drive 2 to the storehouse 3 is set to be Lmax.

Also, the movement of the robotic hand 4 is divided into three stages of a pre-access motion for moving the next cartridge 1 to a vicinity of the disk drive 2 prior to the actual timing for access to the next cartridge 1, a main access motion for taking out the previous cartridge 1 from the disk drive 2 to move it to a vicinity of the disk drive 2 and mounting the next cartridge 1 on the disk drive 2, and a post-access motion for returning the previous cartridge 1 that has been moved to a vicinity of the disk drive 2 back to an appropriate storage cell 3a of the storehouse 3.

In a case of the conventional media library system as shown in FIG. 2, the average moving distance of the robotic hand 4 required for the pre-access, main access, and post-access motions is given by the equation (7) as described above.

In contrast, in the fourth embodiment of FIG. 18, the entire first group G1 which is closer to the disk drive 2 is going to play a role of the escape cells in the conventional system, so that the pre-access motion will not be carried out for the cartridges 1 already stored in the first group G1.

On the other hand, in the pre-access motion carried out with respect to the other groups, the next cartridge 1 is going to be temporarily stored in one of the two vacant cells $3a'$ which are secured within the first group G1 all the times. In this case, in the pre-access motion carried out with respect to the second group G2, the robotic hand 4 moves for the average moving distance of 3Lmax/8 from the disk drive 2 to the storage cell 3a of the second group G2 storing the next cartridge 1, and moves for the average moving distance of 2Lmax/8 from there to one of the vacant cells $3a'$ of the first group G1, and then moves for the average moving distance of Lmax/8 to return to the disk drive 2.

Similarly, in the pre-access motion carried out with respect to the third group G3, the robotic hand 4 moves for the average moving distance of 5Lmax/8 from the disk drive 2 to the storage cell 3a of the third group G3 storing the next cartridge 1, and moves for the average moving distance of 4Lmax/8 from there to one of the vacant cells $3a'$ of the first group G1, and then moves for the average moving distance of Lmax/8 to return to the disk drive 2.

Similarly, in the pre-access motion carried out with respect to the fourth group G4, the robotic hand 4 moves for the average moving distance of 7Lmax/8 from the disk drive 2 to the storage cell 3a of the fourth group G4 storing the next cartridge 1, and moves for the average moving distance of 6Lmax/8 from there to one of the vacant cells $3a'$ of the first group G1, and then moves for the average moving distance of Lmax/8 to return to the disk drive 2. In this manner, the next cartridge 1 is going to be positioned within the first group G1 by the pre-access motion. In a case the next cartridge 1 is already stored within the first group G1, the pre-access motion will not be carried out as already mentioned.

Next, in the main access motion, the robotic hand 4 moves for the average moving distance of Lmax/8 to carry the previous cartridge 1 to another one of the vacant cells $3a'$ of the first group G1 to temporarily store it there. Then, the robotic hand 4 moves to the position of either one of the vacant cells $3a'$ of the first group G1 to which the next cartridge 1 has been temporarily stored by the pre-access motion or the storage cell 3a of the first group G1 storing the next cartridge 1. Here, the robotic hand 4 is going to move between arbitrary two points within the first group G1, so that the average moving distance is going to be Lmax/12. Then, the robotic hand 4 moves for the average moving distance of Lmax/8 to carry the next cartridge 1 to the disk drive 2 so as to mount it thereon.

In this main access motion, in a case the next cartridge 1 is already stored in the first group G1, a new vacant cell $3a'$ is going to be created in the first group G1 as this next cartridge 1 is moved to the disk drive 2, so that the positions of the two vacant cells $3a'$ of the first group G1 are changed sequentially. However, in a case the next cartridge 1 is taken from the other groups, the next cartridge 1 is going to be moved to one of the vacant cells $3a'$ of the first group G1 by the pre-access motion and then moved to the disk drive 2 from there, so that the positions of the vacant cells $3a'$ in the first group G1 are not going to be changed in this case. Note here that the robotic hand 4 sequentially moves among the disk drive 2, one of the vacant cells $3a'$, and another one of the vacant cells $3a'$ in any case, so that regardless of where the vacant cells $3a'$ are located, the total moving distance of the robotic hand 4 is going to be the same.

Next, as for the post-access motion, it will not be carried out for the cartridges 1 already stored in the first group G1. On the other hand, in the post-access motion carried out with respect to the second group G2, the robotic hand 4 moves for the average moving distance of Lmax/8 from the disk drive 2 to the position of the cartridge 1 with the lowest utilization frequency within the first group G1, then moves for the average moving distance of Lmax/4 to store this cartridge 1 with the lowest utilization frequency in the vacant cell $3a'$ of the second group G2, and finally moves for the average moving distance of 3Lmax/8 to return from there to the disk drive 2. Here, in addition to the originally provided vacant cell $3a'$, the second group G2 also contains the presently vacant storage cell 3a from which the next cartridge 1 has been taken in the pre-access motion, so that the cartridge with the lowest utilization frequency from the first group G1 may be stored in this presently vacant storage cell 3a instead.

Similarly, in the post-access motion carried out with respect to the third group G3, the robotic hand 4 moves for the average moving distance of Lmax/8 from the disk drive 2 to the position of the cartridge 1 with the lowest utilization frequency within the first group G1, and then moves for the average moving distance of Lmax/4 to store this cartridge 1 with the lowest utilization frequency in the vacant cell $3a'$ of the second group G2. Then, the robotic hand 4 moves for the average moving distance of Lmax/12 from there to the position of the cartridge 1 with the lowest utilization frequency within the second group G2, then moves for the average moving distance of Lmax/4 to store this cartridge 1 with the lowest utilization frequency in the vacant cell $3a'$ of the third group G3, and finally moves for the average moving distance of 5Lmax/8 to return from there to the disk drive 2. Here, in addition to the originally provided vacant cell $3a'$, the third group G3 also contains the presently vacant storage cell 3a from which the next cartridge 1 has been taken in the pre-access motion, so that the cartridge with the lowest utilization frequency from the second group G2 may be stored in this presently vacant storage cell 3a instead.

Similarly, in the post-access motion carried out with respect to the fourth group G4, the robotic hand 4 moves for the average moving distance of Lmax/8 from the disk drive 2 to the position of the cartridge 1 with the lowest utilization frequency within the first group G1, and then moves for the average moving distance of Lmax/4 to store this cartridge 1 with the lowest utilization frequency in the vacant cell $3a'$ of the second group G2. Then, the robotic hand 4 moves for the average moving d/stance of Lmax/12 from there to the position of the cartridge 1 with the lowest utilization frequency within the second group G2, and then moves for the average moving distance of Lmax/4 to store this cartridge 1 with the lowest utilization frequency in the vacant cell $3a'$ of the third group G3. Then, the robotic hand 4 moves for the average moving distance of Lmax/12 from there to the position of the cartridge 1 with the lowest utilization frequency within the third group G3, then moves for the average moving distance of Lmax/4 to store this cartridge 1 with the lowest utilization frequency in the presently vacant storage cell 3a of the fourth group G4 from which the next cartridge 1 has been taken in the pre-access motion, and finally moves for the average moving distance of 7Lmax/8 to return from there to the disk drive 2.

Now, when the probability for the specified cartridge 1 to be present in the n-th group is set to $\alpha_n$, the average moving distances of the robotic hand 4 for the pre-access, main access, and post-access motions are given by:

Average moving distance for pre-access motion (16)
(# of groups = 4, for fourth embodiment) =
$\alpha_2$ (3Lmax/8 + 2Lmax/8 + Lmax/8) + $\alpha_3$ (5Lmax/8 + 4Lmax/8 + Lmax/8) + $\alpha_4$ (7Lmax/8 + 6Lmax/8 + Lmax/8) =
(6$\alpha_2$ + 10$\alpha_3$ + 14$\alpha_4$) · Lmax/8

Average moving distance for main access motion (17)
(# of groups = 4, for fourth embodiment) =
Lmax/8 + Lmax/12 + Lmax/8 = Lmax/3

Average moving distance for post-access motion (18)
(# of groups = 4, for fourth embodiment) =
$\alpha_2$ (Lmax/8 + Lmax/4 + 3Lmax/8) + $\alpha_3$ (Lmax/8 + Lmax/4) + $\alpha_3$ (Lmax/12 + Lmax/4 + 5Lmax/8) + $\alpha_4$ (Lmax/8 + Lmax/4) + $\alpha_4$ (Lmax/12 + Lmax/4) + $\alpha_4$ (Lmax/12 + Lmax/4 + 7Lmax/8) =
3$\alpha_2$ · Lmax/4 + 4$\alpha_3$ · Lmax/3 + 23$\alpha_4$ · Lmax/12

Then, if it is assumed that all the related data to be accessed successively are stored in a plurality of cartridges 1 gathered in the first group G1, i.e., $\alpha_1$=1, in the next cartridge 1 is always going to be present in the first group G1, so that the average moving distance for the main access motion is going to be Lmax/3 according to the above equation (17), and the average moving distance for the pre-access and post-access motions is going to be 0 according to the above equations (16) and (16). In comparison with the conventional system of FIG. 2, the average moving distance for the main access motion alone is going to be increased from 0 to Lmax/3, but the total average moving distance including the pre-access and post-access motions as well is going to be reduced from 2Lmax to Lmax/3, which amounts to the reduction of the average moving distance to be ⅙.

This is because the pre-access and post-access motions are not carried out at all in this third embodiment when the next cartridge 1 is already stored in the first group G1, so that the average moving distance of 0 literally indicates that the robotic hand 4 does not move at all, compared with the conventional system in which the robotic hand 4 moves for the average moving distance of 2Lmax by moving six times for the purpose of the pre-access and post-access motions.

This reduction of the number of times for moving the robotic hand 4 is advantageous from the point of view of the disk exchange capability per unit time or the improvement of the MTBF (Mean Time Between Failure) of the robotic hand 4, as the robotic hand 4 of the media library system for carrying the cartridge 1 has a relatively large size and requires a significant amount of time for start or stop moving in general.

Moreover, even if it is assumed that the related data to be accessed successively are distributed at random over the four groups G1, G2, G3, and G4, i.e., $\alpha_1$=$\alpha_2$=$\alpha_3$=$\alpha_4$=0.25, the total average moving distance of the robotic hand 4 in this fourth embodiment is going to be 61Lmax/32 according to the above equations (16) to (17), which is nearly the same as the total average moving distance of the conventional system for which is 2Lmax.

Also, in this case, the probability for the post-access motions to be carried out in this fourth embodiment is ¼, so that the number of times for moving the robotic hand 4 is six times which is also the same as that in the conventional system. Consequently, as long as the number of groups used in this fourth embodiment is set to be less than or equal to 4, the performance superior than the conventional system can be guaranteed.

On the other hand, when the number of groups used in this fourth embodiment is greater than 4, the average moving distance of the robotic hand 4 and the average number of times for moving the robotic hand 4 will be reduced in counter-proportion to the number of groups, but the average moving distance of the robotic hand 4 and the average number of times for moving the robotic hand 4 will be increased in the post-access motion, so that it is preferable to use the number of groups less than or equal to 4 in a case the access probability is uniformly distributed for all the cartridges 1, while it is preferable to use the number of groups greater than 5 in a case the access probability is irregularly distributed for different cartridges 1.

Thus, in this fourth embodiment, the storage cells 3a of the storehouse 3 are divided into the four groups G1, G2, G3, and G4 with different carrying distances with respect to the disk drive 2, and the pre-access and post-access motions are carried out only with respect to the groups G2, G3, and G4 with the longer carrying distances, so that the average moving distance of the robotic hand 4 can be shortened and the number of times for moving the robotic hand 4 can be reduced.

In addition, in a case the specified cartridge 1 is taken out from the group other than the first group G1 which is relatively farther to the disk drive 2, the cartridge 1 with the lowest utilization frequency among each group closer to the disk drive 2 is sequentially moved to the adjacent group farther from the disk drive 2 so as to secure a new vacant cell 3a' in each group other than the group farthest from the disk drive 2, so that it is possible to put the cartridges 1 with the higher utilization frequencies in the groups with the shorter carrying distances all the times, and consequently it is possible to reduce the average moving distance of the robotic hand 4 considerably.

Also, in this fourth embodiment, the cartridge 1 with the lowest utilization frequency among each group closer to the disk drive 2 is sequentially moved to the adjacent group farther from the disk drive 2, that is, all the cartridges 1 except for that mounted on the disk drive 2 are going to be compared in terms of their utilization frequencies. Thus, the cartridge 1 that has just been returned from the disk drive 2 to the first group G1 may be moved to the second or farther located group immediately if its utilization frequency is very low. Consequently, the grouping according to the utilization frequencies of the cartridges 1 can be achieved by the single rearrangement operation, and the cartridges 1 can always be arranged in an order of their utilization frequencies.

Now, as a modification of the fourth embodiment described above, a case of dividing the storehouse 3 into four groups as in the above and forming the first group G1 which has the shortest carrying distance with respect to the disk drive 2 by just two vacant cells 3a' alone will be described.

Figure 20:
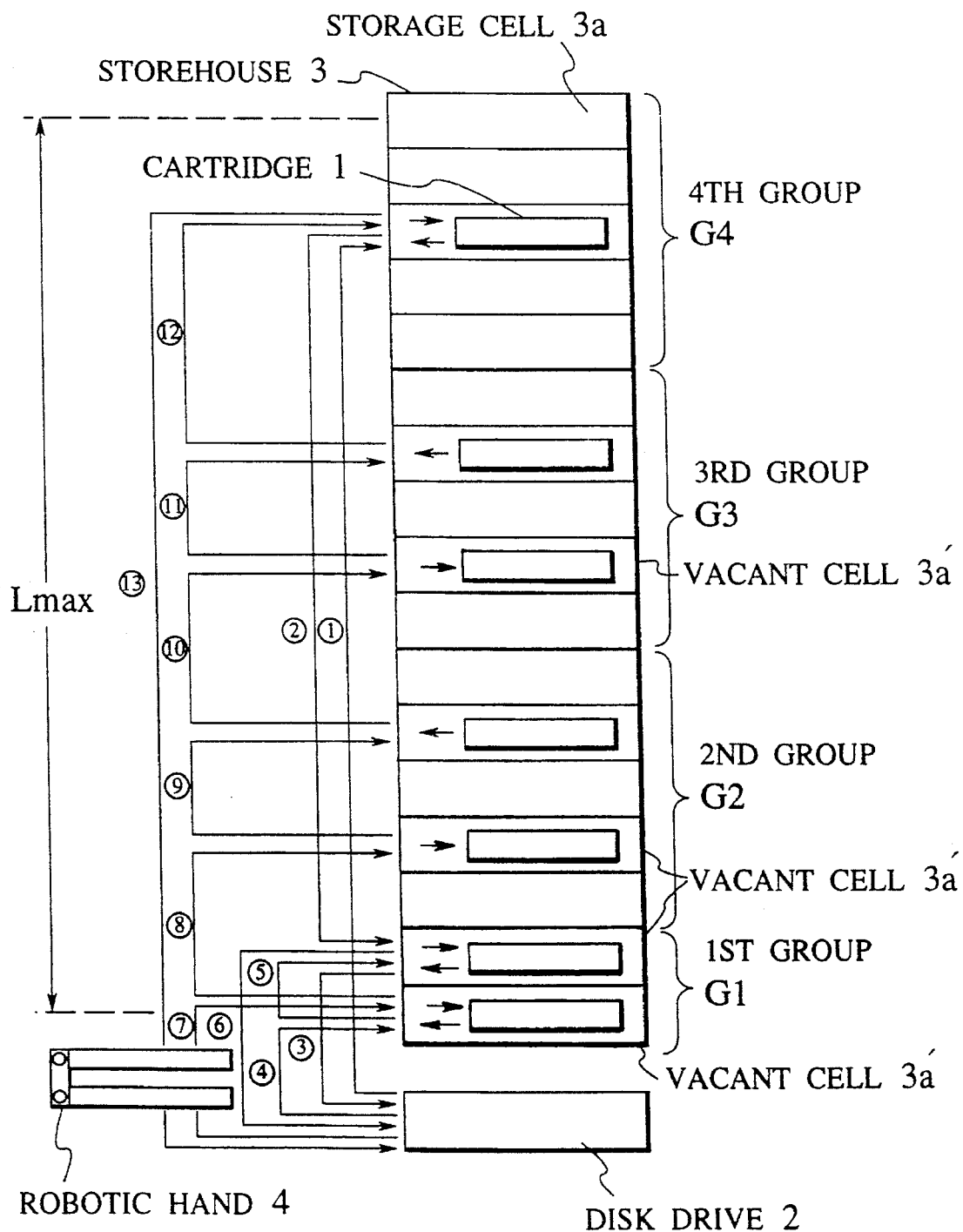
FIG. 20 is a diagram of a schematic configuration of one modification of the fourth embodiment of FIG. 18, showing a case of using four groups with a first group containing vacant cells alone and taking a new cartridge from a fourth group.

In this case, the system has a schematic configuration as shown in FIG. 20, where the same reference numerals as in FIG. 18 described above are used for the corresponding elements of the system. Here, as indicated in FIG. 20, the storage cells 3a of the storehouse 3 are managed in four groups G1, G2, G3, and G4 in a descending order of closeness to the disk drive 2, where the first group G1 comprises two vacant cells 3a' alone, while one vacant cell 3a' is always provided within each of the groups G2 and G3, i.e., the groups other than the above noted first group G1 and the fourth group G4 which is farthest from the disk drive 2 among all the groups. In this case, the operation of the system is substantially similar to that according to the flow chart of FIG. 19 for the above described case of FIG. 18.

In this case, in the pre-access motion carried out with respect to the second group G2, the robotic hand 4 moves for the average moving distance of Lmax/6 from the disk drive 2 to the storage cell 3a of the second group G2 storing the next cartridge 1, and moves for the average moving distance of Lmax/6 from there to one of the vacant cells 3a' of the first group G1, and then moves for the average moving distance of 0 to return to the disk drive 2.

Similarly, in the pre-access motion carried out with respect to the third group G3, the robotic hand 4 moves for the average moving distance of 3Lmax/6 from the disk drive 2 to the storage cell 3a of the third group G3 storing the next cartridge 1, and moves for the average moving distance of 3Lmax/6 from there to one of the vacant cells 3a' of the first group G1, and then moves for the average moving distance of 0 to return to the disk drive 2.

Similarly, in the pre-access motion carried out with respect to the fourth group G4, the robotic hand 4 moves for the average moving distance of 5Lmax/6 from the disk drive 2 to the storage cell 3a of the fourth group G4 storing the next cartridge 1, and moves for the average moving distance of 5Lmax/6 from there to one of the vacant cells 3a' of the first group G1, and then moves for the average moving distance of 0 to return to the disk drive 2.

Next, in the main access motion, regardless of from which group the next cartridge 1 has been taken, the robotic hand 4 moves only between the first group G1 and the disk drive 2. Namely, the robotic hand 4 moves for the average moving distance of 0 to carry the previous cartridge 1 to another one of the vacant cells 3a' of the first group G1 to temporarily store it there. Then, the robotic hand 4 moves for the average moving distance of 0 to the position of one of the vacant cells 3a' of the first group G1 to which the next cartridge 1 has been temporarily stored by the pre-access motion. Then, the robotic hand 4 moves for the average moving distance of 0 to carry the next cartridge 1 to the disk drive 2 so as to mount it thereon. Thus, the average moving distance for the main access motion in this case is equal to 0.

Next, in the post-access motion carried out with respect to the second group G2, the robotic hand 4 moves for the average moving distance of 0 from the disk drive 2 to the position of another one of the vacant cells 3a' of the first group G1 to take out the previous cartridge 1 temporarily stored therein, then moves for the average moving distance of Lmax/6 to store this previous cartridge 1 in the vacant cell 3a' of the second group G2, and finally moves for the average moving distance of Lmax/6 to return from there to the disk drive 2.

Similarly, in the post-access motion carried out with respect to the third group G3, the robotic hand 4 moves for the average moving distance of 0 from the disk drive 2 to the position of another one of the vacant cells 3a' of the first group G1 to take out the previous cartridge 1 temporarily stored therein, then moves for the average moving distance of Lmax/6 to store this previous cartridge 1 in the vacant cell 3a' of the second group G2. Then, the robotic hand 4 moves for the average moving distance of Lmax/9 from there to the position of the cartridge 1 with the lowest utilization frequency within the second group G2, and then moves for the average moving distance of 2Lmax/6 to store this cartridge 1 with the lowest utilization frequency in the vacant cell 3a' of the third group G3. Then, the robotic hand 4 moves for the average moving distance of 3Lmax/6 to return from there to the disk drive 2.

Similarly, in the post-access motion carried out with respect to the fourth group G4, the robotic hand 4 moves for the average moving distance of 0 from the disk drive 2 to the position of another one of the vacant cells 3a' of the first group G1 to take out the previous cartridge 1 temporarily stored therein, then moves for the average moving distance of Lmax/6 to store this previous cartridge 1 in the vacant cell 3a' of the second group G2. Then, the robotic hand 4 moves for the average moving distance of Lmax/9 from there to the position of the cartridge 1 with the lowest utilization frequency within the second group G2, and then moves for the average moving distance of 2Lmax/6 to store this cartridge 1 with the lowest utilization frequency in the vacant cell 3a' of the third group G3. Then, the robotic hand 4 moves for the average moving distance of Lmax/9 from there to the position of the cartridge 1 with the lowest utilization frequency within the third group G3, and then moves for the average moving distance of 2Lmax/6 to store this cartridge 1 with the lowest utilization frequency in the presently vacant storage cell 3a of the fourth group G4. Then, the robotic hand 4 moves for the average moving distance of 5Lmax/6 to return from there to the disk drive 2.

Now, when the probability for the specified cartridge to be present in the n-th group is set to $\alpha_n$, the average moving distances of the robotic hand 4 for the pre-access, main access, and post-access motions are given by:

Average moving distance for pre-access motion (19)
(# of groups = 4 with minimum first group, for fourth embodiment) =
$\alpha_2$ (Lmax/6 + Lmax/6 + 0) + $\alpha_3$ (3Lmax/6 + 3Lmax/6 + 0) +
$\alpha_4$ (5Lmax/6 + 5Lmax/6 + 0) = (2$\alpha_2$ + 6$\alpha_3$ + 10$\alpha_4$) · Lmax/6

Average moving distance for main access motion (20)
(# of groups = 4 with minimum first group, for fourth embodiment) =
0 + 0 + 0 = 0

Average moving distance for post-access motion (21)
(# of groups = 4 with minimum first group, for fourth embodiment) =
$\alpha_2$ (0 + Lmax/6 + Lmax/6) + $\alpha_3$ (0 + Lmax/6) +
$\alpha_3$ (Lmax/9 + 2Lmax/6 + 3Lmax/6) + $\alpha_4$ (0 + Lmax/6) +
$\alpha_4$ (Lmax/9 + 2Lmax/6) + $\alpha_4$ (Lmax/9 + 2Lmax/6 + 5Lmax/6) =
2$\alpha_2$ · Lmax/6 + 10$\alpha_3$ · Lmax/9 + 17$\alpha_4$ · Lmax/9

In this case, as the first group G1 is formed only by the two vacant cells 3a' alone, the average moving distance for the main access motion becomes 0 as indicated by the above equation (20). However, as there is always a need to carry the cartridge 1 temporarily stored in the first group G1 to the other groups, the pre-access and post-access motions cannot be omitted even when most of the related data to be accessed successively are stored in a plurality of cartridges 1 gathered near the disk drive 2. In this case, no cartridge remains in the first group G1 for any extended period of time, so that $\alpha_1$=0 all the times, and $\alpha_2$=1 when most of the related data to be accessed successively are stored in a plurality of cartridges 1 gathered near the disk drive 2.

It can be seen from the above equation (19) and (21) that, when most of the related data to be accessed successively are stored in a plurality of cartridges 1 gathered in the second group G2, i.e., nearly $\alpha_2$=1, the average moving distance for each of the pre-access and post-access motions is going to be Lmax/3. Thus, the total average number of times for moving the robotic hand 4 throughout the pre-access, main access, and post-access motions is about the nine times which is the same as the conventional system, but the total average moving distance is 2Lmax/3 which amounts to the reduction to approximately ⅙ of that in the conventional system.

On the other hand, when the related data to be accessed successively are distributed at random over the three groups G2, G3, and G4, i.e., $\alpha_2=\alpha_3=\alpha_4=\frac{1}{3}$, the average moving distance for the pre-access motion is going to be Lmax and the average moving distance for the post-access motion is going to be 10Lmax/9, so that it is possible to realize almost the same level of the performance as in the conventional system except for the small increase of the average moving distance.

Thus, the provision to form the first group G1 by just the two vacant cells 3a' as in this modification of FIG. 20 is suitable when it is desired to minimize the amount of time required for exchanging the cartridges 1, whereas the provision to secure the two vacant cells 3a' within the first group G1 as in the case of FIG. 18 is suitable when it is desired to reduce the moving distance of the robotic hand 4 or the number of times for moving the robotic hand 4. It is also possible to adjust the size of the first group G1 compared with the size of the other group according to the need, so as to take the advantages of these two extreme cases at the same time.

It is also to be noted here that the modifications similar to those mentioned for the first, second, and third embodiments described above can also be made for this fourth embodiment as well.

As described, according to the media library system of this fourth embodiment, it becomes possible to arrange the cartridges 1 with the higher utilization frequencies in the group with the shorter carrying distance all the times, and in addition, when the most of the related data to be accessed successively are stored in a plurality of cartridges 1 gathered near the disk drive 2, it becomes possible to reduce the movement of the robotic hand 4 considerably, such that the average moving distance of the robotic hand 4 and the average number of times for moving the robotic hand 4 can be reduced significantly, and the disk exchange performance of the system can be improved remarkably. Here, the average moving distance of the robotic hand 4 decreases in counter-proportion to the number of groups by which the storehouse 3 is divided, and the substantial reduction of the average moving distance of the robotic hand 4 can be achieved.

Also, in this fourth embodiment, the cartridge 1 with the lowest utilization frequency among each group closer to the disk drive 2 is sequentially moved to the adjacent group farther from the disk drive 2, that is, all the cartridges 1 except for that mounted on the disk drive 2 are going to be compared in terms of their utilization frequencies. Thus, the cartridge 1 that has just been returned from the disk drive 2 to the first group G1 may be moved to the second or farther located group immediately if its utilization frequency is very low. Consequently, the grouping according to the utilization frequencies of the cartridges 1 can be achieved by the single rearrangement operation, and the cartridges 1 can always be arranged in an order of their utilization frequencies.

Now, the concrete examples of the physical configuration of the media library system applicable to all of the above described first to fourth embodiments will be described in detail.

Figure 21:
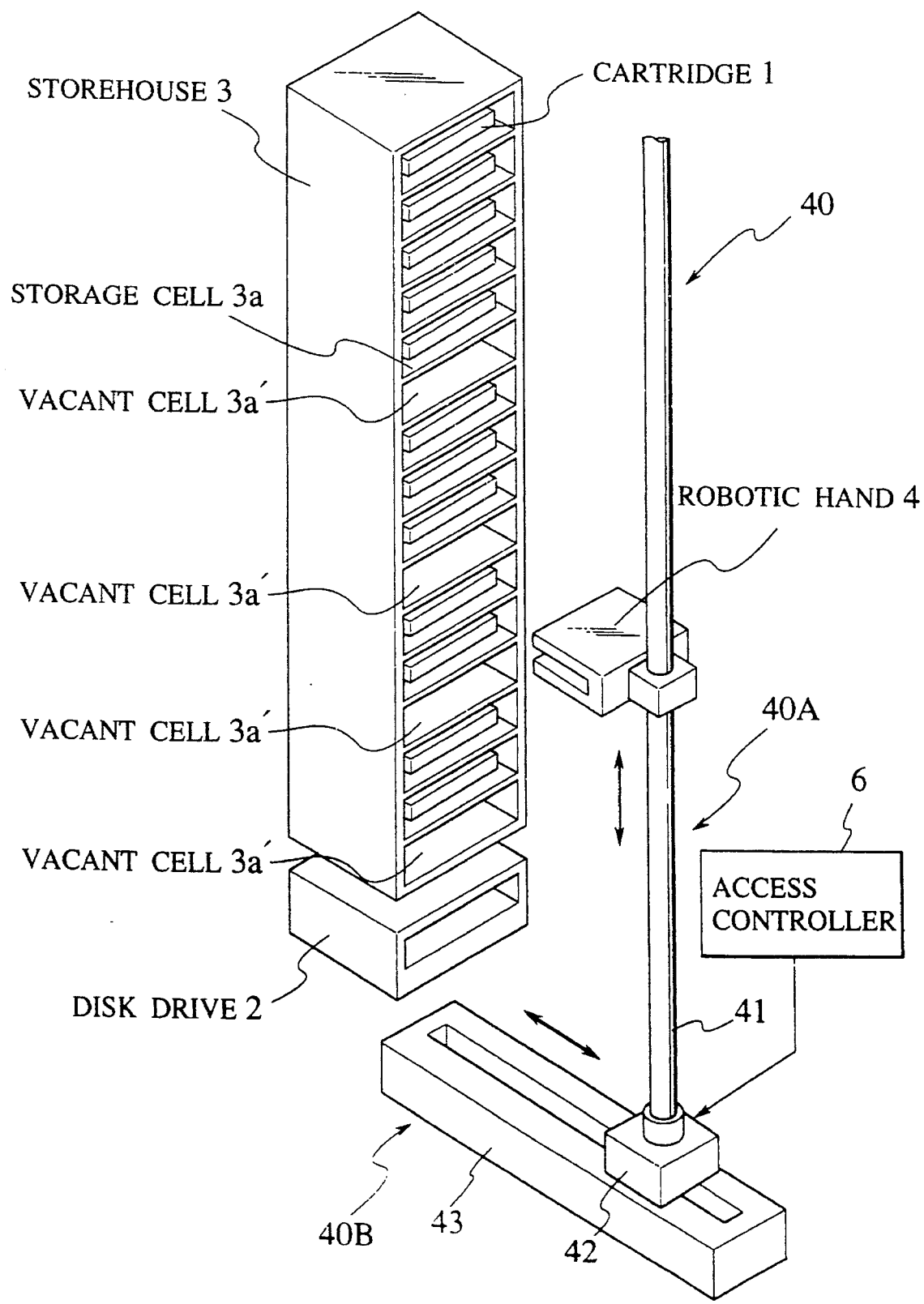
FIG. 21 is a perspective view of one exemplary physical configuration of a media library system according to the present invention.

FIG. 21 shows one example of a physical configuration of the media library system in which the storehouse 3 has a plurality of storage cells 3a and vacant cells 3a' arranged one dimensionally along a vertical direction, where each storage cell 3a can store any one of the cartridges 1. The disk drive 2 is located directly below this storehouse 3, and in front of these storehouse 3 and disk drive 2, the hand driving mechanism 40 is provided.

This hand driving mechanism 40 includes a vertical driving mechanism 40A for moving the robotic hand 4 in the vertical direction, i.e., up or down, and a horizontal driving mechanism 40B for moving the robotic hand 4 in the horizontal direction, i.e., toward or away from the disk drive 2 and the storehouse 3. The vertical driving mechanism 40A has a guide shaft 41 extended in the vertical direction, on which the robotic hand 4 is supported to be movable up and down by means of a motor (not shown) and a gear (not shown) engaged with the guide shaft 41 which are provided within the robotic hand 4. The horizontal driving mechanism 40B has a base member 42 for supporting the guide shaft 41 and a guide member 43 along which the base member 42 is movable by means of a motor (not shown) or a cylinder (not shown) provided within the base member 42 such that the vertical driving mechanism 40A as a whole can be moved toward or away from the disk drive 2 and the storehouse 3. In this hand driving mechanism 40, the robotic hand 4 can be moved to the position of any desired one of the disk drive 2 and the storage cells 3a and the vacant cells 3a' of the storehouse 3 by means of the vertical driving mechanism 40A while the vertical driving mechanism 40A as a whole can be moved toward or away from the disk drive 2 and the storehouse 3 so as to take out or store the cartridge 1 with respect to any desired one of the disk drive 2 and the storage cells 3a and the vacant cells 3a' of the storehouse 3.

It is to be noted that this physical configuration of the hand driving mechanism 40 shown in FIG. 21 is only an example, and can be modified in any suitable manner.

The operation of this hand driving mechanism is controlled by the program loaded in the access controller 6, according to the utilization frequency of each cartridge 1 such as the frequency determined by the number of times for which each cartridge 1 has been mounted on the disk drive 2 within a prescribed period of time. In this case, each cartridge 1 is assigned with a unique identification number, and the access controller 6 manages which cartridge 1 of which identification number is stored in which storage cell 3a of the storehouse 3 in response to each access request. The access controller 6 also memorizes the date and the time of the access request with respect to each cartridge 1 and determines the utilization frequency of each cartridge 1 as a number of times for which each cartridge 1 has been accessed within a prescribed period of time before the latest access request.

In this physical configuration of FIG. 21, the groups of the storage cells 3a of the storehouse 3 are going to be arranged along the vertical direction according to the required access distances as in the above described first to fourth embodiments.

Figure 22:
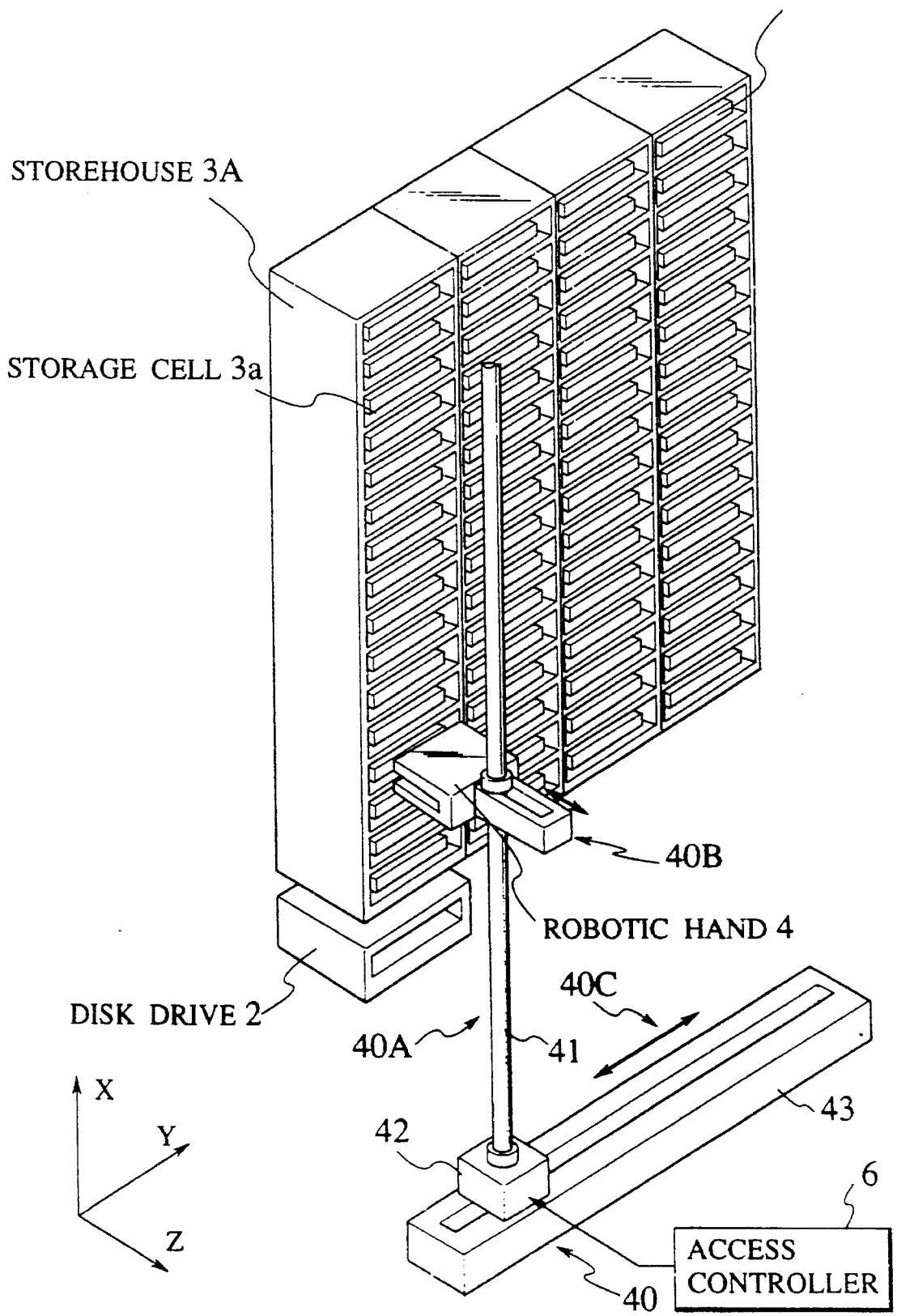
FIG. 22 is a perspective view of another exemplary physical configuration of a media library system according to the present invention.

FIG. 22 shows another example of a physical configuration of the media library system in which the storehouse 3 has a plurality of storage cells 3a and vacant cells 3a' arranged two dimensionally in a matrix form. The disk drive 2 is located directly below this storehouse 3, and in front of these storehouse 3 and disk drive 2, the hand driving mechanism 40 is provided just as in a case of FIG. 21.

In this case, the hand driving mechanism 40 includes an X-direction driving mechanism 40A for moving the robotic hand 4 in the vertical direction (X-direction), i.e., up or down, an Z-direction driving mechanism 40B for moving the robotic hand 4 in the Z-direction, i.e., toward or away from the disk drive 2 and the storehouse 3, and a Y-direction driving mechanism 40C for moving the robotic hand 4 in the Y-direction, 1.e., from one column to another column in the storehouse 3. The vertical driving mechanism 40A has the guide shaft 41 extended in the vertical direction, on which the robotic hand 4 is supported to be movable up and down just as in FIG. 21. The Z-direction driving mechanism 40B is capable of moving the robotic hand 4 with respect to the guide shaft 41 in the Z-direction, i.e., toward or away from the disk drive 2 and the storehouse 3. The Y-direction driving mechanism 40C has the base member 42 for supporting the guide shaft 41 and the guide member 43 along which the base member 42 is movable in the Y-direction. In this hand driving mechanism 40, the robotic hand 4 can be moved to the position of any desired one of the disk drive 2 and the storage cells 3a and the vacant cells 3a' of the storehouse 3 by moving in the X-and Y-direction.

Figure 23:
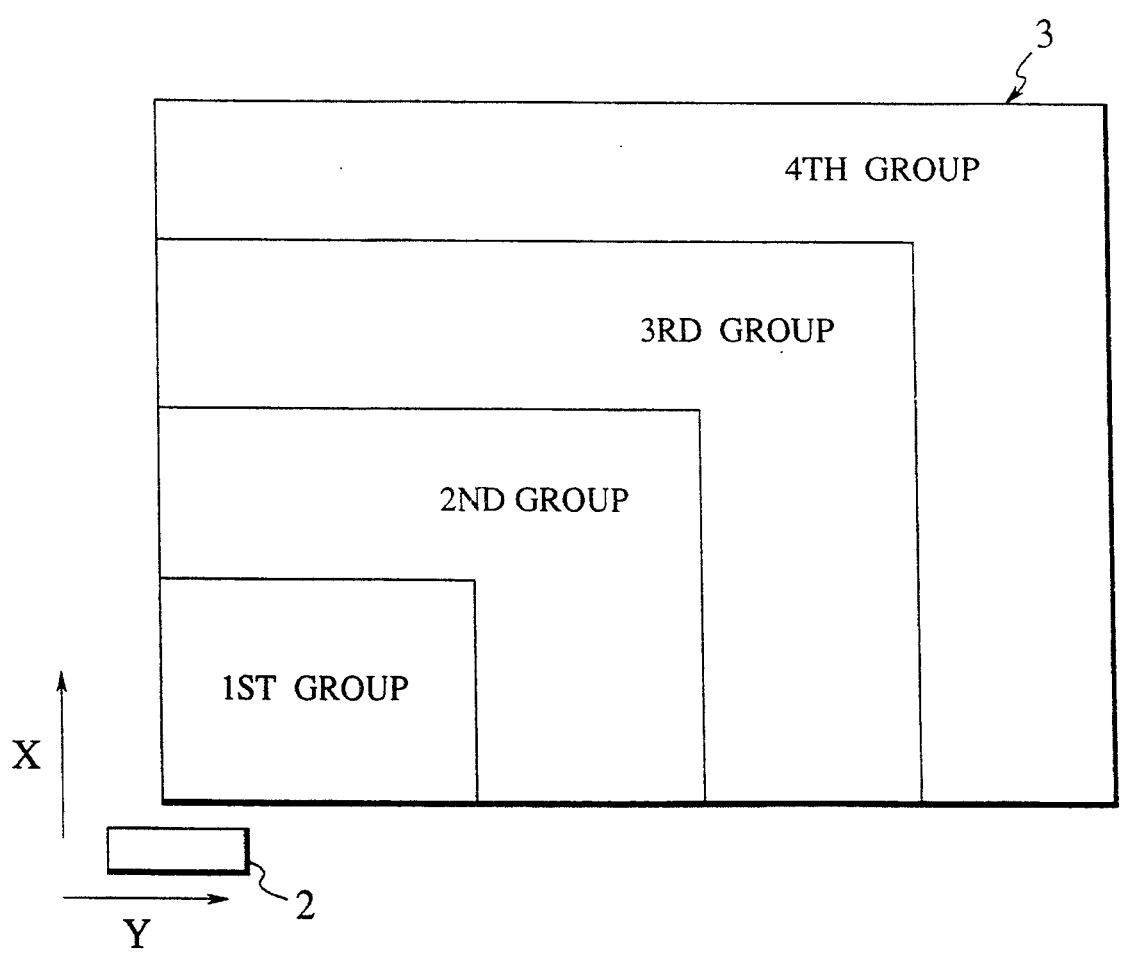
FIG. 23 is a diagram indicating a manner of dividing a storehouse into four groups in a case of using the physical configuration of FIG. 22.
Figure 24:
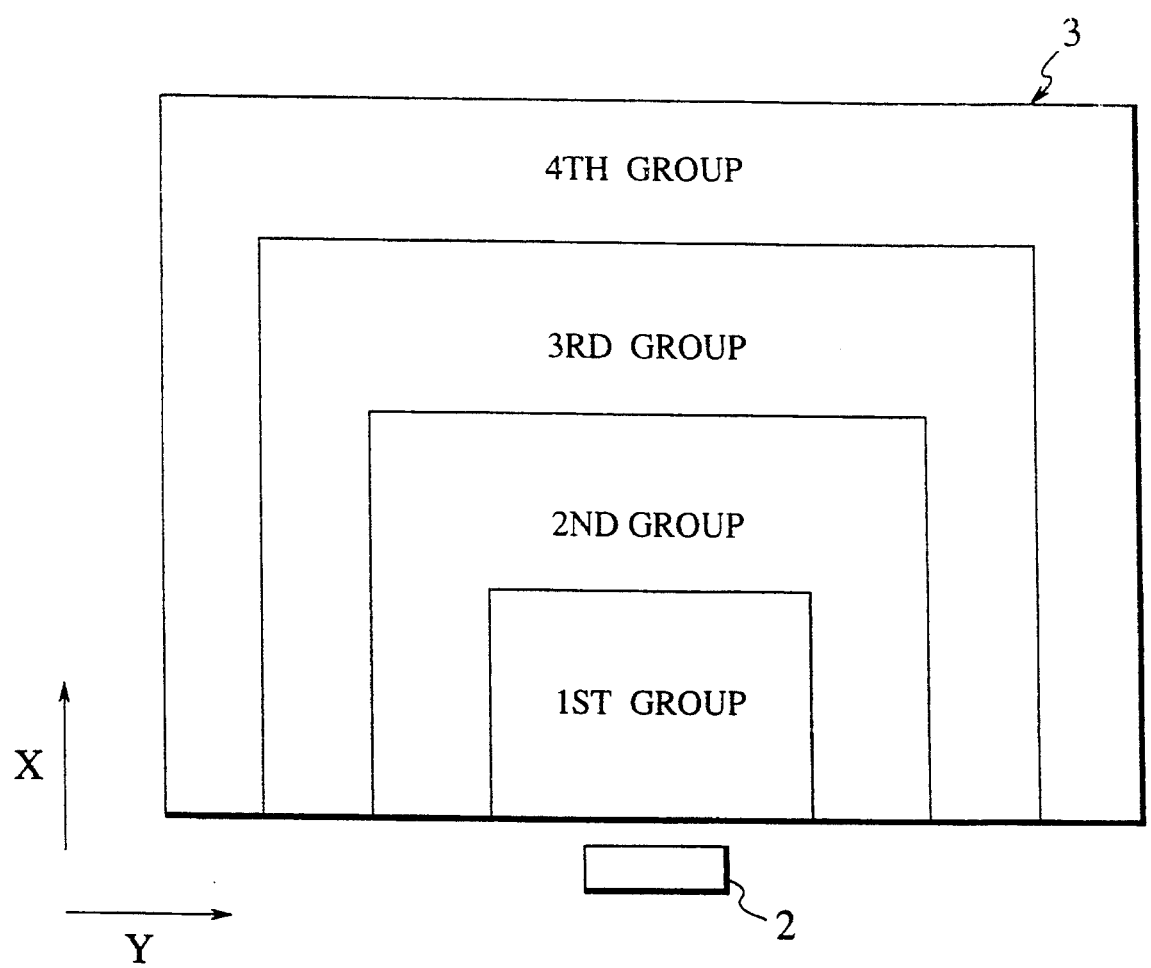
FIG. 24 is a diagram indicating a manner of dividing a storehouse into four groups in a case of a position of a disk drive in the physical configuration of FIG. 22 is modified.

In this physical configuration of FIG. 22, the storage cells 3a of the storehouse 3 are also going to be divided according to the required access distances, so that when the disk drive 2 is located at one lower corner of the storehouse 3 as shown in FIG. 22, the storage cells 3a of storehouse 3 are grouped according to their distances in the vertical (X–) direction and the horizontal (Y–) direction with respect to this disk drive 2, so that each group generally takes an inverted L-shape, as shown in FIG. 23. In contrast, when the disk drive 2 is located at a lower center of the storehouse 3 in order to reduce the access time, the storage cells 3a of storehouse 3 are grouped according to their distances in the vertical (X–) direction and the horizontal (Y–) direction with respect to this disk drive 2, so that each group generally takes an inverted U-shape, as shown in FIG. 24.

Figure 25:
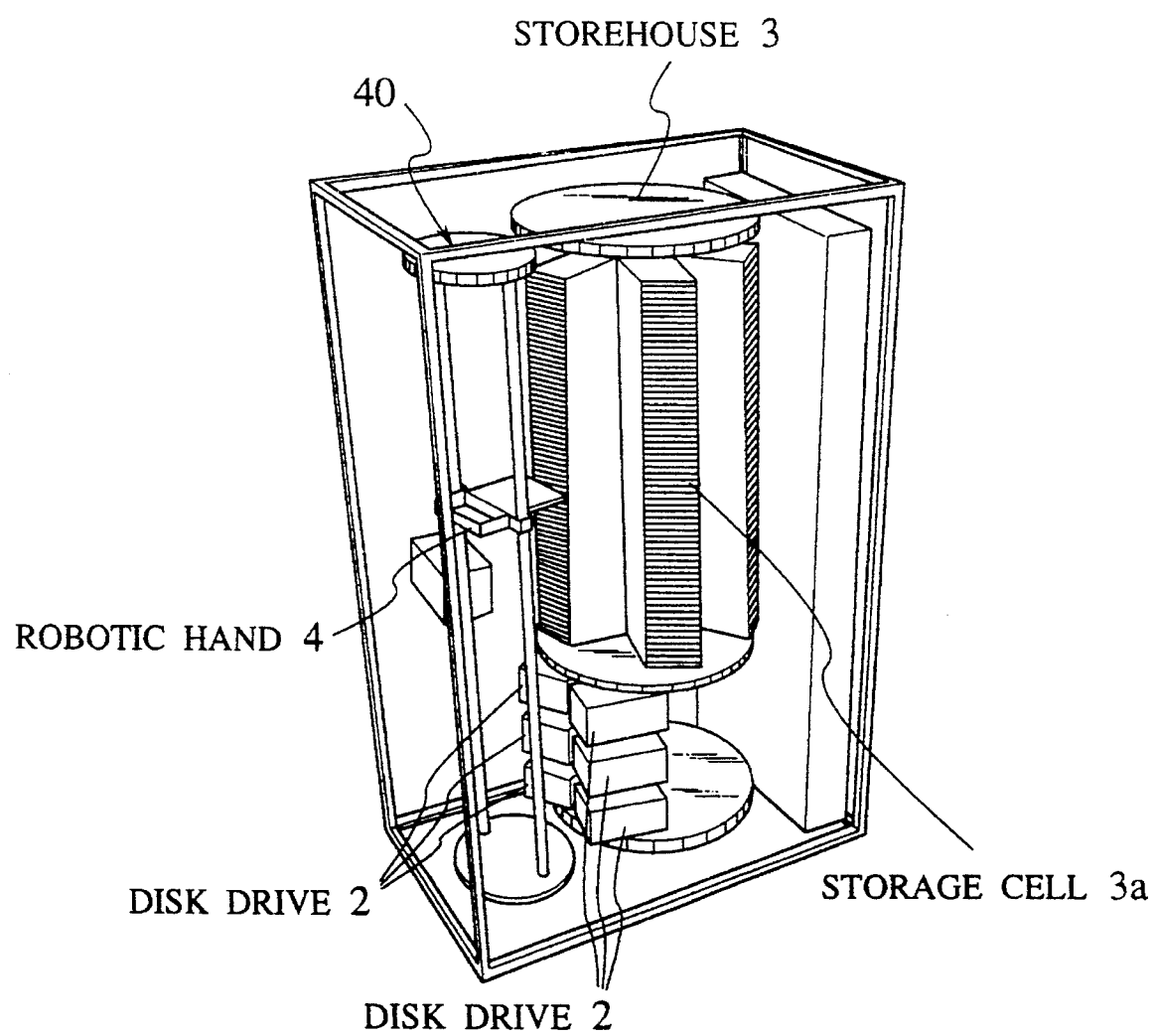
FIG. 25 is a perspective view of still another exemplary physical configuration of a media library system according to the present invention.

FIG. 25 shows another example of a physical configuration of the media library system in which the storehouse 3 is cylindrical shaped and made to be rotatable, such that a plurality of storage cells 3a and vacant cells 3a' are arranged on a cylindrical surface of this cylindrical storehouse 3. In this case, the access to each cartridge is achieved by combining the vertical motion of the robotic hand 4 as in FIG. 21 with the rotation of the storehouse 3. This physical configuration of FIG. 25 can be regarded as equivalent to the configuration of FIG. 22 with the storehouse 3 rolled up to form a cylindrical shape while the disk drive 2 is located at a lower center, so that the arrangement of the groups of the storage cells 3a is going to be similar to that shown in FIG. 24. It is also possible to provide a plurality of disk drives 2 below the storehouse 3 as shown in FIG. 25.

Figure 26:
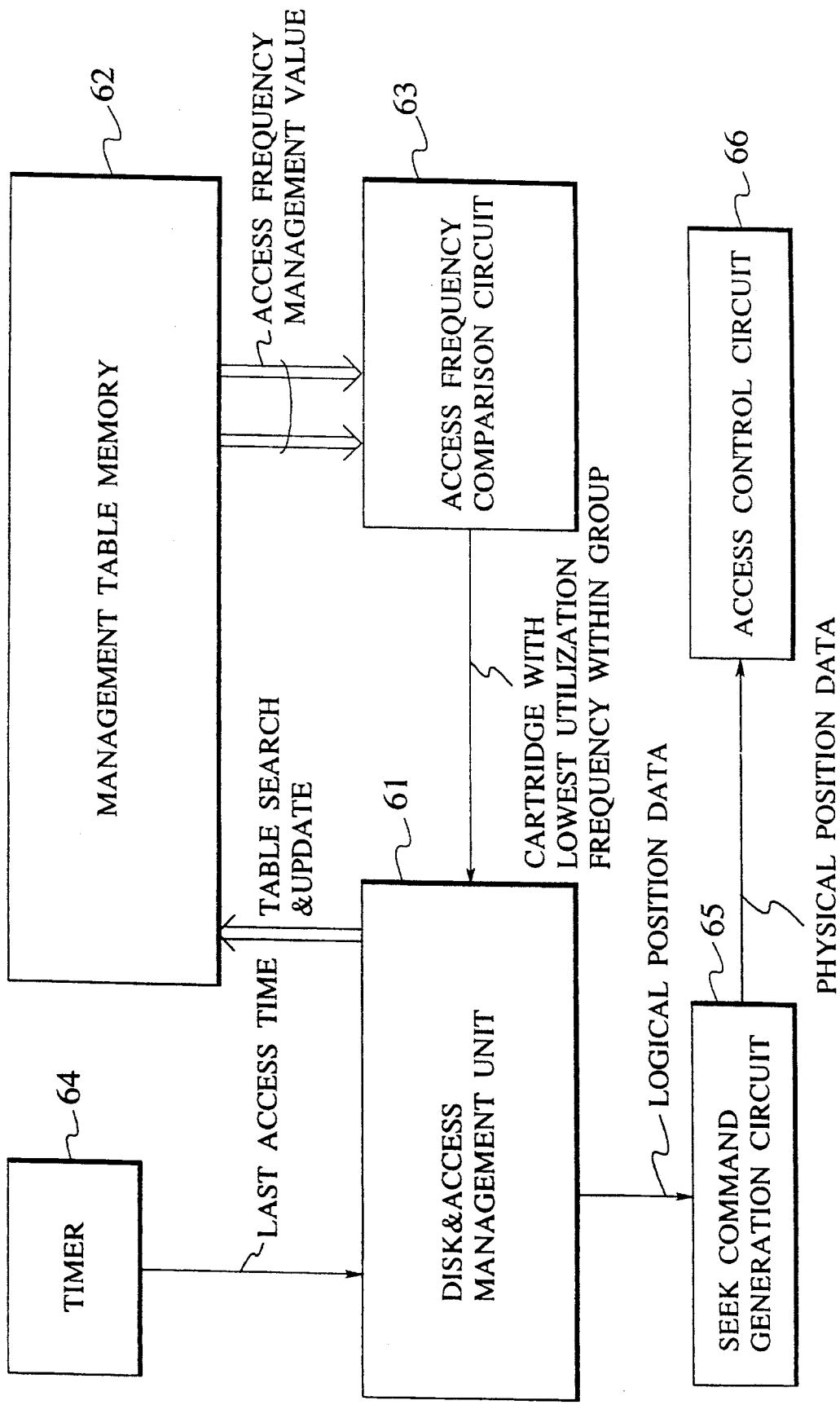
FIG. 26 is a block diagram for an exemplary hardware configuration of an access controller in a media library system according to the present invention.

FIG. 26 shows one example of a hardware configuration of the access controller 6, which comprises a disk and access management unit 61 for managing the cartridges 1 in the storehouse 3 and the access by the robotic hand 4, a management table memory 62 for memorizing the data on the stored position and the access frequency of each cartridge 1 which can be searched and updated by the disk and access management unit 61, an access frequency comparison circuit 63 for comparing the access frequencies of the cartridges 1 within the same group to indicate the cartridge 1 with the lowest utilization frequency within each group, a timer 64 for providing a reference time to be used at the disk and access management unit 61, a seek command generation circuit 65 for determining the access motion of the robotic hand 4 from the logical position data from the disk and access management unit 61 and outputting the seek command indicating the physical position data for the motions of the robotic hand 4 such as the holding of the cartridge 1 and the seeking of the appropriate position, and an access control circuit 66 for controlling the motion of the robotic hand 4 according to the seek command from the seek command generation circuit 65.

Figure 27:
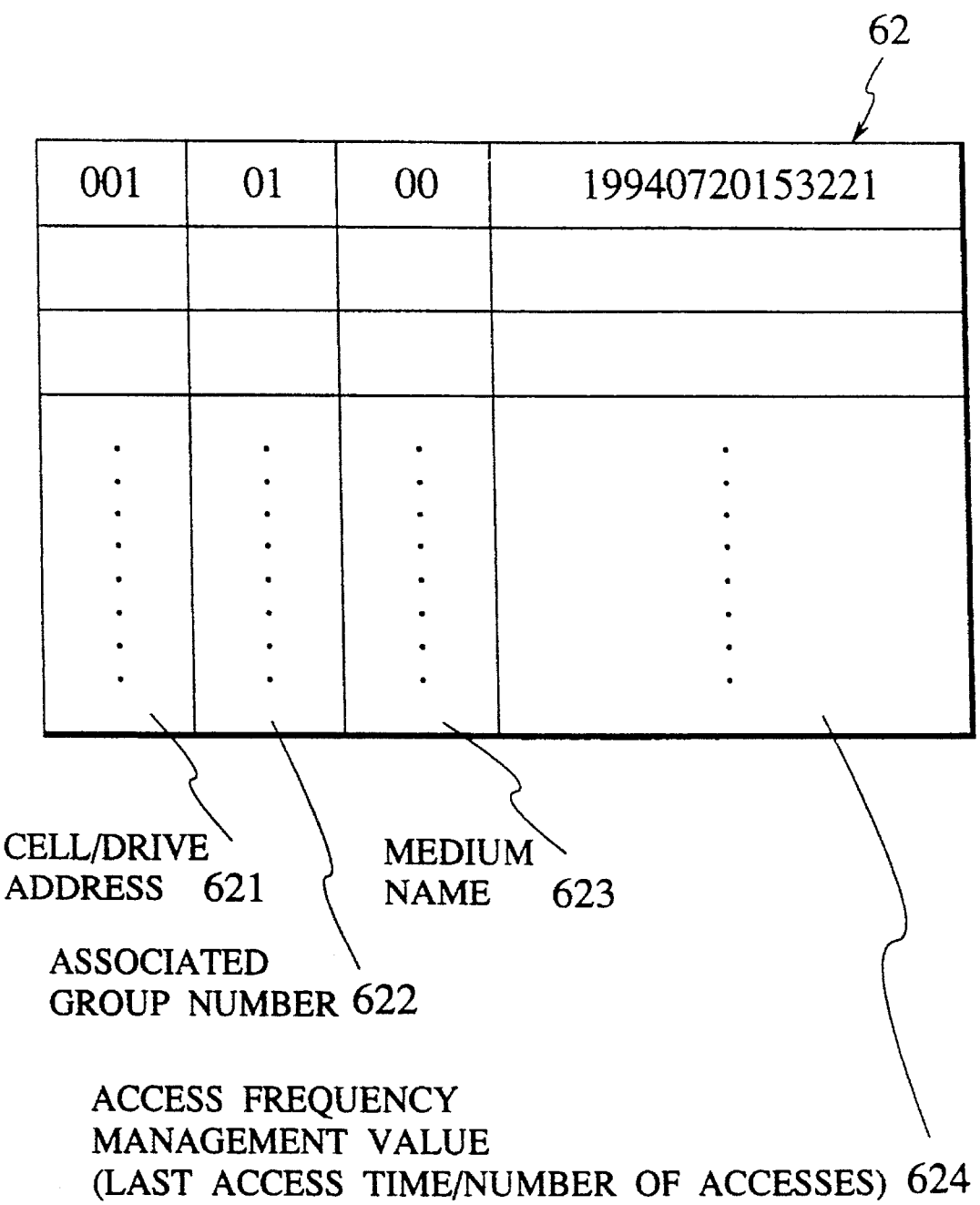
FIG. 27 is a diagram indicating an exemplary data content of a management table memory in the access controller of FIG. 26.

Here, the management table memory 62 has a data structure as shown in FIG. 27, where each entry for each cartridge 1 has fields for a cell/drive address 621, am associated group number 622, a medium name 623, and an access frequency management value 624 which can be given by the last access time or the number of accesses.

In general, the access frequency can be given in terms of the elapsed time since the last access or the number of accesses within a prescribed period of time, and in a case of weighting the possibility for re-access to each cartridge 1 more heavily, the elapsed time since the last access is more suitable. In this case, the actual time of the last access can be specified as the access frequency management value in terms of year, month, day, hour, minutes, and seconds, as in an exemplary entry shown in FIG. 27. In this case, the comparison of the access frequencies can be realized by a simple subtraction of one recorded time data from another.

In this access controller 6 of FIG. 26, whenever the access request for a particular disk is received, the disk and access management unit 61 first searches out the moving target position of the previous cartridge 1 currently mounted on the disk drive 2 (i.e., the vacant cell 3a' in the first group) and the position of the disk drive 2 that is available for driving the new cartridge 1 in a case there are more than one disk drives 2. Then, the intended movements of the previous and new cartridges 1 are recorded in the management table memory 62 while the logical position data for the robotic hand 4 corresponding to the intended movements are supplied to the seek command generation circuit 65.

Next, when the robotic hand 4 has completed the movements of the previous and new cartridges 1 as intended, the disk and access management unit 61 selects the cartridge 1 with the lowest utilization frequency from each group by using the access frequency comparison circuit 63, and searches out the moving target position for that cartridge 1 with the lowest utilization frequency (such as the vacant cell 3a' in the second group for the cartridge 1 with the lowest utilization frequency within the first group, for example). Then, the intended movement of the cartridge 1 with the lowest utilization frequency within each group is recorded in the management table memory 62 while the logical position data for the robotic hand 4 corresponding to the intended movement are supplied to the seek command generation circuit 65.

By repeating this operation as many times as necessary, the cartridges 1 are rearranged in an order of their access frequencies on the management table memory 62, and then the actual rearrangement of the cartridges 1 is carried out in the storehouse 3 accordingly, so as to realize the operation of any of the first to fourth embodiments described above.

It is to be noted here that besides those already mentioned above, many modifications and variations of the above embodiments may be made without departing from the novel and advantageous features of the present invention. Accordingly, all such modifications and variations are intended to be included within the scope of the appended claims.

What is claimed is:

1. A media library system, comprising:

a storehouse having a plurality of storage cells for storing a plurality of recording media;

media driving means for executing data read/write operations with respect to the recording media;

media carrying means for carrying the recording media between the storehouse and the media driving means, so as to exchange a previously used recording medium mounted on the media driving means with a new recording medium stored in the storehouse; and control means for controlling a media exchange operation of the media carrying means to exchange the previously used recording medium with the new recording medium such that the storage cells of the storehouse are divided into at least two groups arranged in an order of average distances with respect to the media driving means, including a first group with a shortest average distance with respect to the media driving means among said at least two groups and a last group with a longest average distance with respect to the media driving means among said at least two groups, and at least one vacant cell not storing any recording medium is secured among the storage cells of the first group after the media exchange operation is completed, wherein the control means controls the media exchange operation of the media carrying means such that the previously used recording medium is stored in the vacant cell of the first group first, and then the new recording medium is mounted on the media driving means from any one of said at least two groups, and in a case where the new recording medium is taken from one of said at least two groups other than the first group, one recording medium with a lowest utilization frequency among each group other than the last group is moved to a currently vacant cell in an adjacent group having a greater average distance with respect to the media driving means than said each group sequentially so as to secure said at least one vacant cell in the first group.

2. The system of claim 1, wherein the control means also manages the recording media stored in the storehouse by controlling the media exchange operation of the media carrying means according to a utilization frequency of each recording medium.

3. The system of claim 2, wherein the utilization frequency of each recording medium is determined by at least one of a number of times for which each recording medium has been used within a prescribed period of time and an elapsed time since a last time each recording medium has been used.

4. The system of claim 1, wherein the control means controls the media exchange operation of the media carrying means such that the storage cells of the storehouse are divided into more than two groups arranged in an order of average distances with respect to the media driving means, and at least one vacant cell not storing any recording medium is secured among the storage cells of at least one group among said more than two groups other than the first and last groups after the media exchange operation is completed.

5. The system of claim 4, wherein the control means controls the media exchange operation of the media carrying means such that in a case where the new recording medium is taken from one of said at least two groups other than the first group, said one recording medium with the lowest utilization frequency among each group other than the last group is moved to the currently vacant cell in the adjacent group sequentially from the first group until the currently vacant cell in said one of said more than two groups from which the new recording medium has been taken is filled.

6. A media library system, comprising
 a storehouse having a plurality of storage cells for storing a plurality 8 recording media:
 media driving means for executing data read/write operations with respect to the recording media;
 media carrying means for carrying the recording media between the storehouse and the media driving means, so as to exchange a previously used recording medium mounted on the media driving means with a new recording medium stored in the storehouse: and
 control means for controlling a media exchange operation of the media carrying means to exchange the previously used recording medium with the new recording medium such that the storage cells of the storehouse are divided into at least two groups arranged in an order of average distances with respect to the media driving means, including a first group with a shortest average distance with respect to the media driving means among said at least two groups and a last group with a longest average distance with respect to the media driving means among said at least two groups, and at least two vacant cells not storing any recording medium are secured among the storage cells of the first group after the media exchange operation is completed, wherein the control means controls the media exchange operation of the media carrying means such that, in a case where taking the new recording medium from one of said at least two groups other than the first group, the new recording medium is moved from said one of said at least two groups to one of said at least two vacant cells in the first group first, the previously used recording medium is stored in another one of said at least two vacant cells in the first group next, the new recording medium is mounted on the media driving means from said one of said at least two vacant cells in the first group next, and then one recording medium with a lowest utilization frequency among each group other than the last group is moved to a currently vacant cell in an adjacent group having a greater average distance with respect to the media driving means than said each group sequentially so as to secure said at least two vacant cells in the first group.

7. The system of claim 6, wherein the control means controls the media exchange operation of the media carrying means such that, in a case of taking the new recording medium from the first group, the previously used recording medium is stored in one of said at least two vacant cells of the first group first, and then the new recording medium is mounted on the media driving means from the first group, so as to secure said at least two vacant cells in the first group.

8. The system of claim, 6, wherein the control means controls the media exchange operation of the media carrying means such that the first group consists of said at least two vacant cells alone.

9. The system of claim 6, wherein the control means controls the media exchange operation of the media carrying means such that the storage cells of the storehouse are divided into more than two groups arranged in an order of average distances with respect to the media driving means, and at least one vacant cell not storing any recording medium is secured among the storage cells of at least one group among said more than two groups other than the first and last groups after the media exchange operation is completed.

10. The system of claim 9, wherein the control means controls the media exchange operation of the media carrying means such that, in a case of taking the new recording medium from the first group, the previously used recording medium is stored in one of said at least two vacant cells of the first group first, and then the new recording medium is mounted on the media driving means from the first group, so as to secure said at least two vacant cells in the first group and said at least one vacant cell in said at least one group among said more than two groups other than the first and last groups.

11. The system of claim 9, wherein the control means controls the media exchange operation of the media carrying means such that the first group consists of said at least two vacant cells alone.

12. The system of claim 9, wherein the control means controls the media exchange operation of the media carrying means such that in a case where the new recording medium is taken from one of said at least two groups other than the first group, said one recording medium with the lowest utilization frequency among each group other than the last group is moved to the currently vacant cell in the adjacent group sequentially from the first group until the currently vacant cell in said one of said more than two groups from which the new recording medium has been taken is filled.

13. A method for controlling a media library system including a storehouse having a plurality of storage cells for storing a plurality of recording media, media driving means for executing data read/write operations with respect to the recording media, and media carrying means for carrying the recording media between the storehouse and the media driving means, the method comprising the steps of:

driving the media carrying means to execute a media exchange operation to exchange a previously used recording medium mounted on the media driving means with a new recording medium stored in the storehouse; and controlling the media exchange operation of the media carrying means such that the storage cells of the storehouse are divided into at least two groups arranged in an order of average distances with respect to the media driving means, including a first group with a shortest average distance with respect to the media driving means among said at least two groups and a last group with a longest average distance with respect to the media driving means among said at least two groups, and at least one vacant cell not storing any recording medium is secured among the storage cells of the first group after the media exchange operation is completed, wherein the control step controls the media exchange operation of the media carrying means such that the previously used recording medium is stored in the vacant cell of the first group first, and then the new recording medium is mounted on the media driving means from any one of said at least two groups, and in a case where the new recording medium is taken from one of said at least two groups other than the first group, one recording medium with a lowest utilization frequency among each group other than the last group is moved to a currently vacant cell in an adjacent group having a greater average distance with respect to the media driving means than said each group sequentially so as to secure said at least one vacant cell in the first group.

14. The method of claim 13, wherein the control step also manages the recording media stored in the storehouse by controlling the media exchange operation of the media carrying means according to a utilization frequency of each recording medium.

15. The method of claim 14, wherein the utilization frequency of each recording medium is determined by at least one of a number-of times for which each recording medium has been used within a prescribed period of time and an elapsed time since a last time each recording medium has been used.

16. The method of claim 13, wherein the control step controls the media exchange operation of the media carrying means such that the storage cells of the storehouse are divided into more than two groups arranged in an order of average distances with respect to the media driving means, and at least one vacant cell not storing any recording medium is secured among the storage cells of at least one group among said more than two groups other than the first and last groups after the media exchange operation is completed.

17. The method of claim 16, wherein the controls step controls the media exchange operation of the media carrying means such that in a case where the new recording medium is taken from one of said at least two groups other than the first group, said one recording medium with the lowest utilization frequency among each group other than the last group is moved to the currently vacant cells in the adjacent group sequentially from the first group until the currently vacant cell in said one of said at least two groups from which the new recording medium has been taken is filled.

18. A method for controlling a media library system including a storehouse having a plurality of storage cells for storing a plurality of recording media, media driving means for executing data read/write operations with respect to the recording media, and media carrying means for carrying the recording media between the storehouse and the media driving means, the method comprising the steps of:

driving the media carrying means to execute a media exchange operation to exchange a previously used recording medium mounted on the media driving means with a new recording medium stored in the storehouse; and controlling the media exchange operation of the media carrying means such that the storage cells of the storehouse are divided into at least two groups arranged in an order of average distances with respect to the media driving means, including a first group with a shortest average distance with respect to the media driving means among said at least two groups and a last group with a longest average distance with respect to the media driving means among said at least two groups, and at least two vacant cells not storing any recording medium are secured among the storage cells of the first group after the media exchange operation is completed, wherein the control step controls the media exchange operation of the media carrying means that, in a case of taking the new recording medium from one of said at least two groups other than the first group, the new recording medium is moved from said one of said at least two groups to one of said at least two vacant cells in the first group first, the previously used recording medium is stored in another one of said at least two vacant cells in the first group next, the new recording medium is mounted on the media driving means from said one of said at least two vacant cells in the first group next, and then one recording medium with a lowest utilization frequency among each group, other than the last group is moved to a currently vacant cell in an adjacent group.

19. The method of claim 18, wherein the control step controls the media exchange operation of the media carrying means such that, in a case of taking the new recording medium from the first group, the previously used recording medium is stored in one of said at least two vacant cells of the first group first, and then the new recording medium is mounted on the media driving means from the first group, so as to secure said at least two vacant cells in the first group.

20. The method of claim 18, wherein the control step controls the media exchange operation of the media carrying means such that the first group consists of said at least two vacant cells alone.

21. The method of claim 18, wherein the control step controls the media exchange operation of the media carrying means such that the storage cells of the storehouse are divided into more than two groups arranged in an order of average distances with respect to the media driving means, and at least one vacant cell not storing any recording medium is secured among the storage cells of at least one group among said more than two groups other than the first and last groups after the media exchange operation is completed.

22. The method of claim 21, wherein the control step controls the media exchange operation of the media carrying means such that, in a case of taking the new recording medium from the first group, the previously used recording medium is stored in one of said at least two vacant cells of the first group first, and then the new recording medium is mounted on the media driving means from the first group, so as to secure said at least two vacant cells in the first group and said at least one vacant cell in said at least one group among said more than two groups other than the first and last groups.

23. The method of claim 21, wherein the control step controls the media exchange operation of the media carrying means such that the first group consists of said at least two vacant cells alone.

24. The method of claim 21, wherein the control step controls the media exchange operation of the media carrying means such that in a case where the new recording medium is taken from one of said at least two groups other than the first group, said one recording medium with the lowest utilization frequency among each group other than the last group is moved to the currently vacant cell in the adjacent group sequentially from the first group until the currently vacant cell in said one of said more than two groups from which the new recording medium has been taken is filled.

* * * * *